(12) United States Patent
Tran

(10) Patent No.: US 12,469,483 B1
(45) Date of Patent: Nov. 11, 2025

(54) COMPREHENSIVE AI-ENABLED SYSTEMS FOR IMMERSIVE VOICE, COMPANION, AND AUGMENTED/VIRTUAL REALITY INTERACTION SOLUTIONS

(71) Applicant: Bao Tran, Saratoga, CA (US)

(72) Inventor: Bao Tran, Saratoga, CA (US)

(*) Notice: Subject to any disclaimer, the term of this patent is extended or adjusted under 35 U.S.C. 154(b) by 0 days.

(21) Appl. No.: 19/097,095

(22) Filed: Apr. 1, 2025

(51) Int. Cl.
  *G10L 15/26* (2006.01)
  *G10L 13/08* (2013.01)
  *G10L 15/18* (2013.01)

(52) U.S. Cl.
  CPC .......... *G10L 13/08* (2013.01); *G10L 15/1822* (2013.01); *G10L 15/26* (2013.01)

(58) Field of Classification Search
  None
  See application file for complete search history.

(56) References Cited

U.S. PATENT DOCUMENTS

| | | | | |
|---|---|---|---|---|
| 11,397,861 | B2* | 7/2022 | Klasson | G06Q 10/105 |
| 11,423,346 | B2* | 8/2022 | Fadel | G06F 18/2148 |
| 12,223,456 | B1* | 2/2025 | Manohar | G06F 40/30 |
| 2023/0005495 | A1* | 1/2023 | Kukde | G06N 20/00 |
| 2023/0173395 | A1* | 6/2023 | Cella | G06N 3/0455 |
| | | | | 463/25 |
| 2023/0343050 | A1* | 10/2023 | Kim | G06V 10/46 |
| 2024/0050831 | A1* | 2/2024 | Canberk | G06F 3/012 |

(Continued)

Primary Examiner — Neeraj Sharma
(74) Attorney, Agent, or Firm — PatentPC

(57) ABSTRACT

A computer-implemented method for operating an artificial intelligence voice agent system includes receiving voice input through communication channels; analyzing converted text through natural language processing (NLP) pipelines implementing intent recognition and sentiment analysis detecting emotional cues using a multimodal large language model (LLM); generating response content using machine learning models trained on domain-specific corpora; converting generated responses to synthetic speech through text-to-speech (TTS) engines; integrating with a customer relationship management (CRM) platforms or an enterprise resource planning (ERP) database; and implementing continuous learning by updating language understanding models using conversation logs, voice recognition parameters based on user feedback, and response generation patterns. One implementation is a computer-implemented system and method that operates a suite of intelligent interactive devices and platforms including an artificial intelligence voice agent, enhanced communication platforms, an intimacy companion system, and augmented/virtual reality eyeglasses. Further, one implementation includes AR/VR eyeglasses that project visual content onto interchangeable lenses or directly onto the user's retina via laser-based retinal projection, provide prescription adjustments, incorporate ear-mounted sensors for monitoring physiological parameters like heart rate, oxygen saturation, and blood pressure, and utilize wireless data transmission, onboard environmental sensing, and remote calibration, all designed to offer dynamically adaptive, secure, and context-aware interactions across communication, personal assistance, health monitoring, and immersive augmented or virtual reality environments.

21 Claims, 25 Drawing Sheets

(56) References Cited

U.S. PATENT DOCUMENTS

| | | | |
|---|---|---|---|
| 2024/0169974 A1* | 5/2024 | Bonar | G10L 15/26 |
| 2024/0347058 A1* | 10/2024 | Rossi | G10L 13/08 |
| 2025/0016128 A1* | 1/2025 | Wheeler | G06N 20/00 |
| 2025/0104392 A1* | 3/2025 | Saraee | G06F 16/438 |
| 2025/0258852 A1* | 8/2025 | Crabtree | G06F 16/3344 |

* cited by examiner

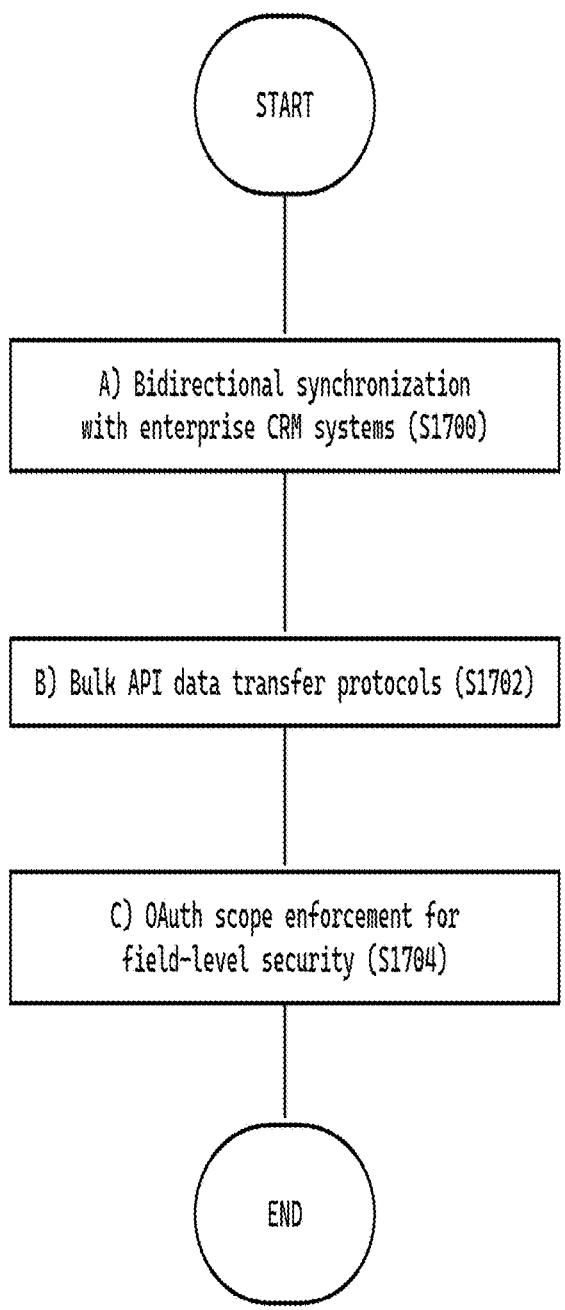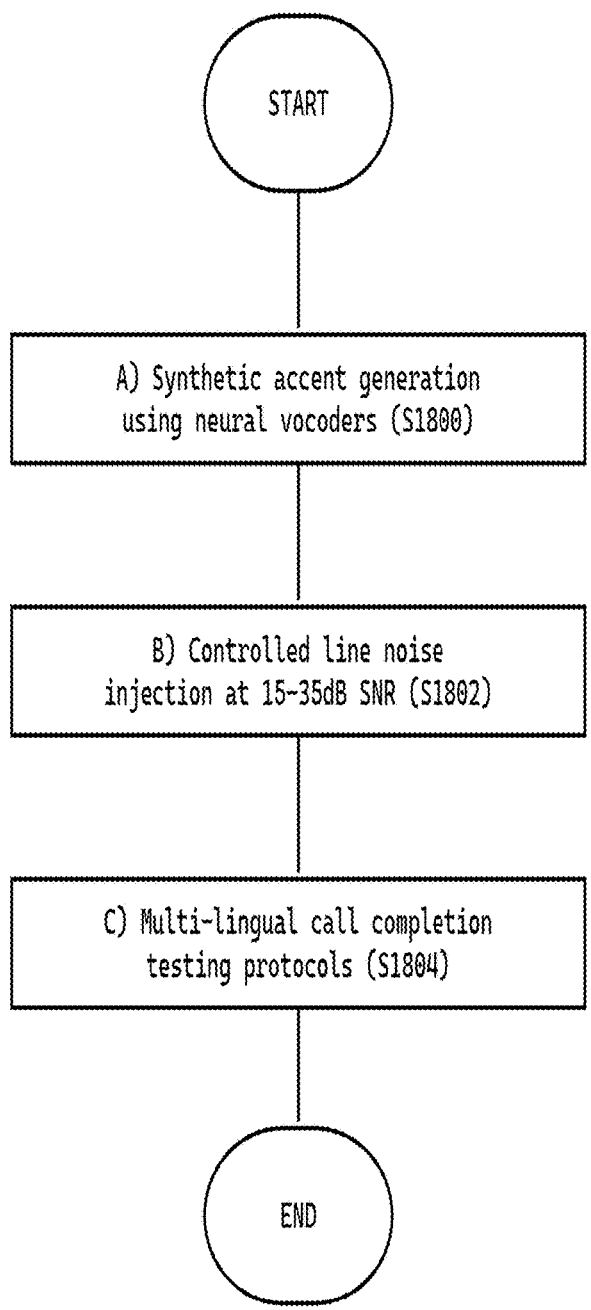
FIG. 17
FIG. 18

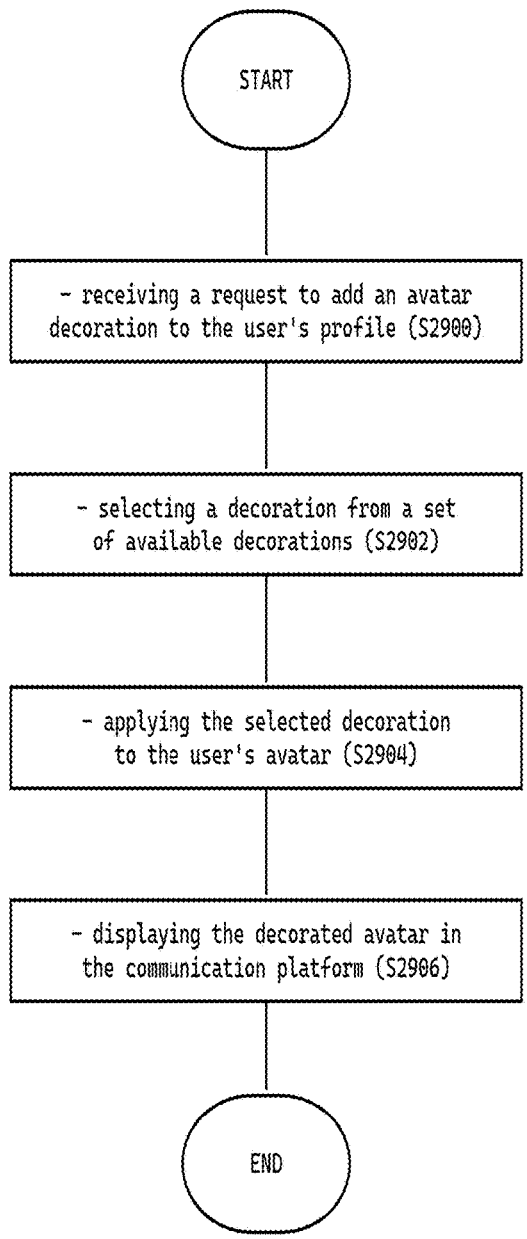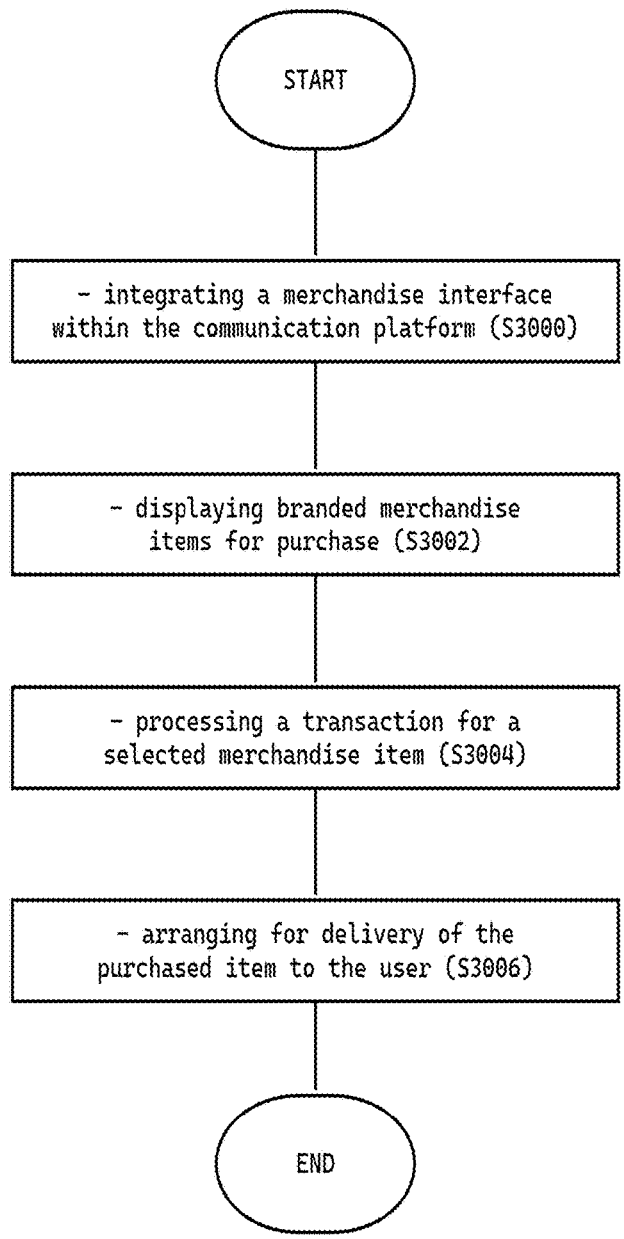
FIG. 29
FIG. 30

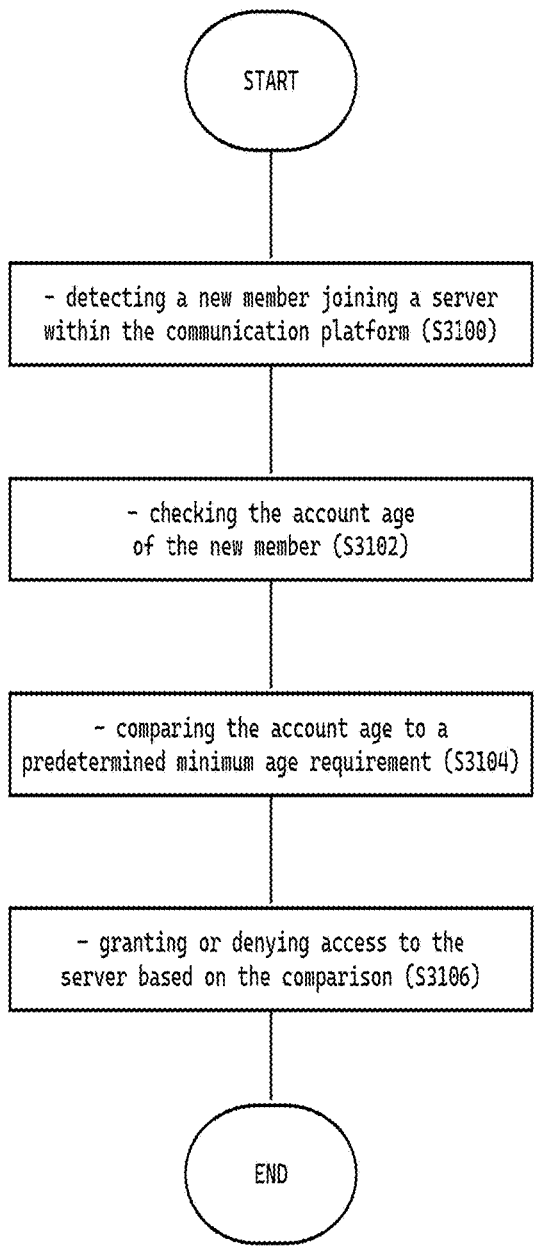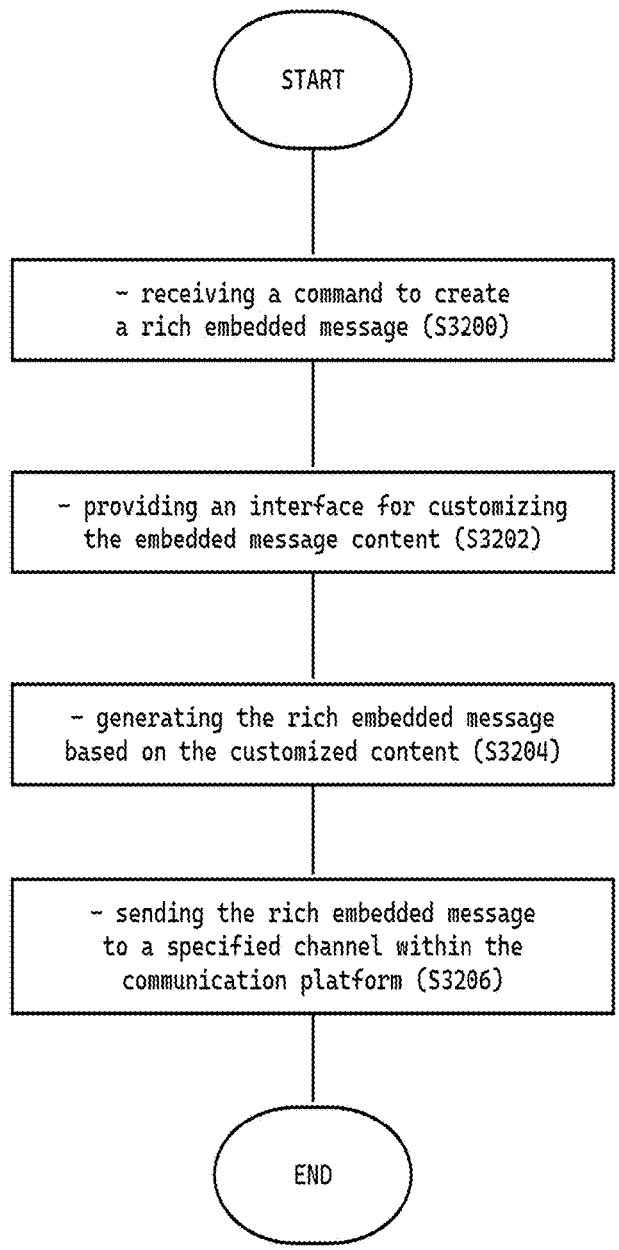
FIG. 31
FIG. 32

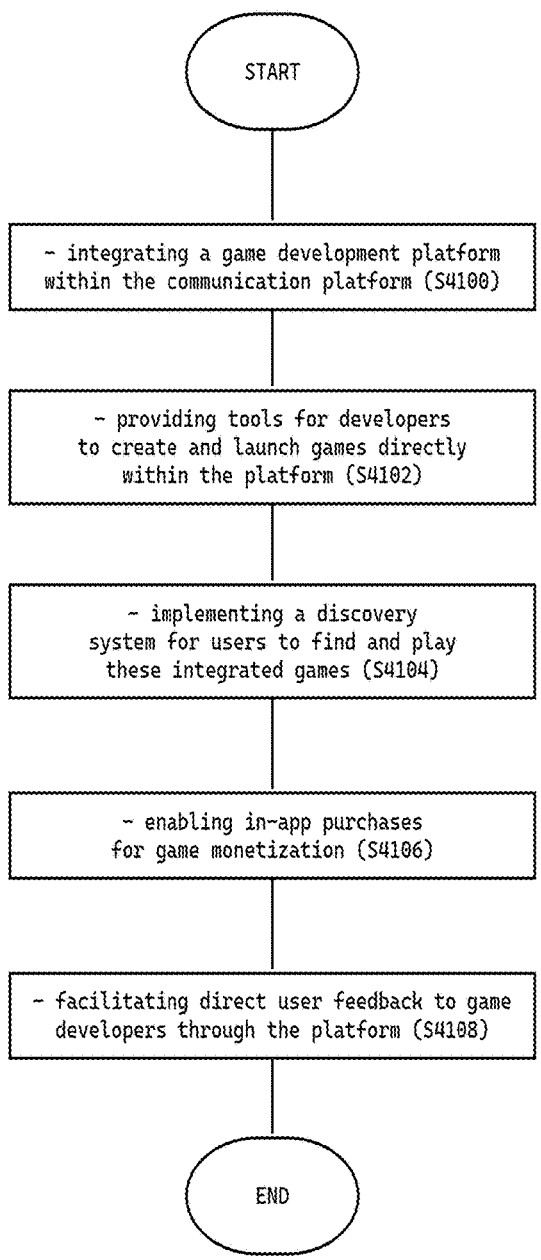
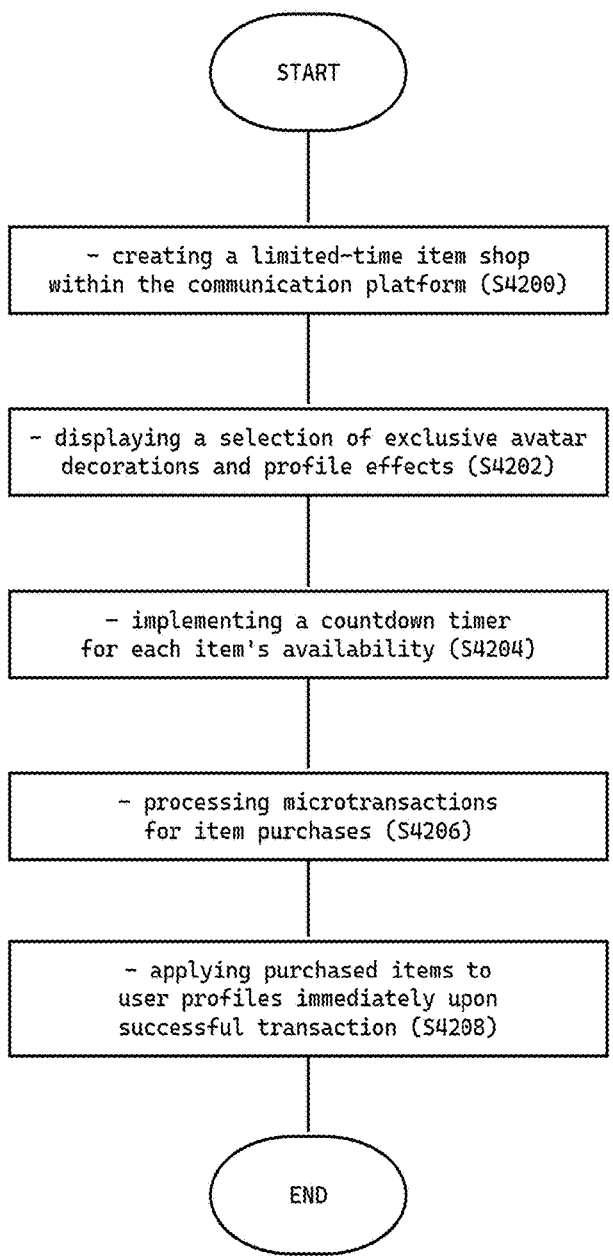
FIG. 41
FIG. 42

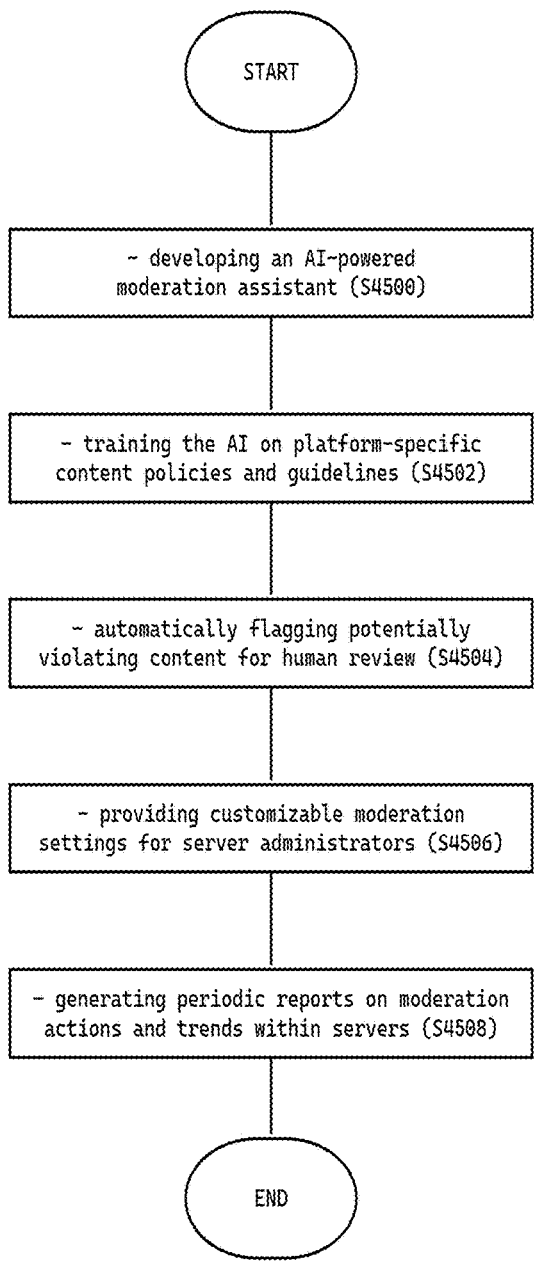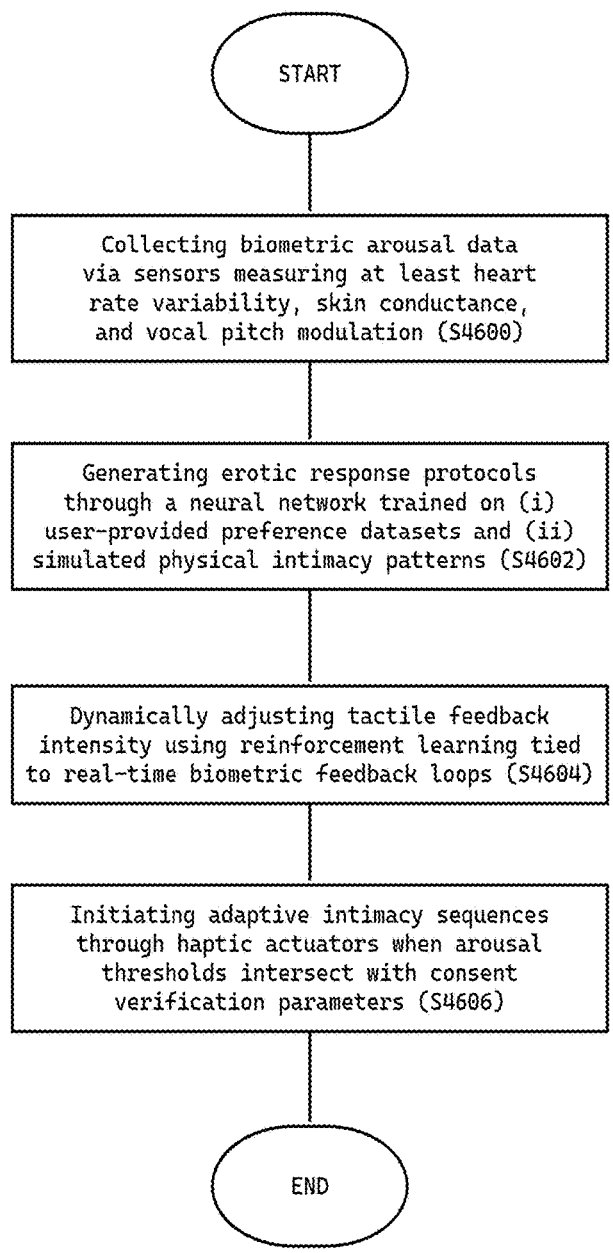
FIG. 45
FIG. 46

COMPREHENSIVE AI-ENABLED SYSTEMS FOR IMMERSIVE VOICE, COMPANION, AND AUGMENTED/VIRTUAL REALITY INTERACTION SOLUTIONS

BACKGROUND OF THE INVENTION

Recent advancements in digital communication and human-computer interaction have laid the groundwork for the integration of multiple modalities into everyday systems. Over the past several years, voice communication technologies have become more sophisticated, enabling more natural and efficient exchanges between users and machines. Simultaneously, developments in wearable augmented reality devices, particularly those designed as eyeglasses, have opened new avenues for interactive experiences that blend digital and physical environments. In parallel, the field of artificial companionship has evolved to address the growing demand for socially engaging applications that offer personalized interactions. Collectively, these technological trends highlight the ongoing convergence of voice processing, visual augmentation, and behavioral analysis, driven by the need for systems that adapt to diverse contexts and user environments.

SUMMARY OF THE INVENTION

The disclosed system includes multiple computer-implemented methods. In one embodiment, voice input received from telephone or VoIP networks is converted to text using automatic speech recognition with multi-accent capability, then analyzed via natural language processing pipelines that recognize intent, maintain conversation history, and detect sentiment. Generated responses are produced using machine learning models trained on domain-specific data and converted to synthetic speech, while backend integration is provided via APIs with CRM, ERP, and payment systems, and continuous improvement is achieved through analysis of conversation logs, feedback adjustments, and reinforcement learning coupled with robust end-to-end encryption and biometric voice authentication. In another embodiment, digital voice input is processed using a neural network architecture for speech recognition, semantic extraction, and dialogue management, with responses generated by a combination of large language models, intent classifiers, and reinforcement learning modules, which are then converted to speech and synchronized with external systems such as CRM and transaction platforms, while continuous learning and security measures are maintained. Additional embodiments include methods for activating dynamic profile effects on user accounts—including options for customization and real-time updates—and techniques for collecting biometric arousal data (heart rate variability, skin conductance, vocal pitch) to generate response protocols that adjust tactile feedback via reinforcement learning. Finally, an AI companion system is described that collects behavioral data from multi-modal sensors to generate emotional state vectors (from vocal and facial cues), dynamically adjust responses using an ensemble of transformer-based dialogue, reinforcement learning, and geolocation context models, and initiate tactile interactions when predetermined thresholds are exceeded. The system is fully compatible with augmented reality (AR) and virtual reality (VR) eyeglasses, enabling real-time overlay of conversational analytics, sentiment visualization, and contextual data during interactions. The aspects are:

Aspect 1. A computer-implemented method for operating an artificial intelligence voice agent system includes: receiving voice input through communication channels; analyzing converted text through natural language processing (NLP) pipelines implementing intent recognition and sentiment analysis detecting emotional cues using a multimodal large language model (LLM); generating response content using machine learning models trained on domain-specific corpora; converting generated responses to synthetic speech through text-to-speech (TTS) engines; integrating with a customer relationship management (CRM) platforms or an enterprise resource planning (ERP) database; implementing continuous learning by updating language understanding models using conversation logs, voice recognition parameters based on user feedback, and response generation patterns through reinforcement learning.

Implementations: The method of aspect 1, further including real-time call transcription synchronized with dialog state tracking. 3. The method of aspect 1, applying security protocols including end-to-end voice data encryption, biometric voice authentication, or mass call regulatory compliance monitoring. 4. The method of aspect 1, further including converting said voice input to text using automatic speech recognition (ASR) systems with multi-accent processing capabilities and multilingual processing supporting simultaneous translation. 5. The method of aspect 1, wherein CRM integration includes automatic creation of service tickets based on conversation outcomes. 6. The method of aspect 1, further including dynamic latency compensation maintaining sub-300 ms response times during voice interactions. 7. The method of aspect 1, wherein continuous learning mechanisms employ federated learning across distributed edge nodes. 8. The method of aspect 1, further including adaptive noise cancellation using dual-microphone beamforming techniques. 9. The method of aspect 1, wherein regulatory compliance includes automated HIPAA-compliant data redaction pipelines. 10. The method of aspect 1, further including emotion-aware response generation adjusting vocal prosody parameters in real-time. 11. The method of aspect 1, wherein payment processing integration implements PCI-DSS compliant tokenization of financial data. 12. The method of aspect 1, further including conversational context preservation across multiple interaction channels. 13. The method of aspect 1, wherein synthetic speech output includes simultaneous generation of multiple audio codec formats. 14. The method of aspect 1, further including automated call summarization with key moment timestamping. 15. The method of aspect 1, wherein voice authentication uses spectrogram pattern matching with less than 1% false acceptance rate. 16. The method of aspect 1, further including hardware-accelerated ASR processing using tensor processing units (TPUs). 17. The method of aspect 1, wherein dialog management implements probabilistic finite state machines with multi-thread processing. 18. The method of aspect 1, further including real-time agent performance monitoring with anomaly detection thresholds. 19. The method of aspect 1, wherein LLM processing includes dynamic temperature adjustment based on conversation complexity. 20. The method of aspect 1, further including automated escalation protocols transferring to human agents when confidence scores drop below 85%.

Aspect 21. A computer-implemented method for operating an artificial intelligence voice agent system, includes: Receiving digital voice input through at least one communication channel selected from: telephone networks, VoIP systems, and web-based interfaces; Processing said voice input through a neural network architecture including; a)

Automatic speech recognition (ASR) components converting audio to text; b) Natural language understanding (NLU) components extracting semantic meaning; c) Dialogue management components maintaining conversation context; Generating response content using at least one AI model selected from; a) Large language models (LLMs) trained on domain-specific corpora; b) Machine learning classifiers for intent detection; c) Reinforcement learning systems optimizing conversation flows; Converting said response content into synthetic speech output using text-to-speech (TTS) engines; Executing API integrations with external systems through: a) Authentication protocols for secure data exchange; b) Real-time synchronization with CRM platforms; c) Transaction processing interfaces for commercial operations; Implementing continuous learning mechanisms including: a) Conversation outcome analysis modules; b) Error pattern detection algorithms; c) Model retraining pipelines using updated interaction data; Deploying security measures including: a) Voice biometric authentication; b) Encryption of sensitive PII data; c) Compliance monitoring for regulatory requirements; Outputting processed results through multiple channels including: a) Voice response systems; b) Text-based interfaces; and c) Enterprise workflow automation platforms.

Implementations: 22. The method of aspect 21, further including: a) Real-time conversation flow editing through a graphical interface integrating drag-and-drop workflow components; b) Visual state machine editors displaying conversation branching probabilities; and c) Parallel preview modes simulating multiple dialog paths simultaneously. 23. The method of aspect 21, wherein dialog management implements: a) Temporal analysis windows of 500-1500 ms matching human turn-taking cadence; b) Multi-head attention mechanisms processing concurrent dialog threads; and c) Hardware-accelerated transition matrices using parallel processing units. 24. The method of aspect 21, further including: a) Real-time pitch variance analysis using Mel-frequency cepstral coefficients; b) Spectral flux measurements quantifying vocal intensity changes; and c) Neural style transfer layers applying emotional archetype profiles. 25. The method of aspect 21, wherein accented speech processing includes: a) Phonetic lattice pruning algorithms with sub-2 ms latency; b) Dialect-specific language models stored in non-volatile phase-change memory; and c) Compensatory filter banks adjusting regional formant variations. 26. The method of aspect 21, further including: a) Adapter modules with 0.2-1.8% neural network parameter expansion; b) Dynamic weight freezing during backpropagation cycles; and c) Quantized gradient accumulators reducing memory bandwidth. 27. The method of aspect 21, further including: a) Vocal biomarker extraction from audio samples; b) GAN-based spectrogram inpainting for frequency reconstruction; and c) Anti-spoofing hashes using elliptic curve cryptography. 28. The method of aspect 21, wherein interruption handling includes: a) Dual-threshold voice activity detectors with 125 dB dynamic range; b) Echo cancellation providing 30 dB suppression minimum; and c) Circular buffers storing 800 ms audio data windows. 29. The method of aspect 21, further including: a) Playback rate adjustment within ±12% without pitch distortion; b) Jitter buffers with adaptive Kalman filtering; and c) Network time protocol synchronization across RTP streams. 30. The method of aspect 21, further including: a) Visual programming nodes generating intermediate code representations; b) Automatic data type conversion between communication protocols; and c) Hardware profilers estimating computational resource utilization. 31. The method of aspect 21, further including: a) Bitrate-shaping algorithms with 8-320 kbps adaptive output; b) Psychoacoustic masking threshold application per audio codec; and c) Multi-channel encoding pipelines supporting commercial standards. 32. The method of aspect 21, further including: a) Versioned API interfaces for component compatibility; b) FPGA-accelerated tensor operations; and c) Fallback modes with reduced precision calculations. 33. The method of aspect 21, further including: a) Formant warping filters in 25 ms processing frames; b) Prosody contour adjustment using dynamic time warping; and c) Vocal tract length normalization for speaker consistency. 34. The method of aspect 21, further including: a) AES-256 encrypted voice data streams; b) Automatic redaction of protected health information; and c) Blockchain-anchored audit trail generation. 35. The method of aspect 21, further including: a) Least-recently-used caching of dialog entities; b) Cross-session reference maintenance through unique identifiers; and c) Non-volatile magnetic RAM storage for conversation history. 36. The method of aspect 21, further including: a) Bidirectional synchronization with enterprise CRM systems; b) Bulk API data transfer protocols; and c) OAuth scope enforcement for field-level security. 37. The method of aspect 21, further including: a) Synthetic accent generation using neural vocoders; b) Controlled line noise injection at 15-35 dB SNR; and c) Multi-lingual call completion testing protocols. 38. The method of aspect 21, further including: a) High-dimensional voice embedding extraction; b) Cosine similarity comparison against enrolled templates; and c) Challenge-phrase-based liveness detection. 39. The method of aspect 21, further including: a) Byte-pair encoding with expanded token vocabulary; b) Universal semantic space mapping through joint training; and c) Multi-language code-switching detection. 40. The method of aspect 21, further including: a) Pitch deviation analysis over 200 ms windows; b) Spectral centroid shift detection for micro-expression analysis; and c) MFCC delta coefficient correlation with arousal levels. 41. The method of aspect 21, further including: a) Homomorphic encryption for voice data processing; b) Post-quantum TLS transmission protocols; and c) FIPS-validated hardware security modules. 42. The method of aspect 21, further including: a) Geospatial data fusion with point-of-interest databases; b) Calendar availability cross-referencing; and c) Ambient noise-adaptive response verbosity. 43. The method of aspect 21, further including: a) Kubernetes-based horizontal auto-scaling; b) Edge caching for sub-50 ms inter-node latency; and c) Circuit breaker fault tolerance mechanisms. 44. The method of aspect 21, further including: a) Automated APR calculation verification; b) Regulatory timeline cross-checking; and c) PDF/A-3 compliant document auditing.

Aspect 45. A method for enhancing user interaction in a communication platform, includes receiving a user input to activate a profile effect for a user account; applying the selected profile effect to the user's profile, wherein the profile effect comprises a dynamic visual element; displaying the profile with the applied effect to other users of the communication platform; providing an option to disable or customize the profile effect based on user preferences; updating the display of the profile in real-time as the dynamic visual element changes.

Implementations: 46. The method of aspect 45, further including: —presenting a shop interface within the communication platform; —displaying a selection of limited-time items for purchase; —processing a microtransaction for a selected item; —applying the purchased item to the user's account. 47. The method of aspect 45, further including: —detecting a user command to ignore another user; —adding the selected user to an ignore list associated with the user account; —filtering out messages, notifications, and activities from the ignored user without notifying the ignored user; —providing an option to remove the ignored user from the ignore list. 48. The method of aspect 45, further including: —receiving a request to add an avatar decoration to the user's profile; —selecting a decoration from a set of available decorations; —applying the selected decoration to the user's avatar; —displaying the decorated avatar in the communication platform. 49. The method of aspect 45, further including: —integrating a merchandise interface within the communication platform; —displaying branded merchandise items for purchase; —processing a transaction for a selected merchandise item; —arranging for delivery of the purchased item to the user. 50. The method of aspect 45, further including: —detecting a new member joining a server within the communication platform; —checking the account age of the new member; —comparing the account age to a predetermined minimum age requirement; —granting or denying access to the server based on the comparison. 51. The method of aspect 45, further including: —receiving a command to create a rich embedded message; —providing an interface for customizing the embedded message content; —generating the rich embedded message based on the customized content; —sending the rich embedded message to a specified channel within the communication platform. 52. The method of aspect 45, further including: —establishing a connection with an external social media platform; —monitoring the connected platform for new content or activity; —generating a notification within the communication platform when new content is detected; —displaying the notification in a designated channel. 53. The method of aspect 45, further including: —creating a role selection interface within a server; —associating specific roles with corresponding reactions or emotes; —detecting a user interaction with a reaction or emote; —automatically assigning or removing the associated role from the user's account based on the interaction. 54. The method of aspect 45, further including: —integrating with a project management tool; —monitoring the project management tool for updates or changes; —generating notifications within the communication platform based on the detected updates; —displaying the project-related notifications in a designated channel. 55. The method of aspect 45, further including: —detecting a user command to activate a message effect; —applying the selected message effect to a user's message; —displaying the message with the applied effect in the chat interface; —providing an option to disable message effects for users who prefer a simpler interface. 56. The method of aspect 45, further including: —implementing a soundmoji feature within the communication platform; —associating specific sounds with selected emojis; —detecting user input of a soundmoji in a message; —playing the associated sound when the message is displayed; —providing volume controls for soundmoji playback. 57. The method of aspect 45, further including: —integrating a picture-in-picture feature for mobile devices; —detecting user activation of an audio file playback; —displaying a floating, resizable audio player interface; —allowing users to navigate other areas of the app while the audio continues playing; —providing playback controls within the floating interface. 58. The method of aspect 45, further including: —implementing an advanced server join feature; —setting a minimum account age requirement for new members joining a server; —automatically checking the account age of users attempting to join; —granting or denying access based on the account age verification; —providing server administrators with customizable age threshold options. 59. The method of aspect 45, further including: —redesigning the user interface of the communication platform; —implementing a collapsible sidebar for channel lists; —creating a new header bar displaying the current page and key functions; —adjusting the color scheme to a darker palette; —providing users with options to toggle between the new and classic interface designs. 60. The method of aspect 45, further including: —integrating a game development platform within the communication platform; —providing tools for developers to create and launch games directly within the platform; —implementing a discovery system for users to find and play these integrated games; —enabling in-app purchases for game monetization; —facilitating direct user feedback to game developers through the platform. 61. The method of aspect 45, further including: —creating a limited-time item shop within the communication platform; —displaying a selection of exclusive avatar decorations and profile effects; —implementing a countdown timer for each item's availability; —processing microtransactions for item purchases; —applying purchased items to user profiles immediately upon successful transaction. 62. The method of aspect 45, further including: —developing an enhanced voice channel interface; —providing a customizable mini-dashboard for voice channel participants; —implementing real-time voice activity indicators; —allowing users to adjust individual participant volumes; —integrating screen sharing capabilities within the voice channel interface. 63. The method of aspect 45, further including: —creating a content creator program within the communication platform; —providing tools for creators to monetize their servers and content; —implementing a subscription system for exclusive server access or content; —facilitating revenue sharing between the platform and content creators; —offering analytics tools for creators to track their audience engagement and earnings. 64. The method of aspect 45, further including: —developing an AI-powered moderation assistant; —training the AI on platform-specific content policies and guidelines; —automatically flagging potentially violating content for human review; —providing customizable moderation settings for server administrators; —generating periodic reports on moderation actions and trends within servers.

Aspect 65. A computer-implemented method for operating an artificial intimacy companion system, including: collecting biometric arousal data via sensors measuring at least heart rate variability, skin conductance, and vocal pitch modulation; generating response protocols through a neural network trained on (i) user-provided preference datasets and (ii) simulated physical intimacy patterns; dynamically adjusting tactile feedback intensity using reinforcement learning tied to real-time biometric feedback loops; initiating adaptive intimacy sequences through haptic actuators when arousal thresholds intersect with consent verification parameters.

Implementations: 66. The method of aspect 65, wherein the simulated physical intimacy patterns incorporate biomechanical models of human anatomy refined through generative adversarial networks. 67. The method of aspect 65, further including synchronizing multi-user experiences through distributed ledger technology that enforces participant consent boundaries. 68. The method of aspect 65, wherein the neural network processes microexpression data from infrared facial tracking to modify erotic response protocols. 69. The method of aspect 65, further including generating synthetic intimate content using diffusion models conditioned on user-specific anatomical parameters. 70. The method of aspect 65, wherein the reinforcement learning applies orgasm prediction algorithms to optimize haptic actuator timing sequences. 71. The method of aspect 65, further including preventing unauthorized content generation through blockchain-verified digital rights management tokens. 72. The method of aspect 65, wherein the haptic actuators implement variable pressure gradients mimicking human touch dynamics via shape-memory alloy arrays. 73. The method of aspect 65, further including filtering non-consensual scenarios through constitutional AI layers trained on international sexual consent laws. 74. The method of aspect 65, wherein the biometric feedback loops incorporate neurotransmitter level estimates derived from pupillary response measurements. 75. The method of aspect 65, further including adapting intimacy sequences through quantum annealing optimization of pleasure response curves. 76. The method of aspect 65, wherein the consent verification parameters include real-time voice pattern analysis and blockchain timestamped approval records. 77. The method of aspect 65, further including generating synthetic erotic audio through vocal tract models personalized to user-selected voice characteristics. 78. The method of aspect 65, wherein the adaptive intimacy sequences control temperature-regulated fluidic actuators in anatomically accurate companion devices. 79. The method of aspect 65, further including implementing differential privacy through homomorphic encryption of user orgasmic response patterns. 80. The method of aspect 65, wherein the neural network applies counterfactual regret minimization to balance user preferences with ethical constraints. 81. The method of aspect 65, further including detecting physiological compatibility through machine learning analysis of user-reported satisfaction metrics. 82. The method of aspect 65, wherein the reinforcement learning reward function incorporates pharmacokinetic models of arousal hormone release cycles.

Aspect 83. A computer-implemented method for operating an artificial intelligence companion system, including: collecting behavioral data from a user via multi-modal sensors including at least a microphone and camera; generating emotional state vectors by processing the behavioral data through a neural network trained to recognize vocal pitch variations and facial micro-expressions; dynamically adjusting response protocols using an ensemble learning architecture that combines outputs from (i) a transformer-based dialogue model, (ii) a reinforcement learning reward module, and (iii) a contextual awareness engine analyzing geolocation data; initiating autonomous companion interactions through a tactile feedback interface when the emotional state vectors exceed predetermined threshold values.

Implementations: 84. The method of aspect 83, further including encrypting the behavioral data using homomorphic encryption prior to processing by the neural network. 85. The method of aspect 83, wherein the contextual awareness engine incorporates temporal pattern recognition of daily routines stored in a user profile database. 86. The method of aspect 83, further including executing real-time model updates through federated learning architecture that shares only gradient updates between edge devices and a central server. 87. The method of aspect 83, wherein the neural network processes pupil dilation measurements from infrared camera data as input to the emotional state vectors. 88. The method of aspect 83, further including generating explainability outputs through attention heatmaps visualizing decision weights in the transformer-based dialogue model. 89. The method of aspect 83, wherein the ensemble learning architecture applies Nash equilibrium calculations to resolve conflicts between multiple user profiles. 90. The method of aspect 83, further including preventing catastrophic forgetting in the neural network through elastic weight consolidation during training updates. 91. The method of aspect 83, wherein the tactile feedback interface activates vibration patterns proportional to detected stress levels in the emotional state vectors. 92. The method of aspect 83, further including filtering harmful requests through a parallel decision tree containing hard-coded ethical constraints. 93. The method of aspect 83, wherein the reinforcement learning reward module calculates user satisfaction metrics based on dialog response timing and biometric data correlations. 94. The method of aspect 83, further including optimizing neural network computations through quantization-aware training for execution on low-power edge devices. 95. The method of aspect 83, wherein the transformer-based dialogue model incorporates cross-cultural adaptation rules modifying response protocols based on detected language idioms. 96. The method of aspect 83, further including generating synthetic vocal responses using a generative adversarial network trained on personalized voice samples. 97. The method of aspect 83, wherein the autonomous companion interactions include controlling smart home devices through IoT protocol bridges. 98. The method of aspect 83, further including implementing differential privacy by injecting random noise into training datasets prior to federated learning updates. 99. The method of aspect 83, wherein the emotional state vectors are weighted using adaptive momentum coefficients during backpropagation training cycles. 100. The method of aspect 83, further including detecting abnormal vital signs through integration with wearable biometric sensors measuring galvanic skin response. 101. The method of aspect 83, wherein the ensemble learning architecture prioritizes neural network branches based on real-time battery level measurements from user devices.

Aspect 102. A method of operating augmented reality (AR) or virtual reality (VR) eyeglasses, the method including: projecting visual content onto interchangeable lenses integrated within the eyeglasses; adjusting the projected visual content to align with the user's prescription by modifying optical parameters of the projection system; enabling selective attachment and detachment of interchangeable lenses to accommodate varying vision correction needs; sensing blood flow in the user's ear canal using an ear-mounted photoplethysmography (PPG) sensor integrated with the eyeglasses; transmitting physiological data derived from the PPG sensor to an external device for monitoring vital signs.

Implementations: 103. The method of aspect 102, wherein the interchangeable lenses include polarized or photochromic options to optimize visual clarity under varying environmental conditions. 104. The method of aspect 102, wherein the projection system dynamically adjusts focal length and image distortion parameters based on the diopter value of the attached interchangeable lenses. 105. The method of aspect 102, further including using waveguide optics embedded in the eyeglasses to deliver high-resolution images onto the interchangeable lenses. 106. The method of aspect 102, wherein the interchangeable lenses are secured via a detachable nose pad with adjustable positions for precise alignment with the projection system. 107. The method of aspect 102, wherein the PPG sensor detects variations in blood volume in vessels within the ear canal to calculate heart rate, oxygen saturation, and blood pressure.

108. The method of aspect 107, further including compensating for motion artifacts in real-time using signal processing algorithms embedded in the eyeglasses. 109. The method of aspect 102, further including activating an auditory interface via integrated speakers to provide audio feedback based on physiological data or AR/VR content. 110. The method of aspect 102, wherein the eyeglasses include a battery-molded frame structure to power all integrated components, including the projection system and PPG sensor. 111. The method of aspect 102, further including wirelessly transmitting physiological data from the PPG sensor to a paired mobile device using ultra-wideband (UWB) communication technology. 112. The method of aspect 102, further including notifying the user via a visual or auditory alert when abnormal vital signs are detected by the PPG sensor. 113. The method of aspect 102, wherein the eyeglasses include an ear plug extension that secures into the user's ear canal to stabilize both the eyeglasses and PPG sensor during use. 114. The method of aspect 113, wherein the ear plug extension is made from silicone material and includes adjustable sizing features for enhanced comfort and fit across different users. 115. The method of aspect 113, further including using vibration-damping materials in the ear plug extension to reduce motion-induced noise in PPG signal acquisition. 116. The method of aspect 102, wherein physiological data from the PPG sensor is combined with environmental data captured by an onboard camera to provide context-aware health insights in real-time. 117. The method of aspect 102, further including enabling remote configuration and calibration of both the projection system and PPG sensor through a dedicated mobile application interface. 118. The method of aspect 102, wherein multiple users can share one pair of eyeglasses by storing individualized settings for interchangeable lenses and physiological monitoring profiles in onboard memory. 119. The method of aspect 102, further including dynamically adjusting projected content brightness based on ambient light levels detected by onboard sensors integrated into the eyeglasses frame. 120. The method of aspect 102, wherein visual content projected onto interchangeable lenses is enhanced using adaptive contrast algorithms for improved visibility under low-light conditions. 121. The method of aspect 102, further including integrating a charging interface within one temple arm of the eyeglasses for recharging internal batteries via a USB-C or wireless charging pad.

Aspect 122. A method of operating augmented reality (AR) or virtual reality (VR) eyeglasses, the method including: projecting visual content via an integrated eye projector; enabling selective attachment and detachment of a prescription lens to accommodate varying vision correction needs; sensing blood flow in the user's ear canal using an ear-mounted photoplethysmography (PPG) sensor coupled to the eyeglasses; and monitoring vital signs.

Implementations: 123. The method of aspect 122, wherein the eye projector utilizes laser-based retinal projection to overlay augmented reality images onto the user's field of view without obstructing natural vision. 124. The method of aspect 122, wherein the prescription clip-in lens is secured via a detachable nose piece with a locking mechanism for easy replacement by non-specialized users. 125. The method of aspect 122, further including aligning the prescription clip-in lens with the waveguide optics of the eyeglasses to ensure accurate image projection through the lens. 126. The method of aspect 122, wherein the PPG sensor detects variations in blood volume in vessels within the ear canal to calculate heart rate, oxygen saturation, and blood pressure. 127. The method of aspect 126, further including compensating for motion artifacts in real-time using signal processing algorithms embedded in the eyeglasses. 128. The method of aspect 122, further including activating an auditory interface via integrated speakers to provide audio feedback based on physiological data or AR/VR content. 129. The method of aspect 122, wherein the eyeglasses include a battery-molded frame structure to power all integrated components, including the projector and PPG sensor. 130. The method of aspect 122, further including wirelessly transmitting physiological data from the PPG sensor to a paired mobile device using ultra-wideband (UWB) communication technology. 131. The method of aspect 122, wherein the eyeglasses include interchangeable lenses with different tints or polarizations to optimize visual clarity under varying environmental conditions. 132. The method of aspect 122, further including notifying the user via a visual or auditory alert when abnormal vital signs are detected by the PPG sensor. 133. The method of aspect 122, wherein the eyeglasses include an ear plug extension that secures into the user's ear canal to stabilize both the eyeglasses and PPG sensor during use. 134. The method of aspect 133, wherein the ear plug extension is made from silicone material and includes adjustable sizing features for enhanced comfort and fit across different users. 135. The method of aspect 133, further including using vibration-damping materials in the ear plug extension to reduce motion-induced noise in PPG signal acquisition. 136. The method of aspect 122, wherein the eyeglasses include h7G6 hinges designed for smooth adjustment and enhanced stability during high-motion activities such as running or cycling. 137. The method of aspect 122, further including integrating a charging interface within one temple arm of the eyeglasses for recharging internal batteries via a USB-C or wireless charging pad. 138. The method of aspect 122, wherein physiological data from the PPG sensor is combined with environmental data captured by an onboard camera to provide context-aware health insights in real-time. 139. The method of aspect 122, further including enabling remote configuration and calibration of both the eye projector and PPG sensor through a dedicated mobile application interface. 140. The method of aspect 122, wherein multiple users can share one pair of eyeglasses by storing individualized settings for prescription lenses and physiological monitoring profiles in onboard memory. 141. The method of aspect 122, further including dynamically adjusting projected content brightness based on ambient light levels detected by onboard sensors.

Advantages of the above aspects may include one or more of the following:

Enhanced User Interaction: By leveraging advanced voice recognition with multi-accent support and augmented reality displays, the system enables natural, intuitive, and context-aware interactions that closely simulate face-to-face communication.

Improved Personalization: The integration of natural language processing, intent recognition, and reinforcement learning allows the system to maintain dynamic conversation history and adapt its responses based on user feedback and biometric cues, leading to highly tailored and engaging user experiences.

Seamless Backend Integration: With robust APIs connecting CRM, ERP, and payment systems, the disclosed system facilitates streamlined business processes and efficient data management throughout customer service, transaction processing, and resource planning.

Advanced Security Measures: The use of biometric voice authentication, robust end-to-end encryption, and continuous learning for anomaly detection ensures that both user data and communication integrity are rigorously protected against unauthorized access.

Multimodal Data Fusion: By combining voice, visual, and biometric sensor inputs, the system can produce comprehensive emotional state vectors and adapt its responses in real time. This multimodal approach enhances the overall quality and relevance of the digital companion's interactions.

Dynamic Profile Customization and Real-time Adaptability: The capability to activate dynamic profile effects with instant updates allows for real-time customization of user experiences, ensuring that interactions remain up-to-date with user preferences and contextual information such as geolocation.

Support for Novel Interaction Paradigms: With built-in techniques for processing biometric arousal data and generating corresponding tactile feedback, one implementation supports innovative forms of sensory communication, including applications in areas like erotic response protocols, thereby broadening the scope of user engagement.

Continuous Improvement Through Learning: The system's use of reinforcement learning, continual conversation log analysis, and feedback-adjusted neural network models ensures that performance improves over time, adapting to evolving user behaviors and environmental changes.

These advantages collectively contribute to a robust, secure, and highly adaptive system that merges state-of-the-art digital communication technologies with immersive, personalized user experiences.

BRIEF DESCRIPTION OF DRAWINGS

FIG. 17 shows an exemplary flowchart of a secure enterprise data integration system with bidirectional CRM synchronization and field-level access controls.

FIG. 18 shows an exemplary flowchart of a synthetic voice testing environment.

FIG. 29 shows an exemplary flowchart depicting the process of adding and displaying an avatar decoration on a user's profile in a communication platform.

FIG. 30 shows an exemplary flowchart depicting a process from start to end for integrating merchandise interfaces, displaying items, processing transactions, and arranging delivery.

FIG. 31 shows an exemplary flowchart illustrating the process of determining server access based on account age.

FIG. 32 shows an exemplary flowchart illustrating the process of creating and sending a customized rich embedded message within a communication platform.

FIG. 41 shows an exemplary flowchart outlining steps for integrating and monetizing game development within a communication platform.

FIG. 42 shows an exemplary flowchart depicting a process for a limited-time item shop within a communication platform with several steps from start to end.

FIG. 45 shows an exemplary flowchart illustrating the creation and implementation of an AI-powered moderation assistant.

FIG. 46 shows an exemplary flowchart describing a system that collects biometric arousal data.

DETAILED DESCRIPTION OF THE INVENTION

Figure 1:
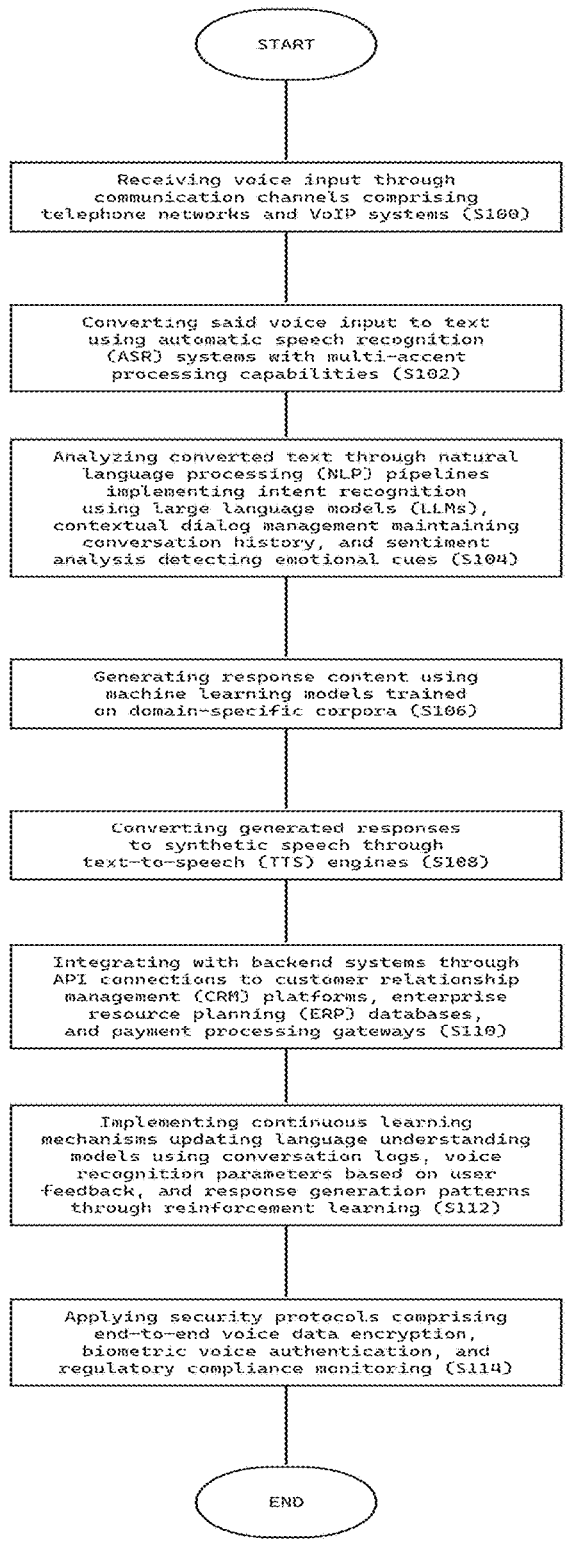
FIG. 1 shows an exemplary outlining steps for processing and responding to voice input using AI technologies.

In FIG. 1, the disclosed system includes a component which is configured to receive voice input via communication channels S100. In one embodiment, this component accepts incoming audio data through established telephone networks as well as Voice over Internet Protocol (VoIP) systems. It provides a reliable gateway for transmitting raw voice signals into subsequent processing modules, thereby ensuring that input from diverse telecommunication infrastructures can be effectively handled for further conversion and analysis. The disclosed system includes a component, designated S102, that is responsible for converting voice input into text. In this embodiment, once voice signals are received, they are processed by an automatic speech recognition system specifically engineered to support multiple accents. This capability allows the system to accurately transcribe spoken words from users with diverse linguistic backgrounds. By effectively transforming audio signals from telephone or VoIP communications into text, the output becomes readily available for subsequent analysis by natural language processing modules that refine the user interaction experience. The disclosed one implementation provides a system for processing voice input from various communication channels, including telephone and VoIP networks, to generate contextually aware and personalized responses. In one embodiment, the system converts received voice input to text using advanced automatic speech recognition with support for multiple accents. The converted text is then subjected to analysis through natural language processing pipelines, which identify the user's intent, maintain context through continuous dialogue history, and perform sentiment analysis based on detected emotional cues. Following this analysis, domain-specific machine learning models generate appropriate response content that is rendered into synthetic speech via text-to-speech engines. The system further integrates with customer relationship management, enterprise resource planning, and payment systems through secure API connections, while continuously learning from conversation logs and user feedback through reinforcement learning techniques. In addition, various embodiments extend the capabilities of the system to include dynamic profile effects, biometric arousal data collection for behavioral modulation, and an AI companion that adapts responses using multi-modal sensor inputs. Within the overall system S104 describes the analytical component that processes text converted from voice input. This analysis involves running the text through natural language processing pipelines that implement intent recognition using large language models, enabling the system to understand the user's purpose accurately. The module also manages the dialogue context by maintaining conversation history, which ensures responses are relevant to the ongoing interaction, and performs sentiment analysis to capture the emotional nuances expressed by the user. Collectively, these functions under reference label S104 allow the system to derive a detailed understanding of the user input, thereby enhancing response precision and facilitating a seamless, human-like conversational experience. The system generates response content by employing machine learning models that have been trained on domain-specific corpora S106. In this embodiment, data representing the vocabulary and contextual nuances of a specific industry or subject area is used to train the models, enabling them to produce responses that adhere to the specialized language, conventions, and terminologies of that domain. The generation process involves analyzing the conversation context and selecting the most appropriate phrases and constructs from the trained model to construct coherent and contextually apt responses. This approach ensures that the produced responses meet the expectations of precision and relevance inherent in the targeted domain, thereby enhancing the overall effectiveness and reliability of the system's communication capabilities. The system converts generated textual responses into audible output utilizing text-to-speech engines as disclosed in reference label S108. The TTS engines receive the generated response content and process the text into synthetic speech using established speech synthesis techniques that ensure clear and natural vocal intonation. This conversion allows the response to be delivered in an embodied oral format, thereby enabling interactive communication through auditory channels. In one embodiment, the system is designed to interface with various external backend systems via secure API connections. For example, the integration module is configured to facilitate seamless communication between the voice-driven application and enterprise-level systems, including customer relationship management platforms, enterprise resource planning databases, and payment processing gateways, as illustrated by reference label S110. This design enables the system to exchange transactional, customer, and operational data in real time, supporting efficient, automated backend processing while ensuring robust security measures and regulatory compliance. The system continuously refines its language understanding capabilities by analyzing conversation logs to identify emerging patterns and gaps in dialog performance. Based on user feedback, voice recognition parameters are adaptively tuned, ensuring that the system maintains accuracy despite variations in input quality and accent. Reinforcement learning is applied to optimize response generation, enabling the dialogue model to adjust its output in real time according to observed interaction outcomes. These processes, collectively described under S112, ensure that the language understanding models evolve dynamically, thereby improving overall system performance during ongoing operational use. In another embodiment, digital voice input is processed using neural network architectures that perform semantic extraction and manage conversation context, enabling advanced dialogue capabilities and real-time adjustments based on user interactions and biometric feedback. The system further enhances user personalization by applying dynamic profile effects, integrating biometric arousal data, and adjusting tactile feedback using reinforcement learning. Additional components of one implementation facilitate the generation of erotic response protocols and the deployment of AI companion systems that gather multi-modal behavioral data to dynamically adjust responses using ensemble learning architectures. The system is designed to operate securely and efficiently in a variety of networked environments, providing a seamless and engaging user experience. Reference S114 describes applying security protocols that comprise the use of end-to-end voice data encryption to secure communications, the employment of biometric voice authentication to verify the identity of users based on unique vocal characteristics, and the implementation of regulatory compliance monitoring to ensure that voice communication and data processing operations adhere to applicable legal and technical standards.

Figure 2:
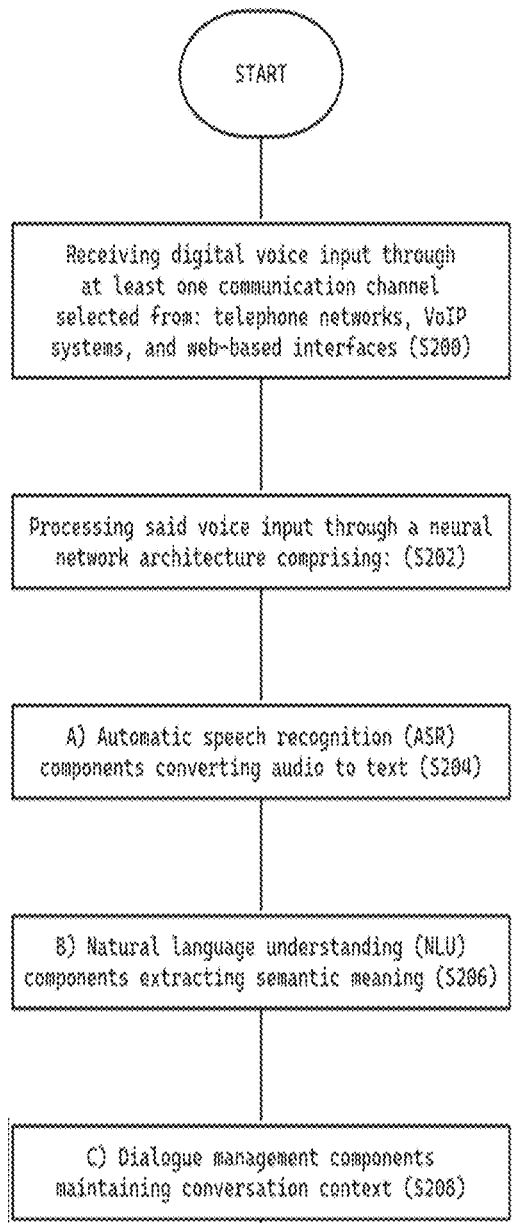
FIG. 2 shows an exemplary illustrating a comprehensive AI system for voice processing.

FIG. 2 illustrates the following references: a flowchart depicting a comprehensive AI system for voice processing, response generation, API integration, and security deployment. The system receives digital voice input through various communication channels, including telephone networks, VoIP systems, and web-based interfaces S200. This capability enables versatile integration with different platforms, ensuring robust compatibility and accessibility in diverse communication environments. The system processes the received voice input through a neural network architecture S202. This involves converting the audio to text via automatic speech recognition components, extracting semantic meaning using natural language understanding components, and maintaining conversation context with dialogue management components. The system incorporates automatic speech recognition (ASR) components designed to transform audio input into text S204. This process uses advanced speech recognition techniques and neural network architectures to ensure accurate conversion across diverse communication channels. The ASR components facilitate the initial step in processing voice data by extracting textual information from audio signals, forming the foundation for subsequent natural language understanding and dialogue management processes. The natural language understanding (NLU) components are responsible for extracting semantic meaning from the processed voice input S206. These components analyze the converted text to determine its underlying intent and contextual information, enabling accurate interpretation of user commands or queries. Dialogue management components maintaining conversation context S208 pertains to a component within the system that focuses on managing dialogues effectively. It is responsible for maintaining the context of conversations, ensuring that exchanges are coherent and relevant throughout interactions. This component plays a key role in the system's ability to keep track of previous inputs and outputs, supporting seamless and contextually aware communication with users.

Figure 3:
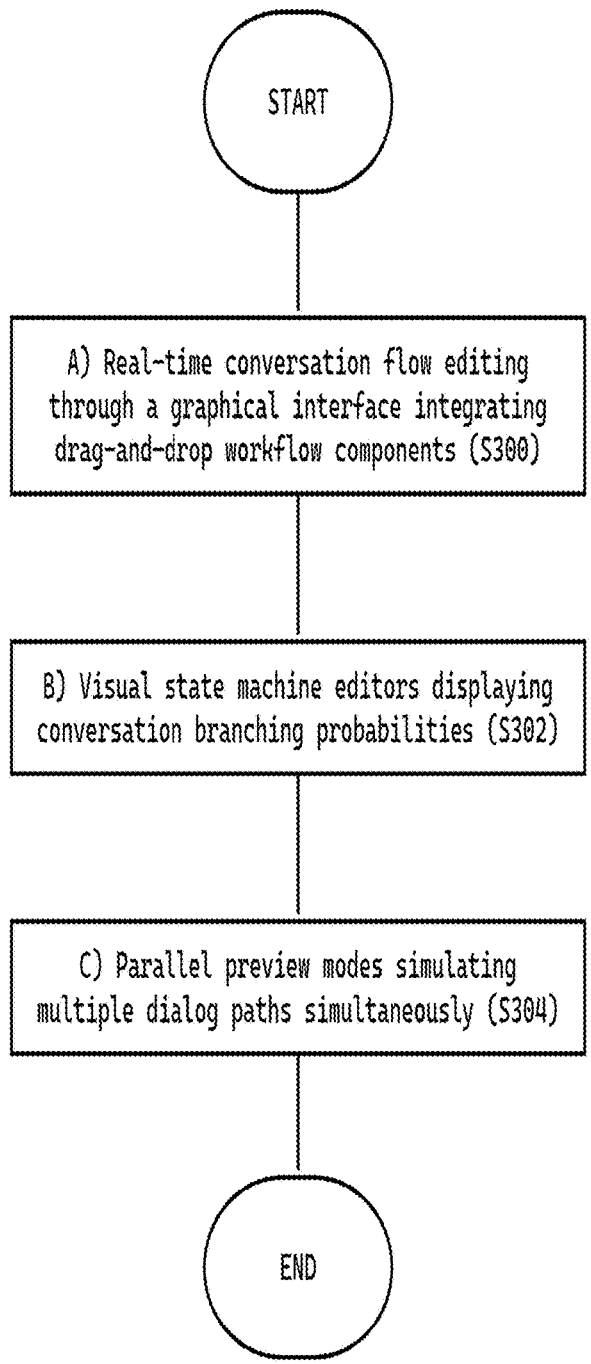
FIG. 3 shows an exemplary flowchart featuring tools for real-time conversation design.

FIG. 3 shows an exemplary flowchart featuring tools for real-time conversation design. The disclosed system provides a real-time interface for editing conversation flows S300. This graphical interface incorporates drag-and-drop workflow components, allowing users to dynamically adjust and refine dialog interactions seamlessly. The interface is designed to facilitate intuitive modifications, enhancing the flexibility and responsiveness of conversational designs. The embodiment relates to the implementation of visual state machine editors configured to display conversation branching probabilities S302. These editors provide a graphical representation of potential dialogue paths, enabling users to visualize and anticipate various conversational outcomes. This feature supports a thorough comprehension and management of complex interactions within the system, offering insights into how conversations evolve based on different input scenarios. The editors' ability to clearly depict branching probabilities encourages sound decision-making and the refinement of dialogue strategies. The embodiment involves a feature where parallel preview modes are implemented to simulate multiple dialog paths simultaneously S304. This allows for the visualization and testing of different conversation outcomes, enabling users to explore various dialogue scenarios within the system efficiently. The functionality ensures that multiple conversational strategies can be evaluated in parallel, facilitating enhanced dialogue management and response optimization.

Figure 4:
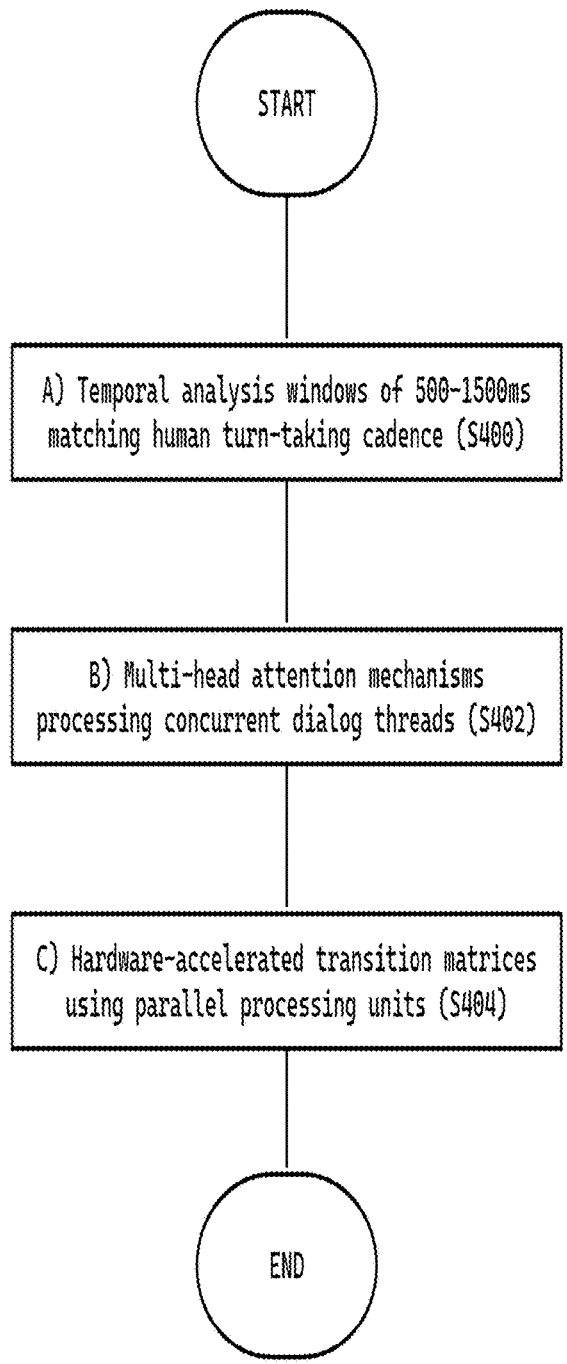
FIG. 4 shows an exemplary depicting an AI interaction sequence with temporal analysis.

FIG. 4 illustrates the following references: a flowchart depicting an AI interaction sequence with temporal analysis using windows of 500-1500 ms to match human turn-taking cadence, multi-head attention mechanisms for processing concurrent dialog threads, and hardware-accelerated transition matrices utilizing parallel processing units. The system initiates interaction by utilizing temporal analysis windows that range from 500 to 1500 milliseconds S400. This duration is selected to closely align with typical human turn-taking behavior during conversations, facilitating seamless communication patterns. The multi-head attention mechanisms process concurrent dialog threads, enabling the system to manage multiple conversations simultaneously S402. This approach allows for efficient handling of parallel dialogues, ensuring that interactions remain smooth and responsive. The mechanisms optimize dialogue processing by distributing the computational load across multiple attention heads, which enhances the system's ability to maintain context and coherence during interactions. The system employs hardware-accelerated transition matrices that utilize parallel processing units S404. These components enable efficient computation by managing multiple processes simultaneously, optimizing dialog management throughout the AI interaction sequence. This design bolsters the system's capacity to handle complex and concurrent dialogue threads, culminating in elevated performance and responsiveness.

Figure 5:
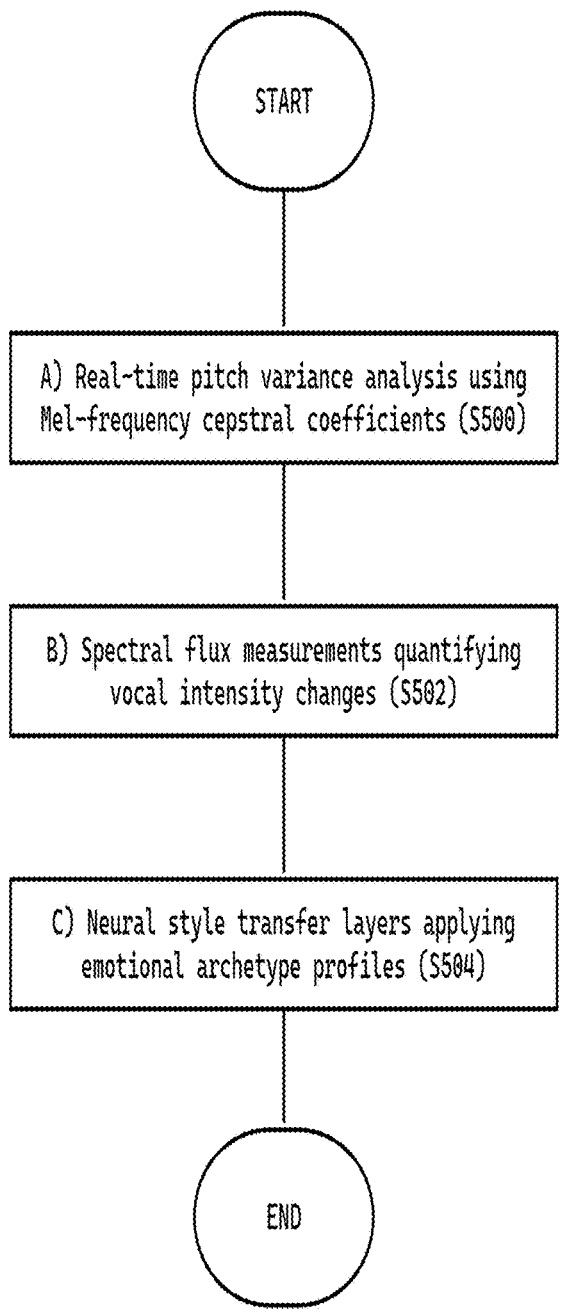
FIG. 5 shows an exemplary with steps for analyzing pitch variance.

FIG. 5 illustrates the flowchart for analyzing pitch variance using Mel-frequency cepstral coefficients, measuring spectral flux to quantify vocal intensity changes, and applying neural style transfer layers with emotional archetype profiles. The process begins with real-time pitch variance analysis, employing Mel-frequency cepstral coefficients to evaluate pitch variations in audio data S500. This approach is essential for accurately assessing nuances in vocal delivery, enabling the system to detect subtle changes that indicate shifts in emotional tone or speaker intent. By leveraging these coefficients, the system finely tunes its understanding of vocal characteristics in live environments. The embodiment includes spectral flux measurements, which focus on quantifying vocal intensity variations S502. This process observes changes in energy across different frequencies, allowing for the assessment of how vocal intensity fluctuates over time. By analyzing these variations, the system can effectively interpret emotional cues and other dynamics present in spoken inputs, contributing to a more nuanced understanding of user interactions. The system employs neural style transfer layers to apply emotional archetype profiles S504. This process uses machine learning techniques to transform vocal inputs in a way that aligns them with predefined emotional styles. The goal is to enhance the interaction by modulating the input based on emotional cues, providing a more dynamic and contextually appropriate response in communication applications.

Figure 6:
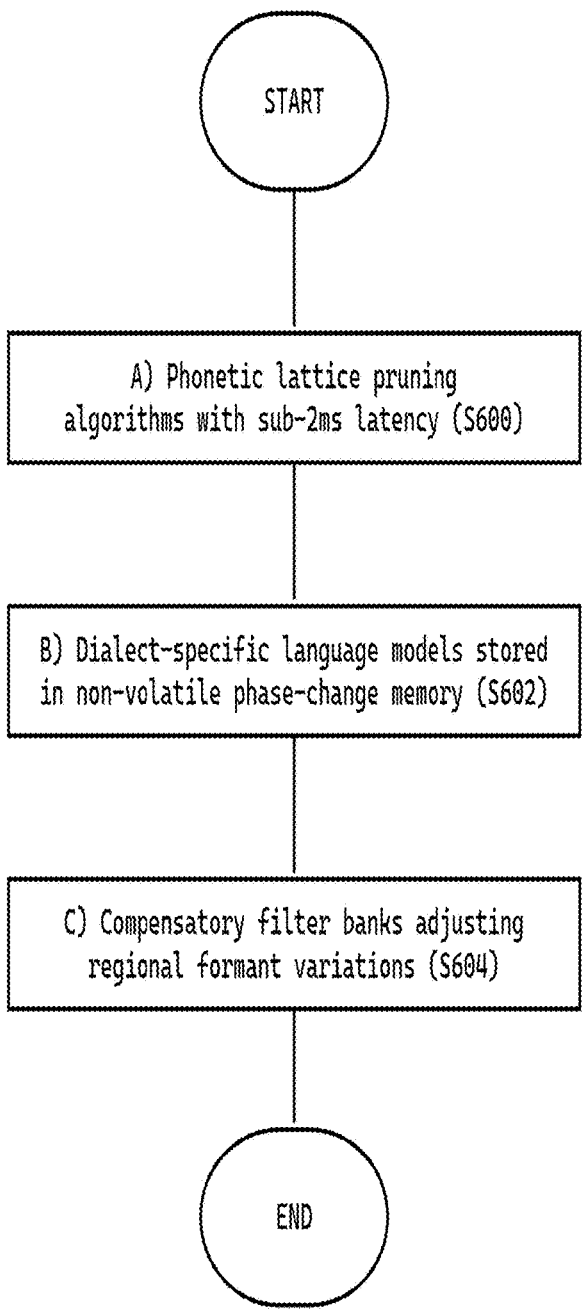
FIG. 6 shows an exemplary flowchart of a low-latency speech recognition system with dialect adaptation and regional accent normalization.

FIG. 6 Shows an exemplary flowchart of a low-latency speech recognition system with dialect adaptation and regional accent normalization. The embodiment depicted involves the utilization of phonetic lattice pruning algorithms, designed to operate with latency under two milliseconds S600. These algorithms efficiently manage pronunciation variants in speech recognition systems, enhancing processing speed and accuracy by swiftly eliminating improbable phonetic candidates. In this embodiment, dialect-specific language models are utilized and stored within a non-volatile phase-change memory S602. This technique enables efficient retrieval and use of language models tailored to specific regional dialects, ensuring that speech recognition is both accurate and contextually relevant. The use of non-volatile phase-change memory enhances the system's ability to retain these models even without a power supply, providing reliable performance and quick accessibility. Compensatory filter banks adjusting regional formant variations relates to a process that employs compensatory filter banks S604. These filter banks are utilized to adjust variations in speech formants based on different regional dialects or accents. This adjustment helps ensure that speech recognition systems can accurately interpret and process audio input despite the presence of diverse linguistic nuances due to geographical differences among speakers.

Figure 7:
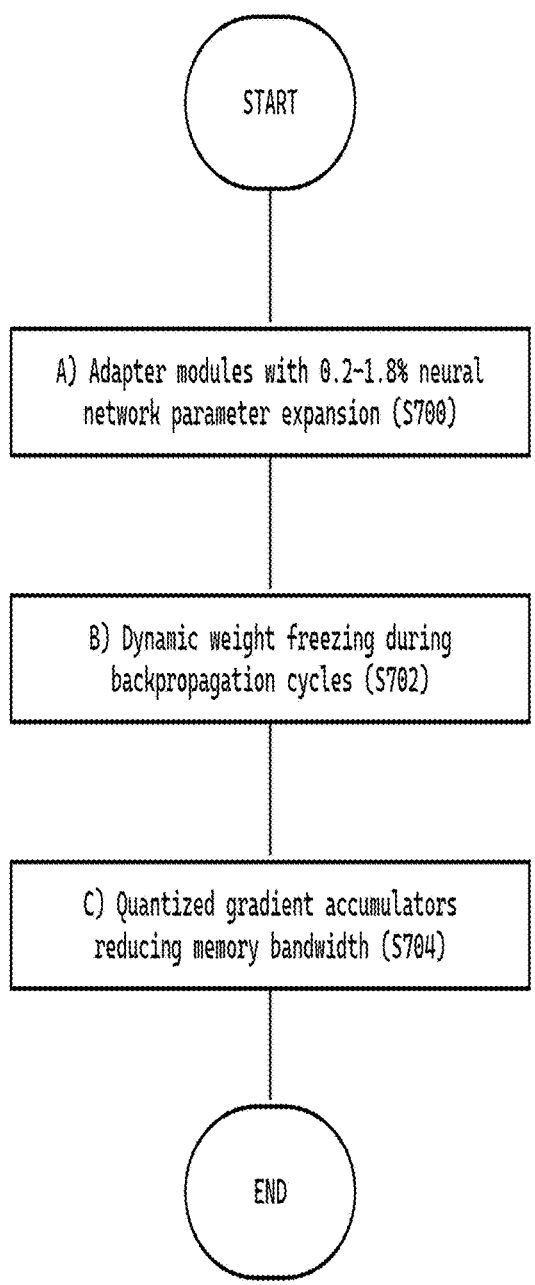
FIG. 7 shows an exemplary with steps for neural network optimization.

FIG. 7 Shows an exemplary with steps for neural network optimization. The adapter modules are designed to augment neural networks by expanding their parameters within a range of 0.2 to 1.8 percent S700. This increase allows for greater adaptability and precision in processing data without significantly raising the overall system complexity. By optimizing parameter allocation, these modules enable more efficient utilization of neural network resources, thereby facilitating advanced computational tasks with minimal latency. Dynamic weight freezing during backpropagation cycles S702 pertains to a method within the neural network optimization process. This technique involves selectively locking certain neural network weights during backpropagation. By doing so, it stabilizes the learning process and helps preserve already beneficial parameters, thereby potentially improving the efficiency and accuracy of the training cycle. Quantized gradient accumulators reducing memory bandwidth S704 pertains to a method within the system designed to optimize neural network performance. This involves using quantized gradient accumulators, which are mechanisms that handle the accumulation of gradients during neural network training. The primary purpose of these accumulators is to minimize the required memory bandwidth, thereby enhancing computational efficiency and speeding up the overall processing time of the neural network.

Figure 8:
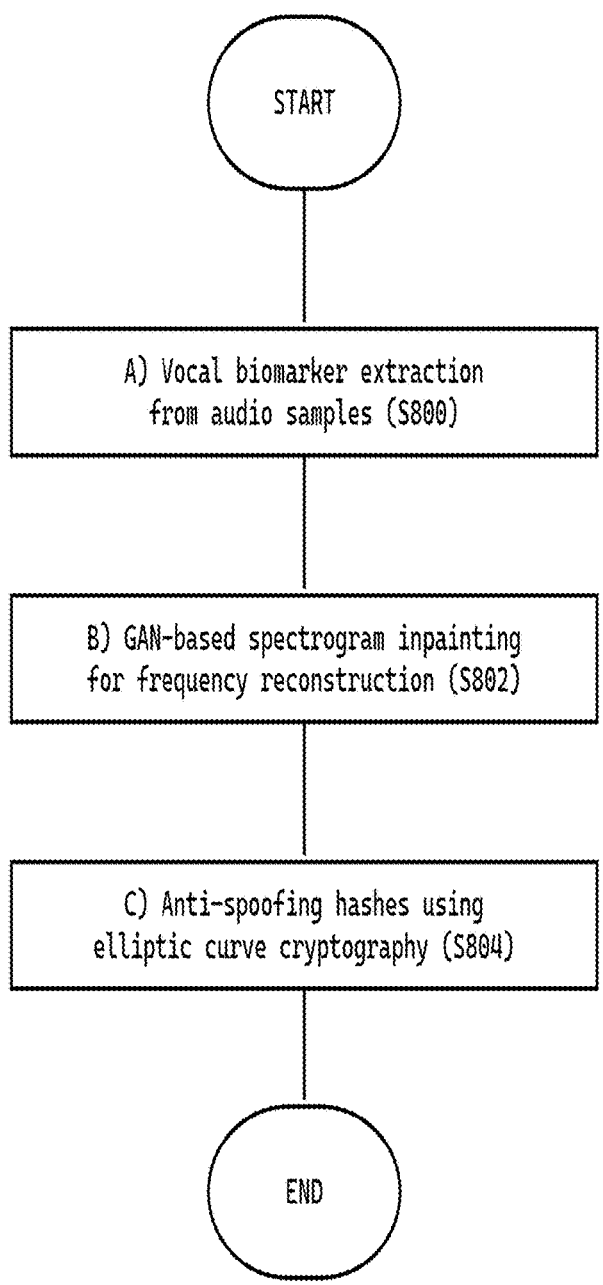
FIG. 8 shows an exemplary flowchart of an audio analysis platform with security features.

FIG. 8 Shows an exemplary flowchart of an audio analysis platform with security features. The system begins by extracting vocal biomarkers from audio samples S800. This process is instrumental in analyzing specific voice characteristics, such as pitch, tone, and other acoustic features that can reveal insights into the user's emotional and physiological state. These extracted biomarkers are fundamental for tailoring user interactions and enhancing the overall communication experience within the system. In this embodiment, the system utilizes GAN-based spectrogram inpainting for frequency reconstruction to enhance audio signal quality S800. The process involves generating missing or corrupted parts of spectrograms using a generative adversarial network. This technology assists in restoring and reconstructing frequency information, thereby improving the overall accuracy and clarity of voice data analysis. The disclosed system incorporates a component for generating anti-spoofing hashes using elliptic curve cryptography S804. This feature involves creating cryptographic hashes designed to prevent spurious or fraudulent access attempts. By utilizing elliptic curve cryptography, the system enhances security measures, ensuring robust protection against spoofing attacks. These hashes are part of a secure authentication mechanism that helps maintain integrity and confidentiality within the system's operations.

Figure 9:
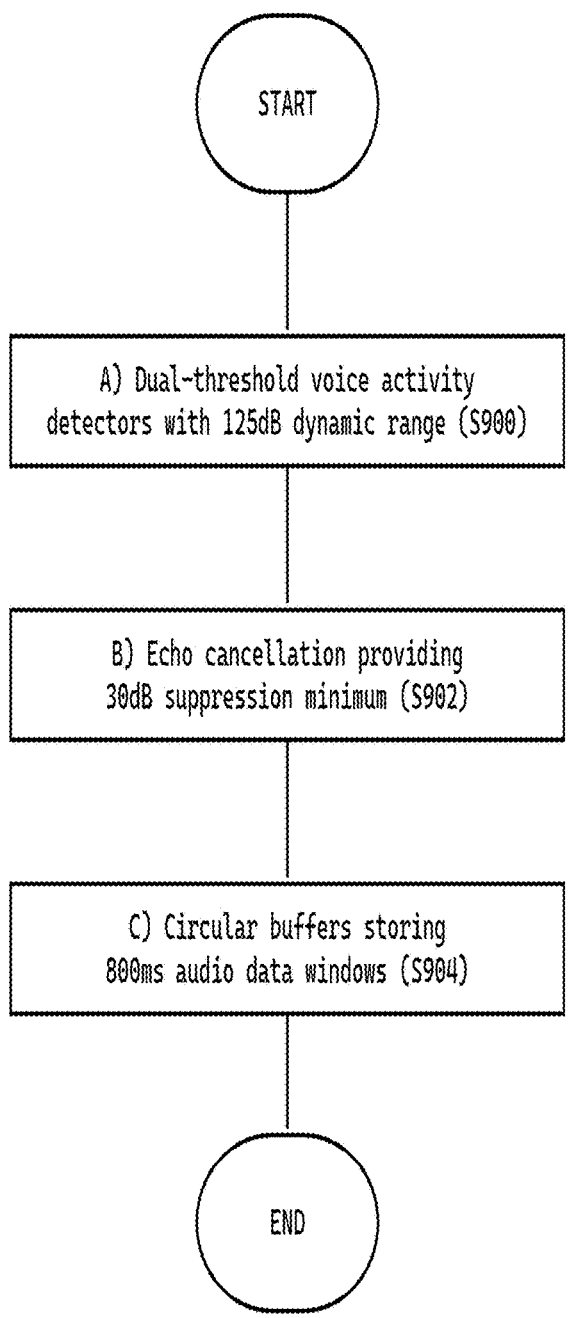
FIG. 9 shows an exemplary flowchart of a voice capture system with noise suppression technology.

FIG. 9 Shows an exemplary flowchart of a voice capture system with noise suppression technology. The embodiment begins with the use of dual-threshold voice activity detectors, which operate with a dynamic range of 125 Db S900. This feature is designed to effectively differentiate between speech and background noise by employing two distinct thresholds, allowing for precise detection and clarity in audio data processing. Echo cancellation providing 30 dB suppression minimum S902 describes a method or component within the system aimed at reducing echoes in audio processing. This technique involves utilizing algorithms to identify and minimize echo artifacts, ensuring a clearer audio transmission. The process achieves a minimum suppression level of 30 decibels, which contributes to enhanced audio quality and more effective communication across platforms. In one embodiment, the system incorporates circular buffers to store audio data windows of 800 milliseconds S904. These buffers facilitate efficient handling of audio streams by temporarily holding data for processing. The use of circular buffers ensures seamless audio playback and recording, preventing data loss during transfer. This approach is essential for maintaining audio integrity, especially in situations requiring real-time processing.

Figure 10:
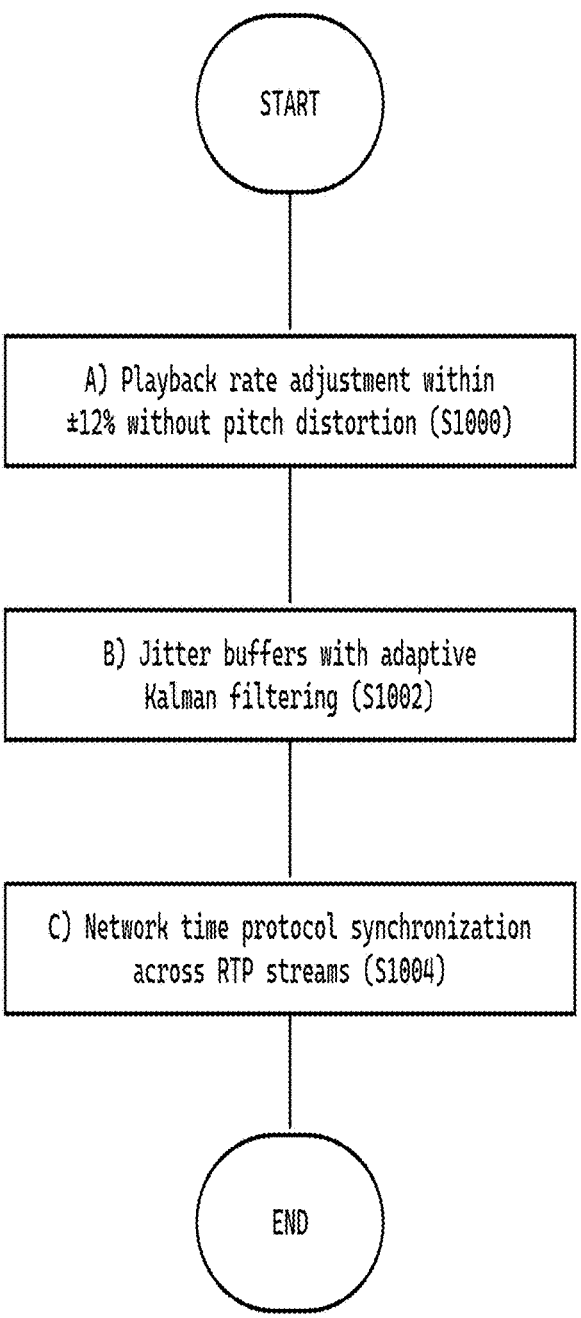
FIG. 10 shows an exemplary flowchart of an adaptive audio playback and streaming system with distortion-free rate control and network synchronization.

FIG. 10 illustrates the process of playback rate adjustment within ±12% without pitch distortion, the implementation of jitter buffers with adaptive Kalman filtering, and the synchronization of network time protocol across RTP streams. The playback rate adjustment within ±12% without pitch distortion S1000 pertains to a process in which the playback rate of audio is altered by up to ±12%. This adjustment is achieved without distorting the pitch, allowing the audio playback speed to be modified while maintaining the natural sound quality and preserving the temporal and spectral properties of the original recording. This ability is vital for applications that require flexible audio manipulation without compromising fidelity. The flowchart diagram illustrates a method where jitter buffers are implemented with adaptive Kalman filtering, labeled as step S1002. This step involves managing the buffering of data to compensate for potential variability in data transmission. Adaptive Kalman filtering techniques are applied to dynamically adjust these buffers, ensuring stable and reliable communication, particularly in real-time data environments. The system incorporates a method to synchronize real-time transport protocol (RTP) streams using the network time protocol (NTP) S1004. This synchronization ensures that the playback across different devices is accurately aligned in time, maintaining consistency in audio delivery. By employing NTP, the system can adjust for any discrepancies and delays that occur over network transmission, effectively minimizing issues of latency and timing errors, thereby enhancing the overall streaming quality.

Figure 11:
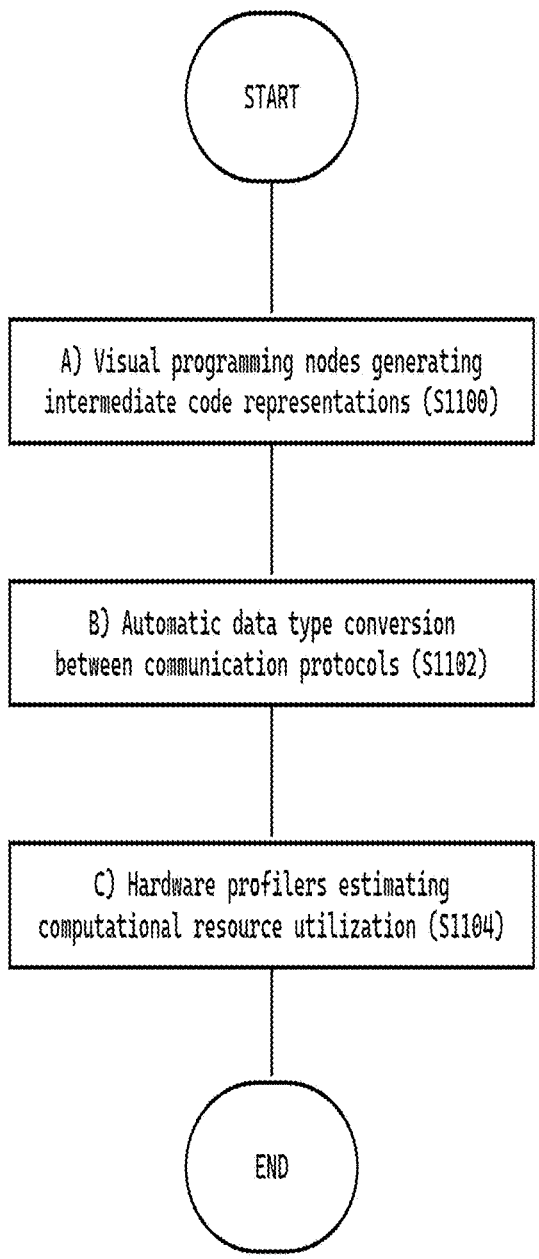
FIG. 11 shows an exemplary flowchart of a visual programming interface with protocol-agnostic data processing and resource optimization capabilities.

FIG. 11 illustrates a flowchart with steps involving visual programming, data type conversion, and hardware profiling. The disclosed process includes visual programming nodes that are designed to generate intermediate code representations S1100. These nodes facilitate the conversion of conceptual models into executable code structures, enhancing the efficiency of software development workflows. They serve as integral components within a visual programming environment, allowing for the intuitive design and modification of code without extensive manual scripting. This capability supports seamless integration and streamlining of complex computational tasks within the system. The process identifies a step involving the conversion of data types across different communication protocols S1102 involves automatically translating the format of data to ensure compatibility and seamless interaction between diverse systems or interfaces. The process involves employing hardware profilers to estimate the utilization of computational resources S1104, plays an integral role in assessing how the system's hardware components are used during operations. By analyzing resource consumption, the system can optimize performance and efficiency, ensuring that computational tasks are executed effectively without exceeding available capacity.

Figure 12:
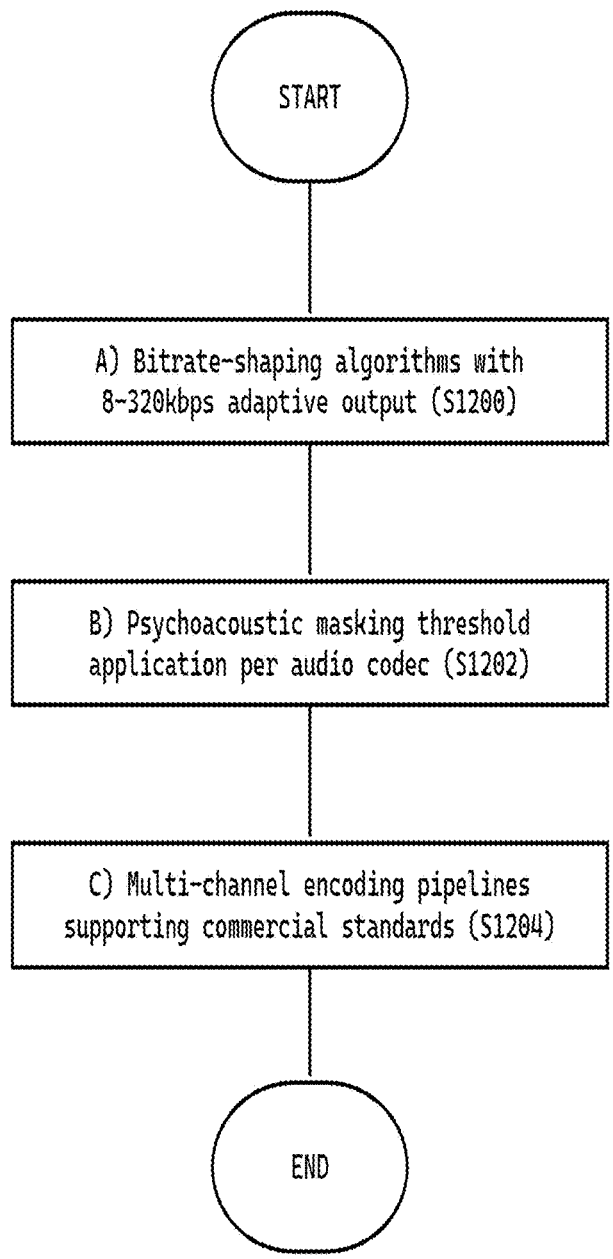
FIG. 12 shows an exemplary flowchart of an adaptive audio encoding solution.

FIG. 12 illustrates the following references: (A) bitrate-shaping algorithms with 8-320 kbps adaptive output, (B) psychoacoustic masking threshold application per audio codec, and (C) multi-channel encoding pipelines supporting commercial standards. The flowchart illustrates the implementation of bitrate-shaping algorithms designed for audio processing S1200. These algorithms adjust the bitrate dynamically within an 8-320 kbps range to optimize output quality and resource utilization. This mechanism ensures adaptability according to network conditions and application requirements, contributing to enhanced audio delivery performance. The embodiment includes the application of psychoacoustic masking thresholds tailored to each audio codec S1202. This process involves analyzing sound characteristics to determine specific threshold levels at which audio signals are perceived, minimizing unnecessary data transmission while maintaining auditory quality. The Multi-channel encoding pipelines supporting commercial standards S1204 denotes a process involving the use of encoding pipelines designed to handle multiple channels. These pipelines are structured to comply with commercial standards, ensuring that the encoding output is robust and compatible with industry requirements. By supporting multi-channel data, this system allows for efficient transmission and processing of audio or video content in complex digital environments.

Figure 13:
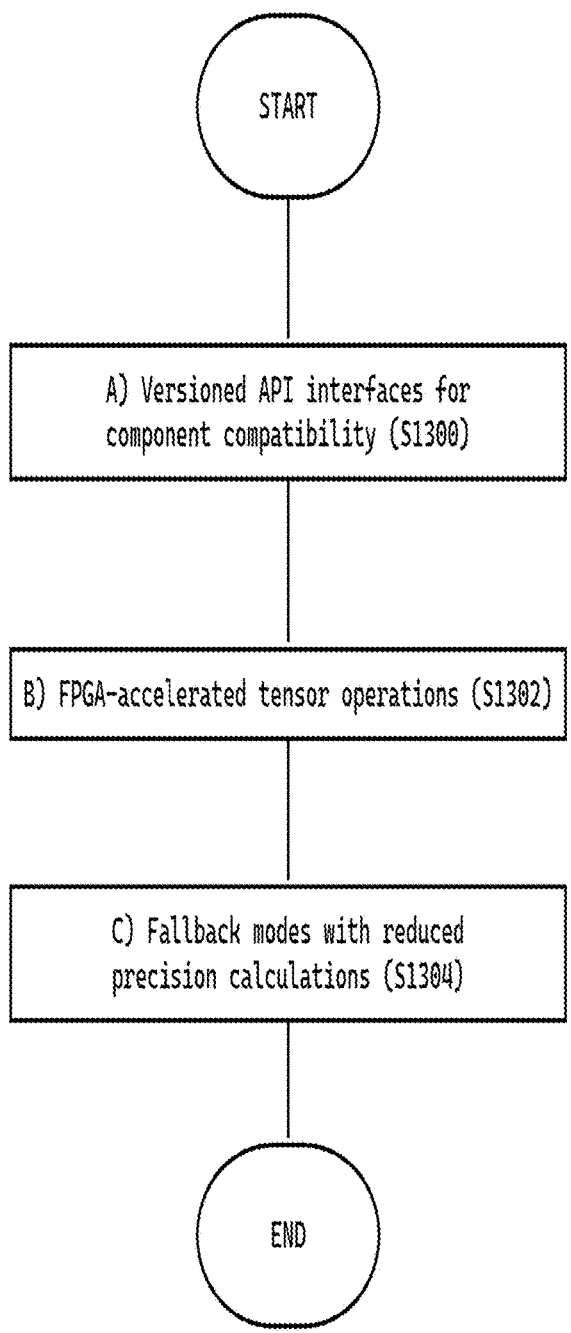
FIG. 13 shows an exemplary flowchart of a reliability-focused system architecture.

FIG. 13 Shows an exemplary flowchart of a reliability-focused system architecture. The embodiment illustrated in the Fig. depicts the implementation of versioned API interfaces designed to ensure component compatibility S1300. This allows for seamless integration and interaction between various system components, facilitating consistent and reliable performance across different versions. One implementation utilizes FPGA-accelerated tensor operations to enable the system to execute computations with enhanced speed and efficiency S1302. This method leverages Field-Programmable Gate Arrays (FPGAs) to speed up tensor computational tasks, which are central to managing complex data processing in the artificial intelligence models used by the system. By implementing FPGA technology, the operations gain increased parallelism and reduced latency, thereby significantly boosting overall system performance in data-intensive applications. This enhancement is especially beneficial for tasks that require real-time processing, ensuring that machine learning models perform at optimal levels. In this embodiment, the system incorporates fallback modes that utilize reduced precision calculations S1304. This is achieved through the implementation of adaptive algorithms capable of maintaining performance even when computational resources are limited or under strain. Such fallback modes ensure efficient operation by dynamically adjusting processing precision, thereby balancing accuracy with available processing power. The approach optimizes resource usage while preserving system functionality, allowing for graceful degradation in computational tasks during peak demand or under constrained conditions.

Figure 14:
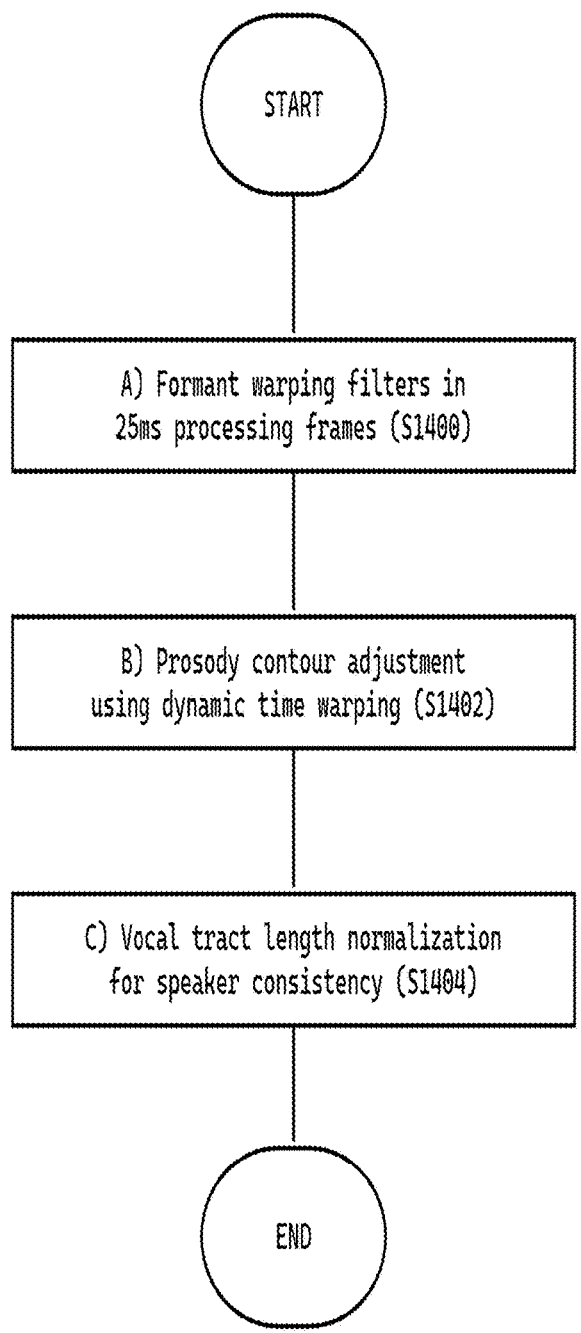
FIG. 14 shows an exemplary flowchart of a speech modification pipeline.

FIG. 14 Shows an exemplary flowchart of a speech modification pipeline. The system implements formant warping filters to process audio signals within 25-millisecond frames S1400. This approach allows for real-time manipulation and adjustment of vocal formants, which are essential in maintaining the clarity and consistency of speech across various accents and dialects. By swiftly modulating these aspects, the system ensures robust voice recognition and synthesis capabilities. The process involves modifying the prosody contour by employing dynamic time warping techniques S1402. This step targets the synchronization and alignment of diverse speech patterns, ensuring that fluctuations in rhythm and intonation are moderated for uniformity. This method plays a key role in preserving a natural speech flow while enhancing the overall clarity and coherence of synthesized voice outputs. The reference, "Vocal tract length normalization for speaker consistency", S1404 identifies a process within the system where adjustments are made to ensure uniformity in speaker characteristics. This process involves normalizing the vocal tract length across various speakers to maintain consistent voice quality or tone in the synthesized output. It plays an essential role in achieving speaker consistency for superior synthetic voice applications and is executed as part of the speech processing pipeline.

Figure 15:
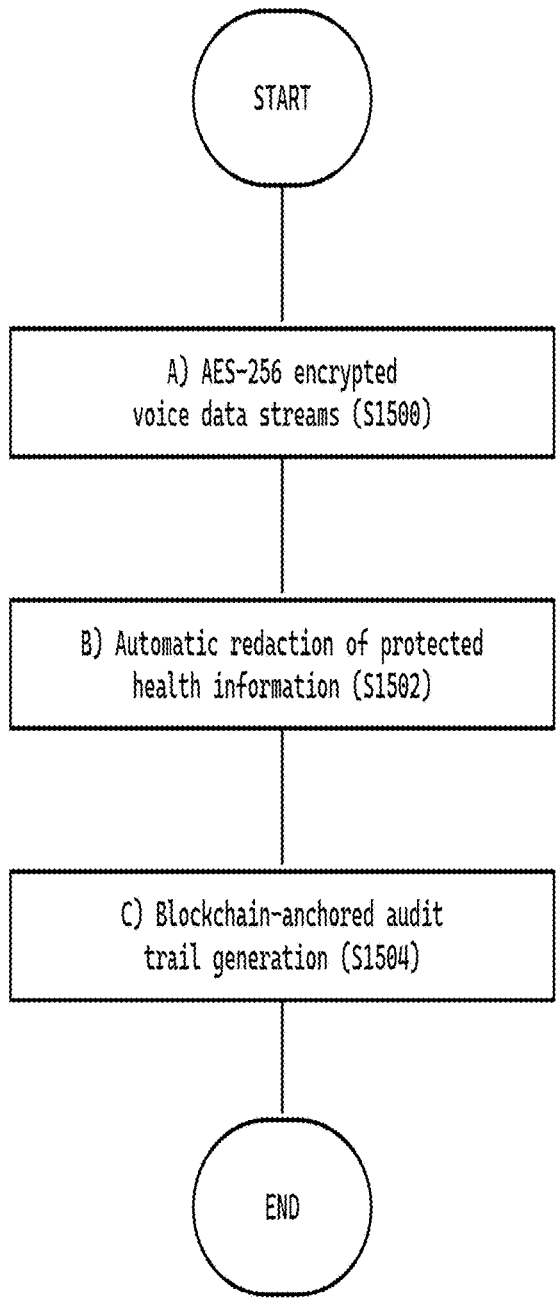
FIG. 15 shows an exemplary flowchart of a secure healthcare voice data processing system with encryption, PHI redaction, and tamper-proof auditing.

FIG. 15 Shows an exemplary flowchart of a secure healthcare voice data processing system with encryption, PHI redaction, and tamper-proof auditing. One implementation involves a sophisticated system employing AES-256 encryption to secure voice data streams S1500. This encryption mechanism ensures the protection of sensitive audio communication by safeguarding it against unauthorized access and potential breaches. By integrating this robust encryption standard, the system achieves a notable degree of data security, making it particularly suitable for environments that require strict confidentiality and integrity of voice data. In the disclosed system, an essential aspect involves the implementation of automatic redaction for protected health information S1502. This process ensures that sensitive data within voice interactions is appropriately masked or removed to maintain privacy and comply with relevant regulations. The redaction mechanism operates seamlessly within the system's security framework to protect confidential user information from unauthorized access or exposure. The blockchain-anchored audit trail generation S1504 entails the creation of a secure and immutable record of transactions or data activities. By utilizing blockchain technology, this mechanism ensures that each entry within the audit trail is time-stamped and cryptographically linked to the previous entry. This method enhances data integrity, allowing for transparent and tamper-proof tracking of actions taken within the system. The audit trail serves as a reliable log, providing an incontrovertible record that aids in regulatory compliance and forensic investigations.

Figure 16:
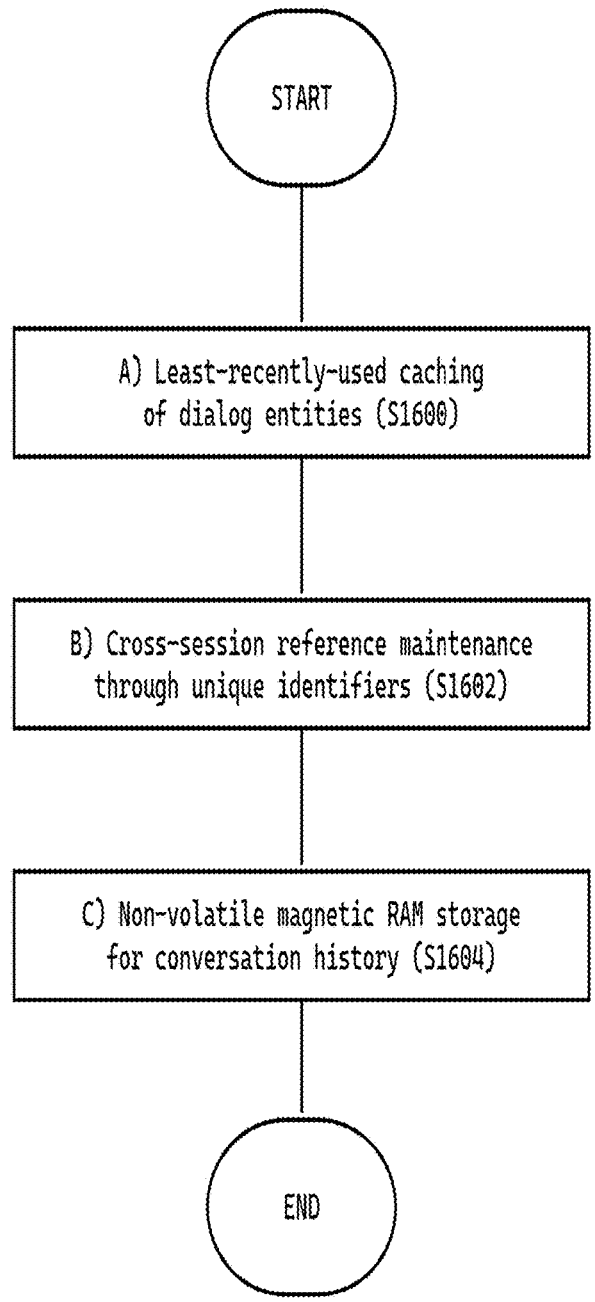
FIG. 16 shows flowchart diagram for AI systems showing steps for caching dialog entities, maintaining cross-session references, and storing conversation history.

FIG. 16 illustrates the flowchart diagram for AI systems, depicting steps for caching dialog entities using a least-recently-used method, maintaining cross-session references through unique identifiers, and storing conversation history in non-volatile magnetic RAM. The system implements a caching mechanism prioritizing the storage of dialog entities that are used less frequently S1600. This approach ensures efficient management of memory resources by retaining only the most pertinent conversation elements for immediate access. The least-recently-used dialog data is stored to optimize retrieval speed while maintaining the overall performance and responsiveness of the system during interactions. The system facilitates cross-session reference maintenance by utilizing unique identifiers S1602. This process ensures that conversations and interactions can be consistently traced and managed across different sessions, providing a seamless conversational experience for users. Non-volatile magnetic RAM storage for conversation history S1604 describes a system that utilizes non-volatile magnetic RAM to store conversation histories. This ensures that data is retained even in the event of power loss, providing reliable preservation of dialog records. By implementing magnetic RAM, the system benefits from quick access speeds and enhanced data durability, contributing to effective dialogue management and maintaining seamless interaction flows across sessions.

FIG. 17 illustrates the following processes: bidirectional synchronization with enterprise CRM systems, bulk API data transfer protocols, and OAuth scope enforcement for field-level security, between the start and end points. The reference label "Bidirectional synchronization with enterprise CRM systems" S1700 pertains to a process where data exchange occurs in both directions with enterprise Customer Relationship Management (CRM) systems. This ensures that information remains consistent and updated across the CRM and other integrated platforms, allowing for seamless interaction and real-time data accuracy. Bulk API data transfer protocols S1702 refers to a step involving the use of bulk API data transfer. This process is integral to efficiently exchanging large volumes of data, facilitating rapid and seamless communication between systems. By implementing these protocols, the system supports robust integration between different platforms, ensuring that data is reliably and swiftly synchronized. This step is part of a larger framework designed to enhance interoperability and optimize data handling within enterprise environments. The flowchart illustrates a process, "focusing on OAuth scope enforcement for field-level security" S1704. This involves implementing security protocols to ensure that data access within enterprise systems is controlled at a granular level. By enforcing OAuth scopes, the system restricts access based on predefined permissions, allowing only authorized interactions with specific data fields. This mechanism enhances security by ensuring that only necessary data is accessed and manipulated according to user permissions.

FIG. 18 illustrates the following references: synthetic accent generation using neural vocoders, controlled line noise injection at 15-35 dB SNR, and multi-lingual call completion testing protocols. The system commences with synthetic accent generation, employing neural vocoders to create diverse accent variations S1800. This process enhances voice interaction capabilities, allowing the system to emulate different speech patterns and accents. Through advanced machine learning techniques, the system effectively synthesizes voice outputs that are both realistic and varied, thus improving communication experiences across diverse linguistic backgrounds. The use of neural vocoders is integral to this functionality, enabling seamless adaptation to various accents as required by user interactions. The reference label "b) Controlled line noise injection at 15-35 dB SNR S1802" pertains to a method for introducing controlled levels of line noise into a communication channel. This process is carried out at a signal-to-noise ratio (SNR) ranging from 15 to 35 decibels, enabling testing and optimization of audio processing systems under varied noise conditions. The system incorporates multi-lingual call completion testing protocols to evaluate the performance and reliability of communication systems across different languages S1804. This involves simulating various scenarios to ensure accurate call connectivity and quality. The testing protocols employ diverse linguistic contexts to identify potential issues, facilitating improvements in handling calls bilingually or multilingually. This process ensures that users experience seamless interactions irrespective of their language preferences, enhancing overall communication efficiency.

Figure 19:
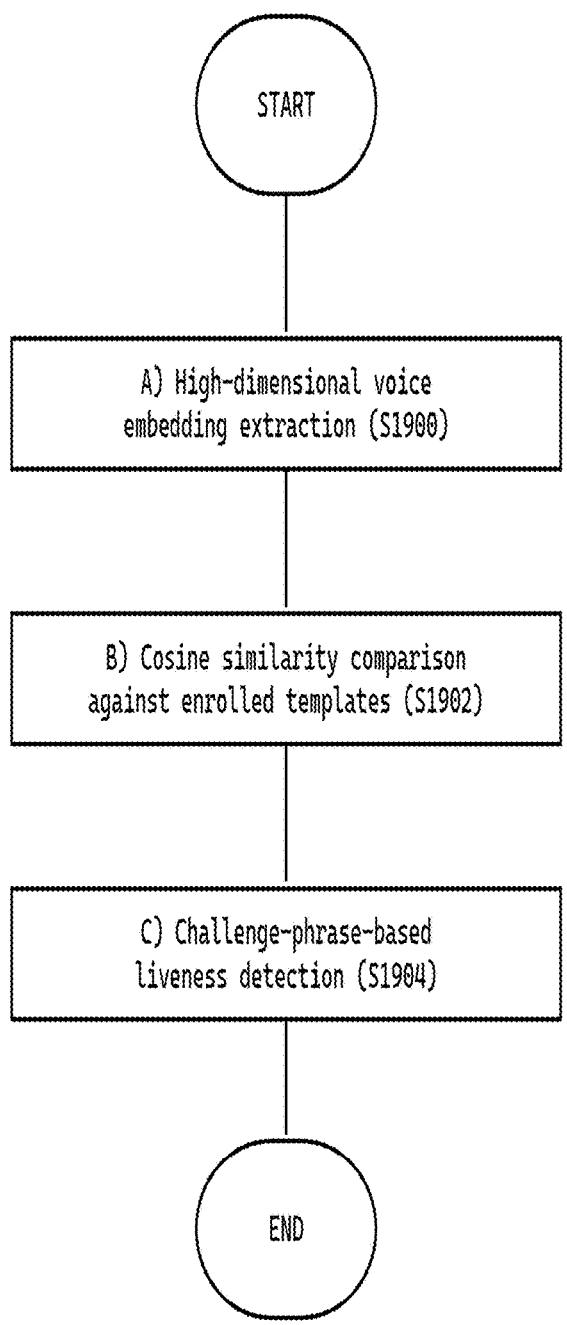
FIG. 19 shows flowchart with steps for voice processing including high-dimensional embedding extraction, cosine similarity, and liveness detection.

FIG. 19 illustrates a flowchart outlining the steps for voice processing, including the extraction of multidimensional embeddings, cosine similarity comparison against enrolled templates, and challenge-phrase-based liveness detection. The reference label "a) multi-dimensional voice embedding extraction S1900" refers to a process within the system wherein sophisticated techniques are applied to derive detailed voice embeddings. These embeddings capture elaborate features of the voice audio, which are used to augment data analysis and enhance subsequent processes such as authentication and recognition within the system. The reference label "b) Cosine similarity comparison against enrolled templates S1902" refers to a process within the voice processing system wherein multidimensional voice embeddings are compared against pre-enrolled templates. This process involves calculating cosine similarity to determine the degree of match between a new voice input and existing stored templates. This step is essential for verifying identity by assessing how closely the incoming voice data aligns with previously registered voice patterns. The system incorporates a method for liveness detection based on challenge phrases S1904. In this process, a user is prompted to speak specific phrases, which the system uses to ascertain whether the speaker is live and present. This approach heightens security by verifying dynamic interaction rather than relying solely on static data.

Figure 20:
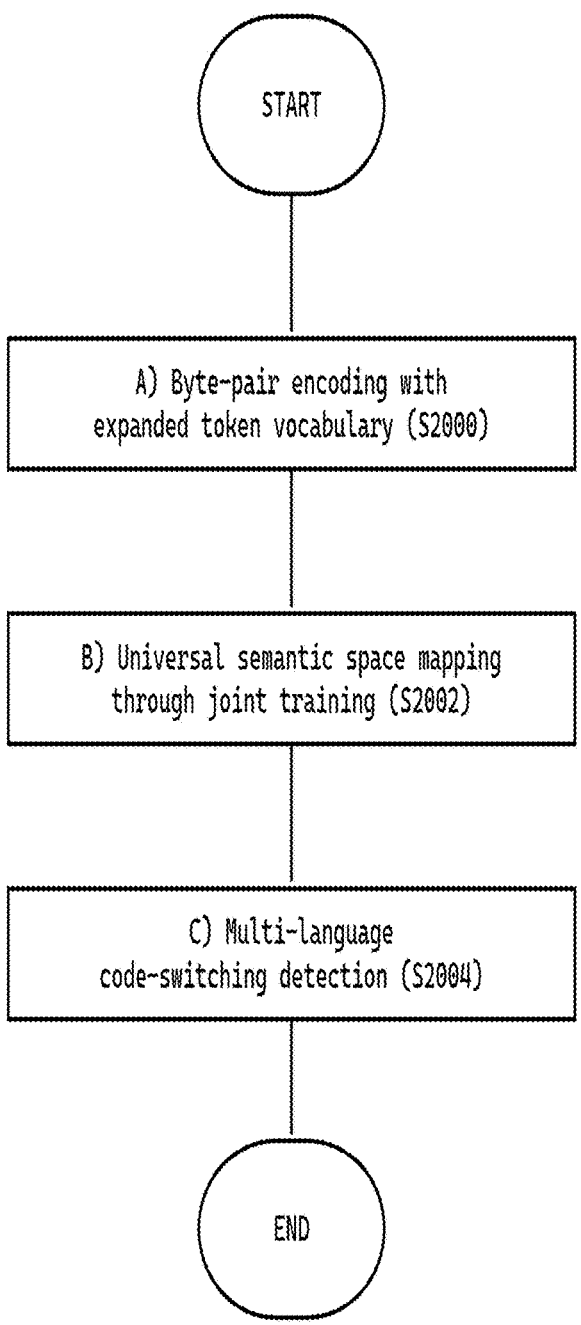
FIG. 20 shows flowchart with steps for byte-pair encoding, semantic space mapping, and code-switching detection.

FIG. 20 illustrates the process flow for byte-pair encoding with an expanded token vocabulary, universal semantic space mapping through joint training, and multi-language code-switching detection. The process commences with byte-pair encoding, which utilizes an expanded token vocabulary S2000. This approach is designed to augment the model's capacity to handle a broader range of linguistic inputs effectively. Byte-pair encoding forms a foundational step in processing and converting text data into a format better suited for analysis. Emphasizing an expanded token vocabulary allows the system to capture linguistic nuances more comprehensively, resulting in a heightened understanding and manipulation of language data in subsequent stages. The reference label "b) Universal semantic space mapping through joint training S2002" details a method within the system that involves creating a comprehensive semantic space. This space is generated by jointly training multiple models to ensure consistent understanding across languages. By doing so, it facilitates seamless integration of diverse language inputs into a unified processing framework. The process of multi-language code-switching detection involves analyzing input data to recognize instances where multiple languages are being used interchangeably S2004. This detection utilizes advanced algorithms designed to identify and differentiate between languages within a single communication flow, allowing for accurate processing and response generation in multilingual environments. By implementing this feature, systems can effectively manage input from diverse language sources and maintain seamless interactions across language barriers.

Figures 21, 22:
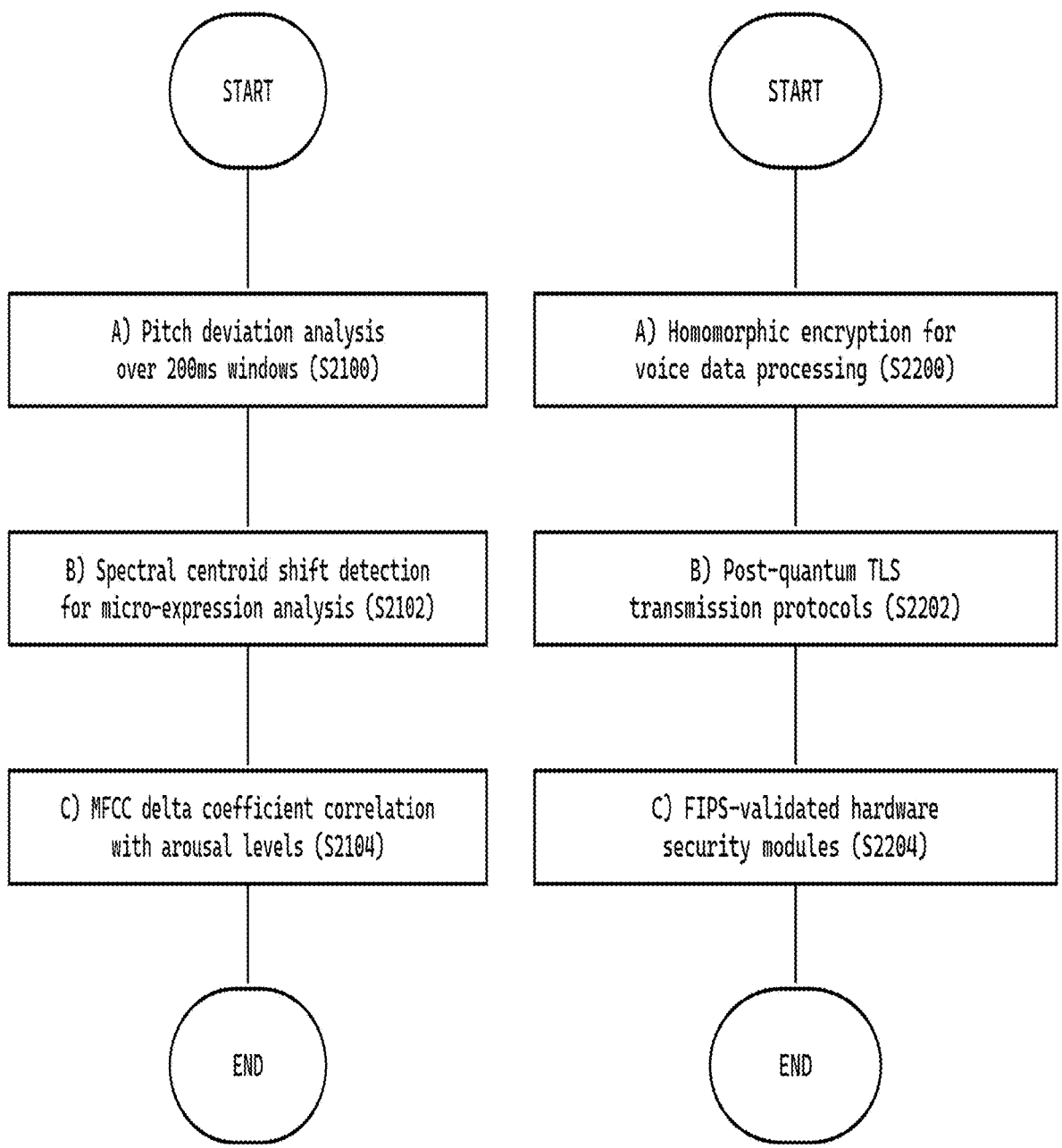
FIG. 21 shows flowchart depicting pitch deviation analysis, spectral centroid shift detection, and MFCC delta coefficient correlation with start and end points.
FIG. 22 shows an exemplary flowchart of a secure voice data infrastructure.

FIG. 21 illustrates a flowchart depicting the processes of pitch deviation analysis over 200 ms windows, spectral centroid shift detection for micro-expression analysis, and MFCC delta coefficient correlation with arousal levels. The process of pitch deviation analysis involves examining variations in audio pitch over a set window of 200 milliseconds S2100. This analysis is designed to detect shifts in pitch that indicate different vocal expressions or emotional states. The method employs this brief time frame to provide a granular look at how pitch changes in real time, forming part of a broader mechanism for interpreting the nuances in spoken communication. This analysis is essential for applications that rely on understanding subtle vocal cues, enhancing the system's ability to respond effectively. The reference label "b) Spectral centroid shift detection for micro-expression analysis S2102" pertains to a process involved in detecting subtle changes within voice data, specifically shifts in the spectral centroid. This procedure is utilized for analyzing micro-expressions. Such spectral changes can provide insights into emotional or physiological states by tracking variations in how energy is distributed across different frequencies over time. In the disclosed system, the process includes an analysis step where Mel-Frequency Cepstral Coefficients (MFCC) delta coefficients are correlated with arousal levels S1204. This correlation is designed to assess changes in emotional state based on vocal inputs. By examining variations in these coefficients, the system aims to interpret arousal dynamics, which can be pivotal for adjusting responses or interactions accordingly.

FIG. 22 illustrates the implementation of homomorphic encryption for voice data processing, as S2200. This feature ensures that voice data remains encrypted during processing, enabling secure handling without exposing sensitive information. The embodiment depicted in the Fig. involves the implementation of post-quantum TLS transmission protocols S2202. This component ensures that data transmission adheres to stringent security standards capable of withstanding quantum computing threats. In the disclosed system, FIPS-validated hardware security modules S2204 are implemented as a key component to ensure robust security. These modules are designed to comply with the Federal Information Processing Standards (FIPS), providing stringent security measures for safeguarding cryptographic information. They serve to protect sensitive data by securely managing encryption keys and processing encrypted information, thereby strengthening the overall security framework of the communication platform.

Figure 23:
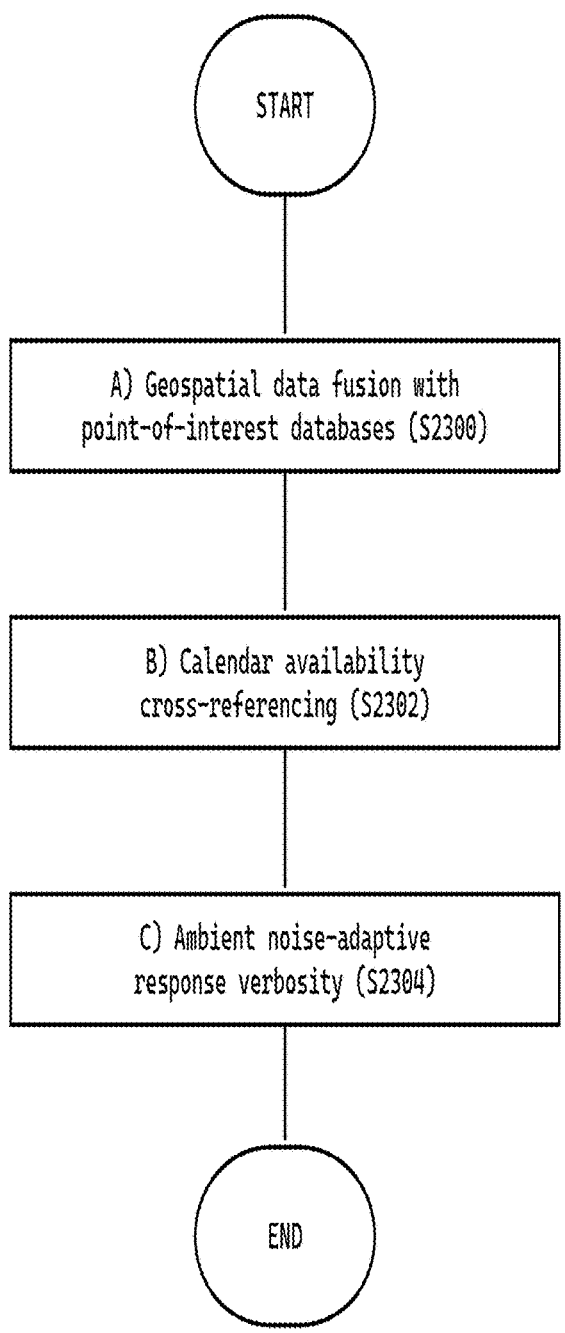
FIG. 23 shows flowchart illustrating processes in an AI-enabled system involving geospatial data fusion, calendar cross-referencing, and ambient noise-adaptive responses.

FIG. 23 illustrates the flowchart of processes in an AI-enabled system, highlighting steps such as geospatial data fusion with point-of-interest databases, calendar availability cross-referencing, and ambient noise-adaptive response verbosity. The system incorporates geospatial data fusion with point-of-interest databases S2300. This process combines location-based information to optimize the performance of AI-enabled services, resulting in more context-aware interactions. By leveraging geographic and environmental data in real-time, the system is able to offer users relevant and personalized experiences. The process of calendar availability cross-referencing S2302, involves checking and aligning user schedules with calendar data. This method ensures that interactions or events are planned efficiently by analyzing availability and scheduling conflicts. It allows the system to coordinate activities seamlessly by integrating calendar information from various sources. The process labeled "c) Ambient noise-adaptive response verbosity S2304" involves dynamically adjusting the verbosity of responses based on the ambient noise levels detected in the environment. This ensures that communication remains effective and intelligible, regardless of background sounds. By analyzing the noise conditions, the system modulates the response length and clarity to optimize user interaction, enhancing the overall user experience.

Figure 24:
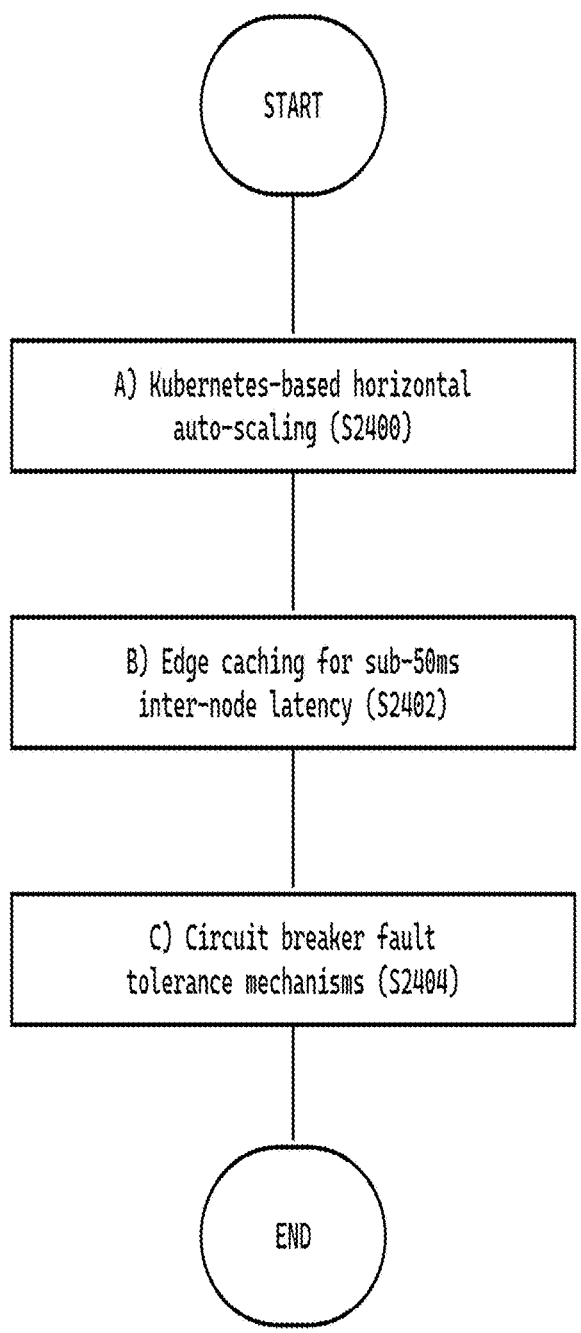
FIG. 24 shows an exemplary flowchart of the process of scalable infrastructure management.

FIG. 24 illustrates the following references: A) Kubernetes-based horizontal auto-scaling (S2400), B) Edge caching for sub-50 ms inter-node latency (S2402), and C) Circuit breaker fault tolerance mechanisms (S2404). The system employs Kubernetes-based horizontal auto-scaling S2400, allowing the platform to adjust resources dynamically in accordance with demand. By leveraging container orchestration capabilities, it optimizes the deployment of applications across distributed environments. This ensures efficient resource utilization while maintaining service reliability and performance. The system incorporates an edge caching mechanism designed to achieve sub-50 ms inter-node latency S2402. This caching facilitates rapid data access and minimizes delays across distributed network nodes, thereby enhancing overall system responsiveness and performance. It also includes a circuit breaker fault tolerance mechanisms S2404. These mechanisms are designed to enhance system reliability by interrupting and rerouting processes or operations when a fault is detected. This approach prevents system overloads and minimizes service disruptions, ensuring continued performance and stability.

Figure 25:
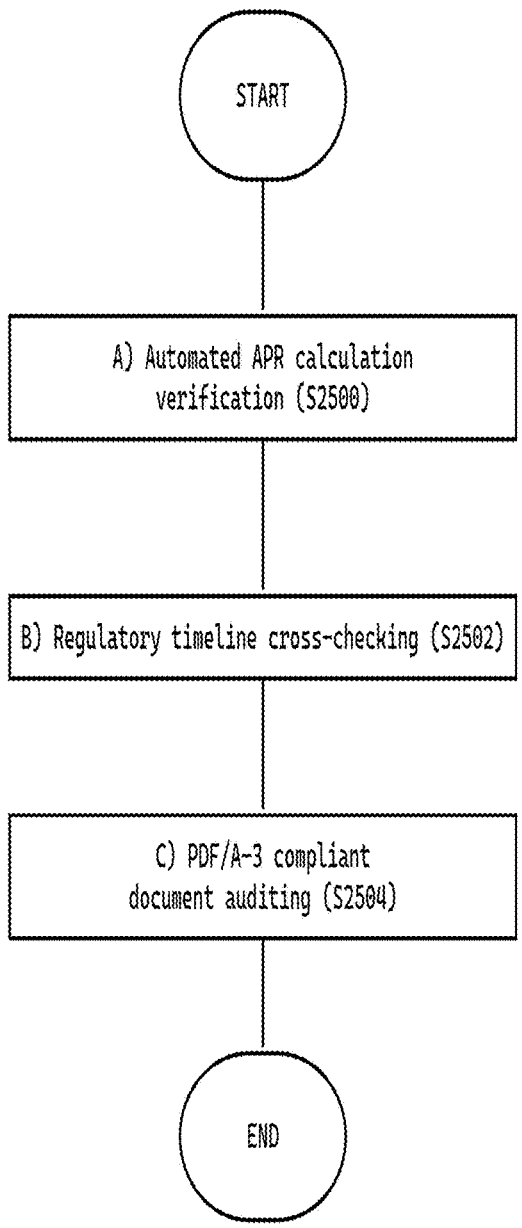
FIG. 25 shows an exemplary flowchart of an automated financial compliance system with regulatory verification capabilities.

FIG. 25 shows an exemplary flowchart of an automated financial compliance system with regulatory verification capabilities. In this embodiment, the system conducts an automated verification of Annual Percentage Rate (APR) calculations S2500. This step ensures the accuracy and integrity of financial computations, facilitating compliance with applicable financial standards. The process involves validating the APR against predefined parameters to detect any discrepancies, thereby minimizing errors in the representation of financial data. The embodiment depicted in FIG. 25 involves a system for regulatory timeline cross-checking, labeled as S2502. In this process, the system reviews and verifies compliance timelines against established regulatory frameworks. This ensures that all necessary actions are completed according to the pertinent deadlines, thereby maintaining adherence to legal and industry standards. Such verification mitigates risks associated with non-compliance by proactively identifying potential discrepancies in timelines. The disclosed system incorporates PDF/A-3 compliant document auditing to ensure that electronic documents adhere to this specific archiving standard S2504. This process involves verifying the structure and metadata of documents to confirm their compliance with the PDF/A-3 format, which is designed for durable preservation. By meeting these regulations, the system facilitates reliable document management and enhances data integrity, an essential aspect for regulated environments and maintaining audit trails.

Figure 26:
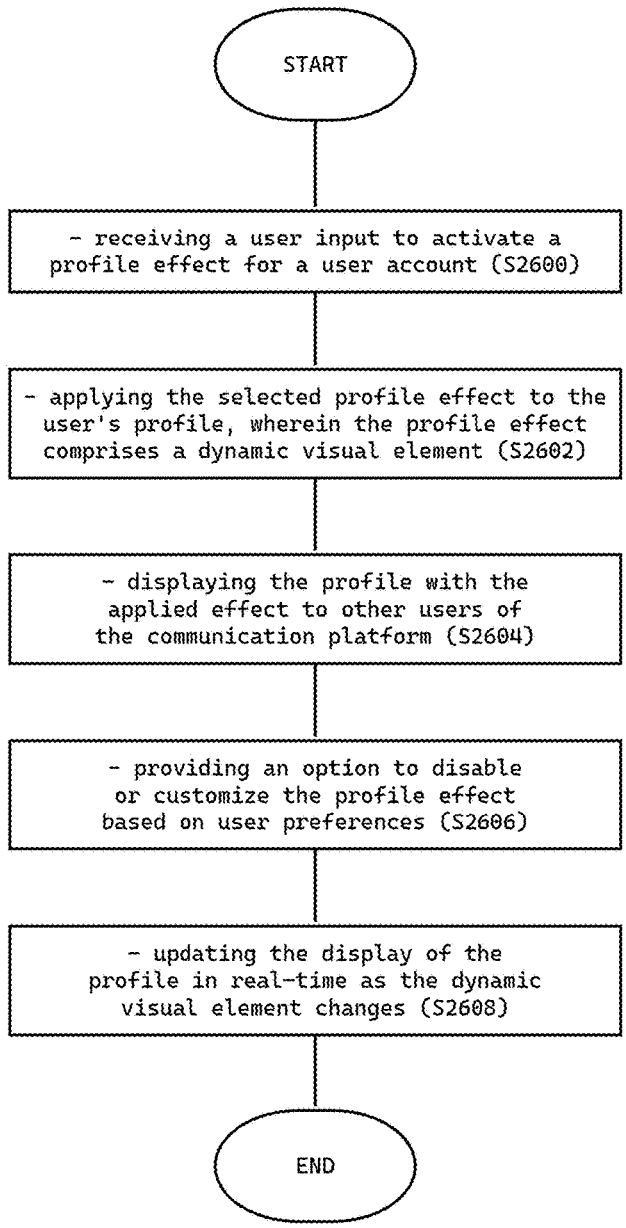
FIG. 26 shows an exemplary flowchart illustrating the process of activating a dynamic profile effect for a user account
Figures 27, 28:
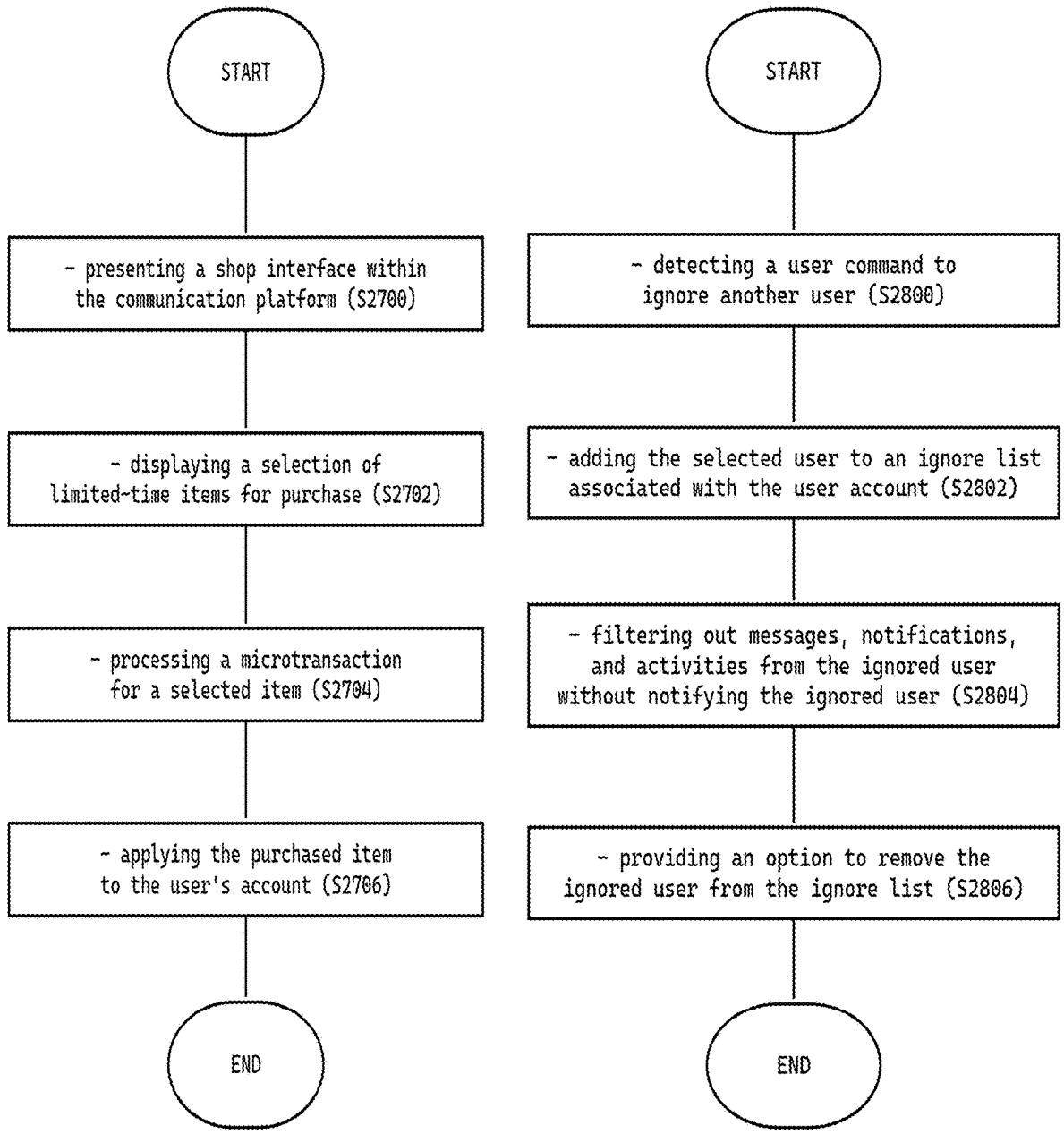
FIG. 27 shows an exemplary flowchart showing steps for in-app purchases on a communication platform.
FIG. 28 shows an exemplary flowchart diagram showing steps to ignore a user in an interactive system.

FIG. 26 illustrates the following steps: receiving a user input to activate a profile effect, applying a selected dynamic visual effect to the user's profile, displaying this profile to others, providing customization options based on preferences, and updating the display in real-time as the visual element changes. The system facilitates the display of a user profile with an applied dynamic visual effect to other users within a communication platform, enhancing engagement and personalization S2600. This feature ensures that each user's chosen visual representation is effectively communicated among their peers, fostering a more visually dynamic and interactive environment. The selected effect (e.g., animation, theme) is applied to the user's profile, transforming its appearance S2602. The updated profile, now featuring the dynamic element, becomes visible to other platform users in real-time S2604. The process encompasses an option allowing users to disable or customize the profile effect according to their preferences S2606. This flexibility ensures that users can tailor their profile visual elements, enhancing personalization and user satisfaction. The system continuously refreshes the profile display to reflect changes in the dynamic element (e.g., motion, transitions) S2608. FIG. 27 illustrates the steps for executing in-app purchases on a communication platform. The process begins with presenting a shop interface within the communication platform S2700. This interface is designed to facilitate user interaction by showcasing a dedicated section where users can explore and browse available items. The shop interface offers navigation options, allowing users to seamlessly access a variety of limited-time items for potential purchase. The disclosed system involves presenting users with a selection of items available for a limited time, enabling them to make purchases within the communication platform S2702. These items are highlighted as exclusive offers intended to drive user engagement. The temporary availability creates urgency, encouraging users to explore and decide on purchases promptly. By integrating this feature, the platform aims to enhance user interaction and increase transaction frequency. The disclosed method involves processing a microtransaction for a selected item, as identified by reference label S2704. This step encompasses facilitating a financial transaction wherein a user selects an item for purchase within the communication platform's shop interface. The system handles the transaction process, ensuring that the payment is securely processed and authorized, thereby enabling the smooth acquisition of the chosen item. The process involves applying the purchased item to the user's account S2706. After a successful microtransaction, the system automatically updates the user's profile with the selected item, ensuring the purchase is reflected promptly in the communication platform. This seamless integration allows users immediate access to their new acquisitions.

FIG. 28 illustrates the process for ignoring a user in an interactive system. The steps include detecting a command to ignore a user, adding the user to an ignore list, filtering out communications from the ignored user without notification, and providing an option to remove the user from the list. The process involves initially detecting a user command to ignore another user within the system S2800. Upon receiving this command, the system identifies the target user and prepares to modify the user's interaction settings accordingly. The process involves incorporating the chosen user into an ignore list linked to the user's account S2802. By doing so, incoming messages, notifications, and activities from the ignored user are effectively filtered out. This action occurs discreetly, ensuring that the ignored user remains unaware of their new status on the ignore list. The system facilitates user management by offering a feature that allows users to remove someone from an ignore list S2804. This is accomplished through a user-friendly interface that provides clear options for modification. Users can easily access and modify their ignore list, enabling them to effectively manage interactions and customize their communication preferences according to changing needs or circumstances. This ensures greater flexibility and personalization within the interactive system. FIG. 29 illustrates the following references: it shows a flowchart depicting the process of adding and displaying an avatar decoration on a user's profile within a communication platform. The process begins when a user initiates a request to add an avatar decoration to their profile S2900. This interaction involves sending a command from within the communication platform, where the system recognizes and processes the user's intent to enhance their avatar with decorative elements. The initial request is received by the platform, triggering a series of predefined actions to facilitate the user's customization preferences. The step involves the selection of a decoration from an available set S2902. This process allows the user to choose a particular decoration that they want to apply to their avatar. It is an integral part of customizing and updating the avatar's appearance within the communication platform. The chosen decoration is seamlessly applied to the user's avatar, modifying its visual appearance S2904. The updated avatar, now featuring the decoration, is displayed across the communication platform for others to view S2906. FIG. 30 illustrates the following process: integrating a merchandise interface within the communication platform, displaying branded merchandise items for purchase, processing a transaction for a selected merchandise item, and arranging for delivery of the purchased item to the user. The chosen decoration is seamlessly applied to the user's avatar, modifying its visual appearance S3000. The updated avatar, now featuring the decoration, is displayed across the communication platform for others to view S3002. The process "S3004" involves the transaction handling for a selected merchandise item within the communication platform. This step ensures that once an item is chosen by a user, the system processes the payment and facilitates the completion of the purchase. It includes verifying payment details, confirming the transaction, and preparing for subsequent actions such as inventory updates or receipt generation. The final step in the process involves arranging for the delivery of the purchased merchandise item to the user, as indicated by reference S3006. This step ensures that once a transaction is completed for a selected merchandise item displayed within the communication platform, the necessary arrangements are made to facilitate its delivery to the user's specified location.

FIG. 31 illustrates the process of determining server access based on account age. The flowchart outlines steps such as detecting a new member joining, checking the account age, comparing it to a predetermined minimum age requirement, and then granting or denying access based on the comparison. The process initiates with the system detecting the entry of a new member into a server in the communication platform S3100. This detection is the first step in evaluating server access eligibility based on account age criteria. In the described process, step S3102 verifies the account age of a newly joined member on the communication platform. This step examines the account's creation date to ensure it complies with predefined requirements. This verification plays a key role in maintaining platform security and ensuring adherence to age-related policies S3104. The reference label S3106 denotes the step at which the server either grants or denies access by comparing the account age of a new member with a predetermined minimum age requirement. This decision is designed to ensure that only users who meet the age criteria are allowed access, thereby complying with the platform's age-related policies. FIG. 32 shows an exemplary flowchart illustrating the process of creating and sending a customized rich embedded message within a communication platform. The process begins with receiving a command to create a rich embedded message, followed by providing an interface for customizing the embedded message content S3200. It then involves generating the rich embedded message based on the customized content and concludes with sending the rich embedded message to a specified channel within the communication platform. The process involves furnishing an interface to enable users to tailor the content of the embedded message S3202. This customization process allows individuals to make adjustments and personalize the message according to their preferences before finalizing its creation. The system proceeds to generate a rich embedded message using the customized content provided by the user S3204. This process involves formatting and structuring the message as per the specified customizations, ensuring that all elements align with the desired presentation and functionality. Consequently, the message is prepared for distribution within the communication platform S3206.

Figure 33:
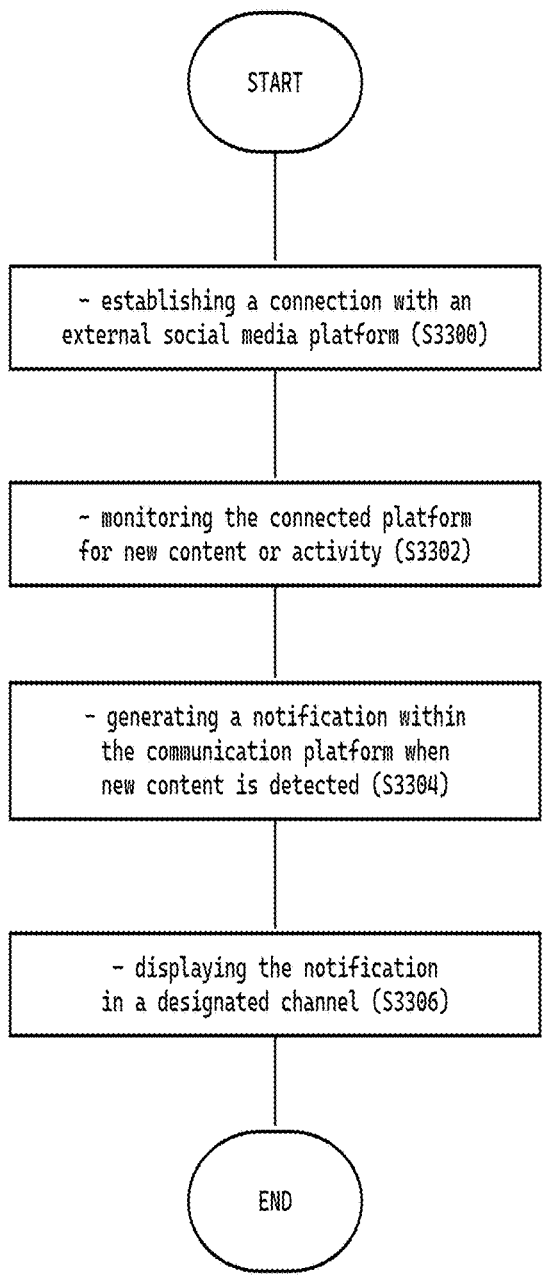
FIG. 33 shows an exemplary flowchart illustrating connection to a social media platform for content monitoring and notification generation.

FIG. 33 illustrates the following process: establishing a connection with an external social media platform, monitoring it for new content or activity, generating a notification within the communication platform when new content is detected, and displaying the notification in a designated channel. The depicted system begins by establishing a secure connection to an external social media platform S3300. This connection allows for continuous monitoring of any new content or activities on the platform. By maintaining this link, the system can detect real-time updates and promptly generate notifications within the communication platform, ensuring users remain informed of relevant events or changes originating from the connected social media source. The monitoring process involves continuously observing the external social media platform to detect any new content or activities S3302. This step ensures that the platform remains updated by tracking changes or additions in real-time, facilitating timely notifications within the communication channel. In the described system, once a notification is generated within the communication platform when new content is detected on the connected social media platform S3304, this notification is subsequently displayed in a designated channel S3306. This process ensures that users within the platform are promptly alerted to relevant updates from external sources in an organized manner, facilitating seamless integration and information dissemination.

Figure 34:
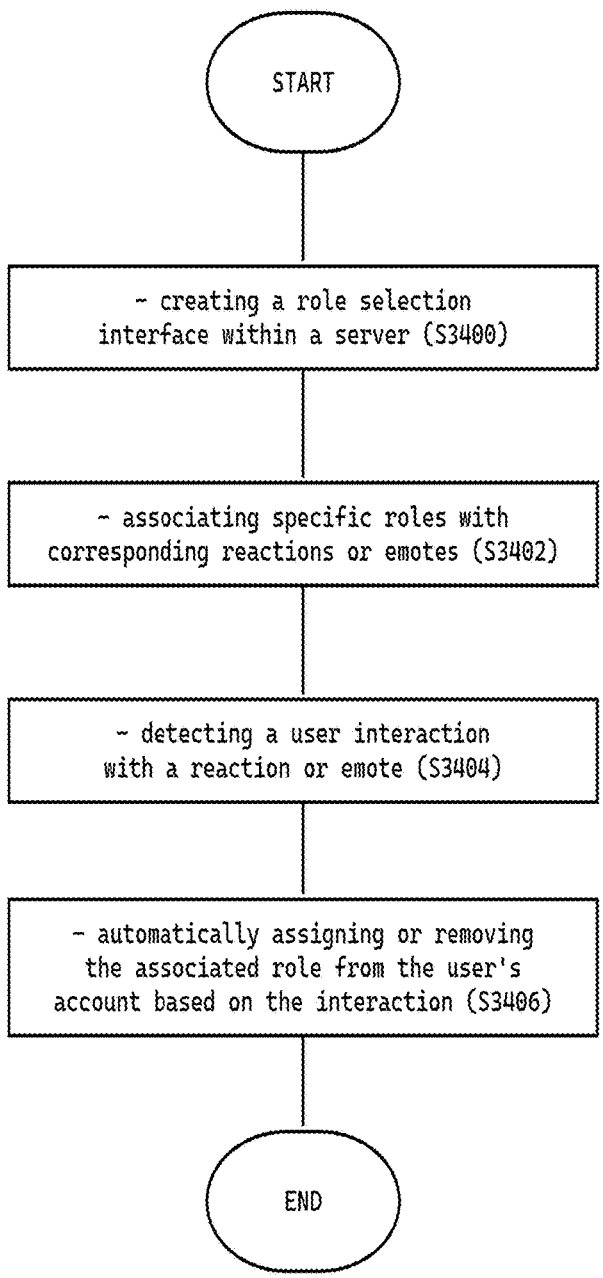
FIG. 34 shows an exemplary flowchart illustrating a process for creating and managing role selection based on user interactions with reactions or emotes.
Figure 35:
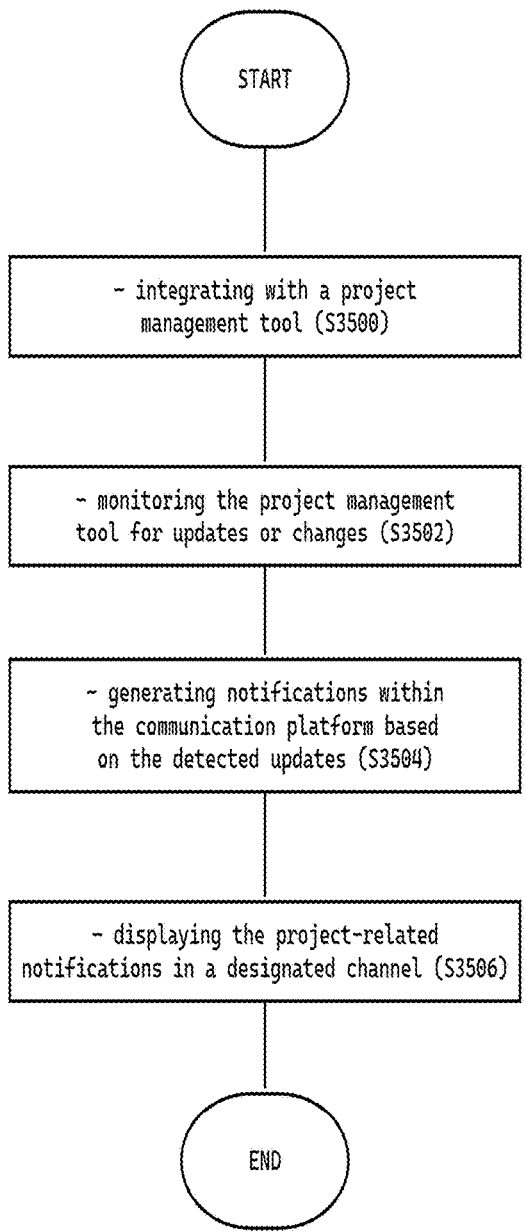
FIG. 35 shows an exemplary flowchart depicting integration, monitoring, notification generation, and display of project updates in a communication platform.
Figure 36:
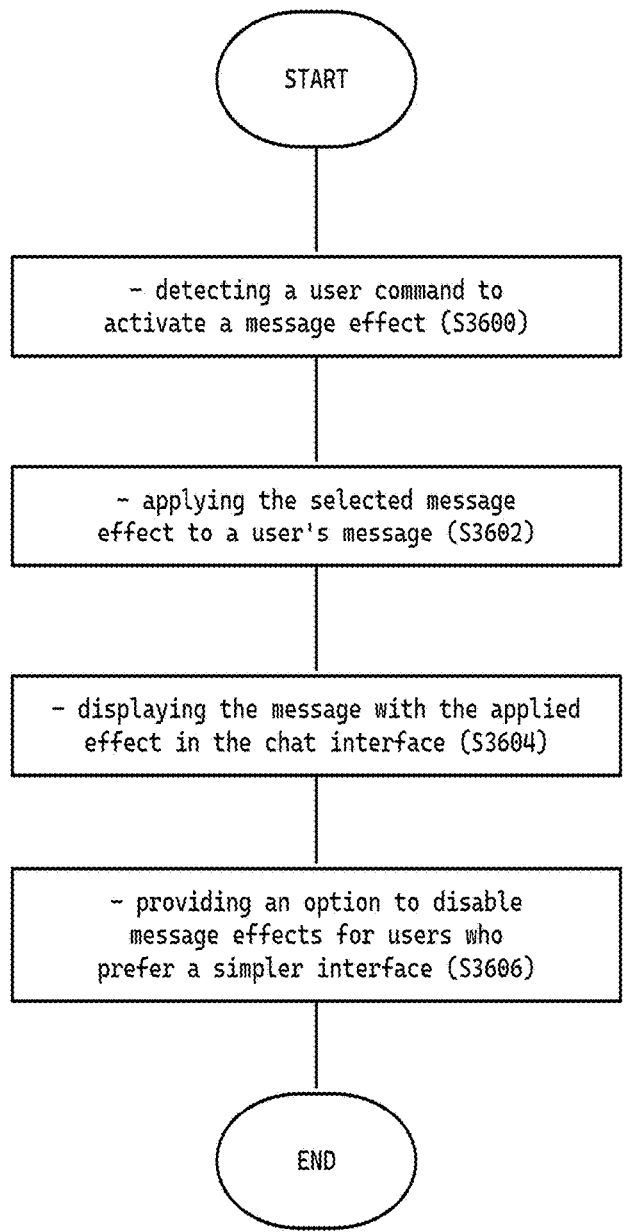
FIG. 36 shows an exemplary flowchart outlining the process of activating a message effect in a chat interface.
Figure 37:
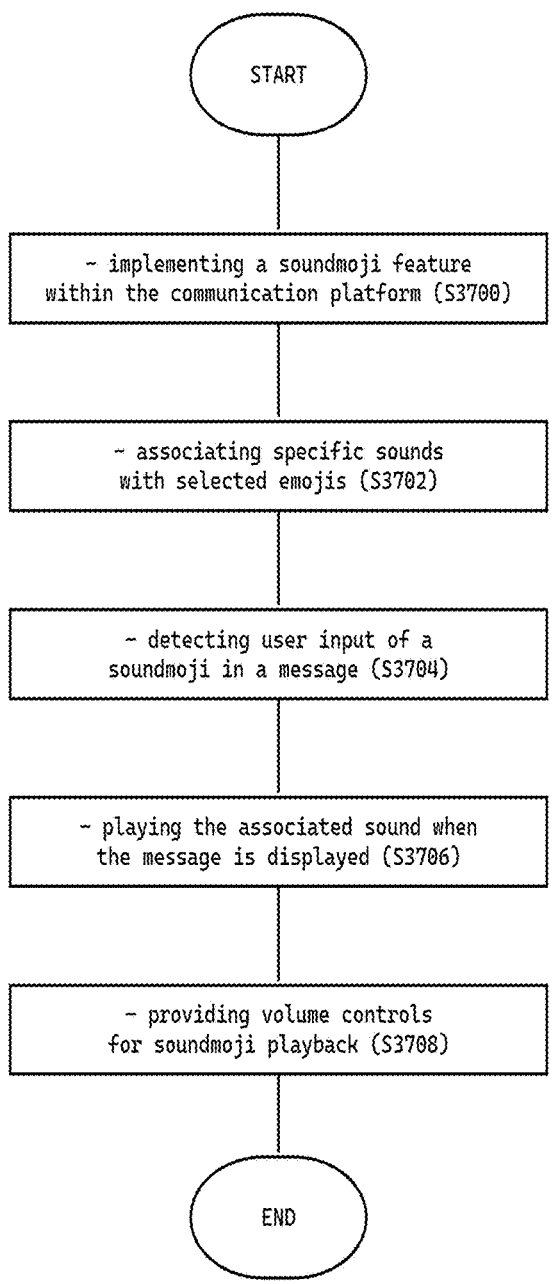
FIG. 37 shows an exemplary flowchart describing the implementation and operation of a soundmoji feature within a communication platform.
Figure 38:
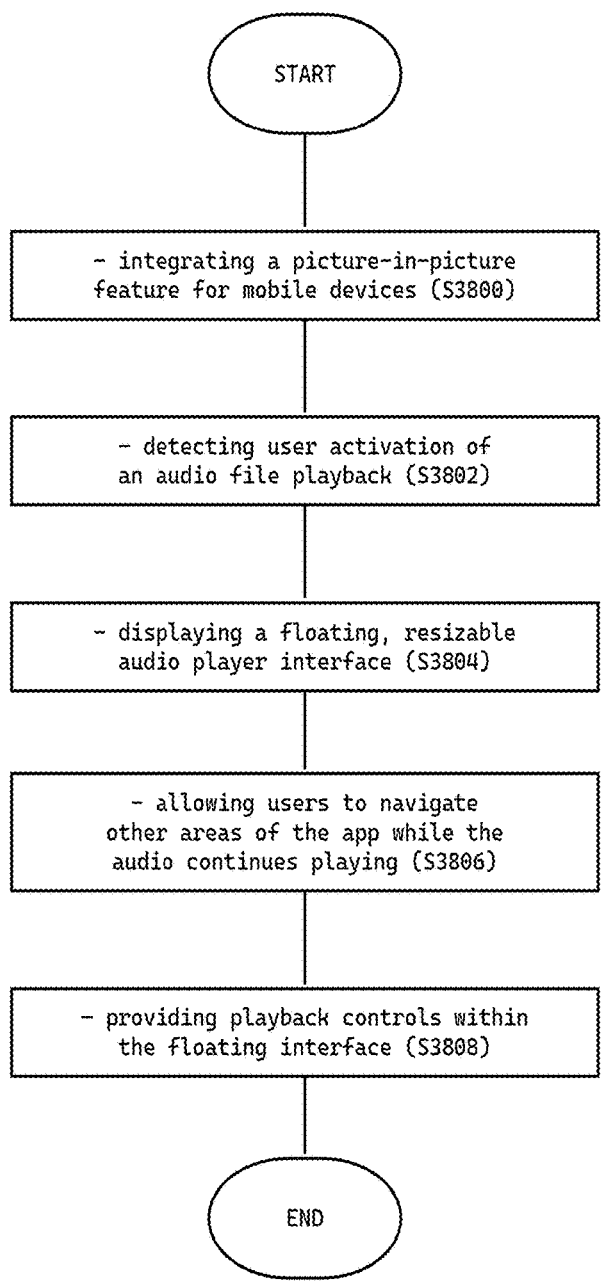
FIG. 38 shows an exemplary flowchart illustrating the steps for integrating a picture-in-picture feature for audio playback on mobile devices.

FIG. 34 illustrates a flowchart detailing the process for creating and managing role selection based on user interactions with reactions or emotes. The process involves establishing a role selection interface within a server, which facilitates users in selecting roles S3400. This is implemented by associating specific roles with reactions or emotes, allowing users to interact through these elements S3402. Upon detecting user interaction with a reaction or emote, the system automatically assigns or removes the corresponding role from the user's account based on the interaction S3404. The system automatically assigns or removes the associated role from the user's account based on interaction S3406. FIG. 35 illustrates the process of integrating with a project management tool, monitoring updates or changes, generating notifications within the communication platform based on these updates, and displaying project-related notifications in a designated channel. It involves integrating the system with a project management tool S3500. The process involves continuously monitoring a project management tool to detect any updates or changes S3502. This approach ensures that modifications within the tool are promptly identified, allowing the system to remain informed of project dynamics and enabling the generation of timely and relevant notifications to the communication platform. It also involves generating notifications S3504 and displaying the notifications in a designated channel S3506. FIG. 36 illustrates the following processes: detecting a user command to activate a message effect (S3600), applying the selected effect to a user's message (S3602), displaying the message with the effect in the chat interface (S3604), and providing an option to disable effects for users preferring a simpler interface (S3606). The method begins by detecting when a user commands the activation of a message effect S3600. This involves listening for specific inputs or actions indicative of the user's intent to apply an effect, which can be done through interfaces or direct commands within the communication platform. Recognizing this command triggers subsequent procedures to implement the desired message effect. The step involves applying a specific message effect to a user's message S3602. This process modifies the message's appearance in a predefined manner, such as altering its visual style or adding dynamic elements to enhance its presentation within the chat interface. In accordance with reference label S3604, the system presents a chat interface where the user's message is displayed with the applied message effect. This ensures that the visual or auditory enhancements applied to the message are visible within the chat, enhancing user experience and interaction. Users can thereby see or hear the intended modifications as part of their conversation flow. The system provides users with a feature to opt-out of using message effects if they prefer a more straightforward interface S3606. This capability allows users to disable these effects according to their personal preferences, ensuring a simpler and more streamlined user experience. FIG. 37 illustrates the implementation and operation of a soundmoji feature within a communication platform S3700, including the following steps: implementing the feature, associating specific sounds with selected emojis, detecting user input of a soundmoji in a message, playing the associated sound when the message is displayed, and providing volume controls for soundmoji playback. In this step, the system establishes a connection between specific sounds and chosen emojis within the communication platform S3702. This feature allows users to enhance their messaging experience by pairing sounds with visual symbols, fostering an interactive environment that blends audio with text-based expressions. This association is integral to creating engaging and multi-sensory interactions for users. The reference label "S3706" in the flowchart refers to the step where the system plays a specific sound associated with an emoji, triggered by user input S3704. This occurs when the message containing the soundmoji is displayed within the communication platform, enhancing user interaction by providing auditory feedback linked to the visual emoji. The system provides users with the ability to adjust the volume for soundmoji playback, allowing customization of audio output levels to suit individual preferences S3708. This feature enhances user experience by offering control over sound intensity, ensuring that soundmojis are heard at comfortable levels, regardless of the ambient noise conditions or personal hearing preferences. FIG. 38 illustrates the steps involved in integrating a picture-in-picture feature for audio playback on mobile devices. One implementation comprises integrating a picture-in-picture feature for mobile devices which enhances audio playback functionality S3800. Initially, user activation of an audio file triggers the display of a floating, resizable audio player interface, allowing users to seamlessly navigate other areas of the application while the audio is playing. Playback controls are provided within the floating interface to enable user interaction and control over the audio experience. The process involves displaying an audio player interface that can float over the current mobile device screen S3802. This interface is designed to be resizable, allowing users to adjust its dimensions to suit their preferences. It remains accessible while users navigate other areas of the application, ensuring that audio playback is seamless and uninterrupted S3804. The reference label S3806 pertains to the capability within the application that permits users to move through different sections while audio is playing uninterrupted. This feature is part of the system's picture-in-picture functionality, allowing an ongoing audio session to persist even as users explore other app functionalities. It ensures a seamless user experience by maintaining the audio playback in the background, thus providing flexibility in using multiple app features simultaneously. The process involves providing playback controls within a floating interface, enabling users to manage audio playback seamlessly while multitasking within the application S3608. This feature ensures that users can adjust audio settings without interrupting their navigation of other app areas.

Figure 39:
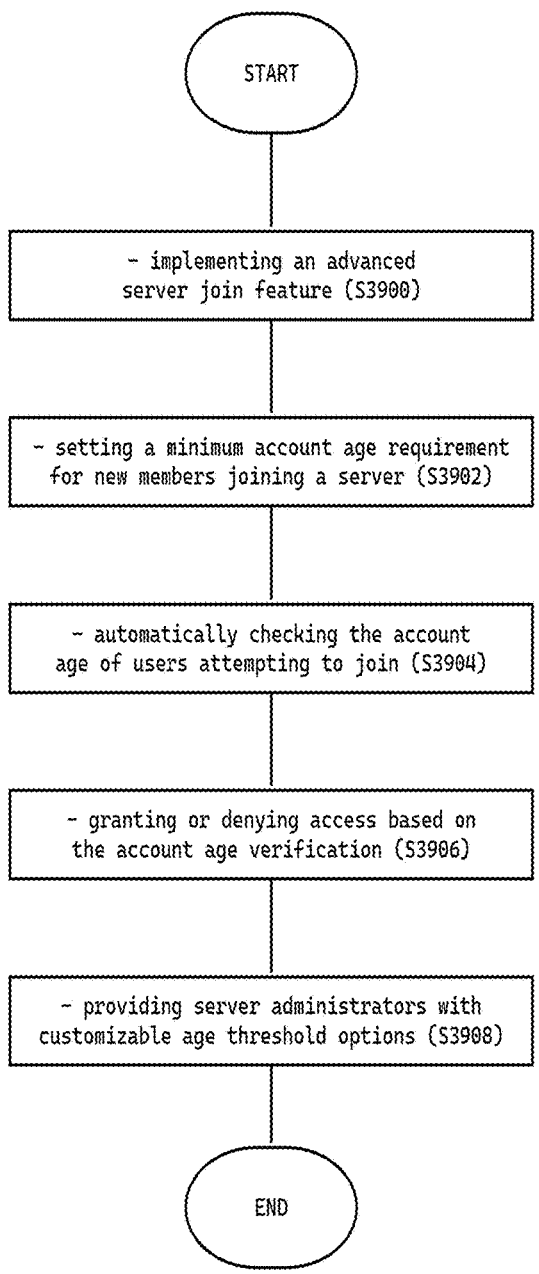
FIG. 39 shows an exemplary flowchart demonstrating the implementation of an advanced server join feature.

FIG. 39 illustrates the following references: implementing an advanced server join feature, setting a minimum account age requirement for new members, automatically checking the account age of users attempting to join, granting or denying access based on account age verification, and providing server administrators with customizable age threshold options. The process involves implementing an advanced server join feature S3900 that enhances user onboarding within a communication platform. The system sets a minimum account age requirement for new members S3902, automatically verifies the account age of users attempting to join a server (S3904), and then grants or denies access based on this verification (S3906). Additionally, it provides server administrators with options to customize the minimum age threshold (S3908), allowing for tailored access control measures. The reference label S3904 pertains to a step within the disclosed system's process flow, which involves the automatic verification of the account age for users attempting to join a server. This mechanism ensures that the system accurately assesses whether users meet predetermined age criteria before granting them access. The system performs an examination of the account age of users attempting to join a server, which informs subsequent decisions to either grant or deny server access S3906. The access determination is based on whether the verified account age meets predefined requirements, facilitating secure and regulated entry into the server environment. The reference label "providing server administrators with customizable age threshold options S3908" refers to a system feature that allows server administrators to define specific age requirements for users joining a server. This capability enhances the control administrators have over membership criteria, ensuring that only users meeting the predetermined age criteria can access the server. This customization ensures compliance with community standards and legal requirements, while also allowing flexibility to adjust as necessary.

Figure 40:
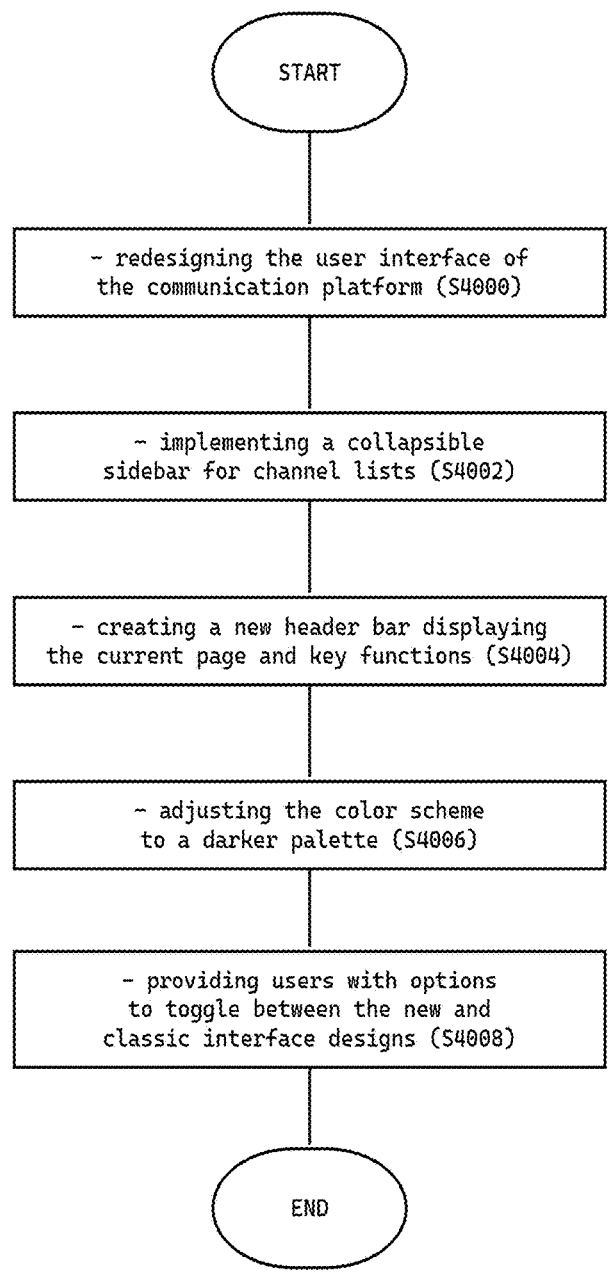
FIG. 40 shows an exemplary flowchart outlining steps for redesigning a user interface with various tasks and an endpoint.
Figure 43:
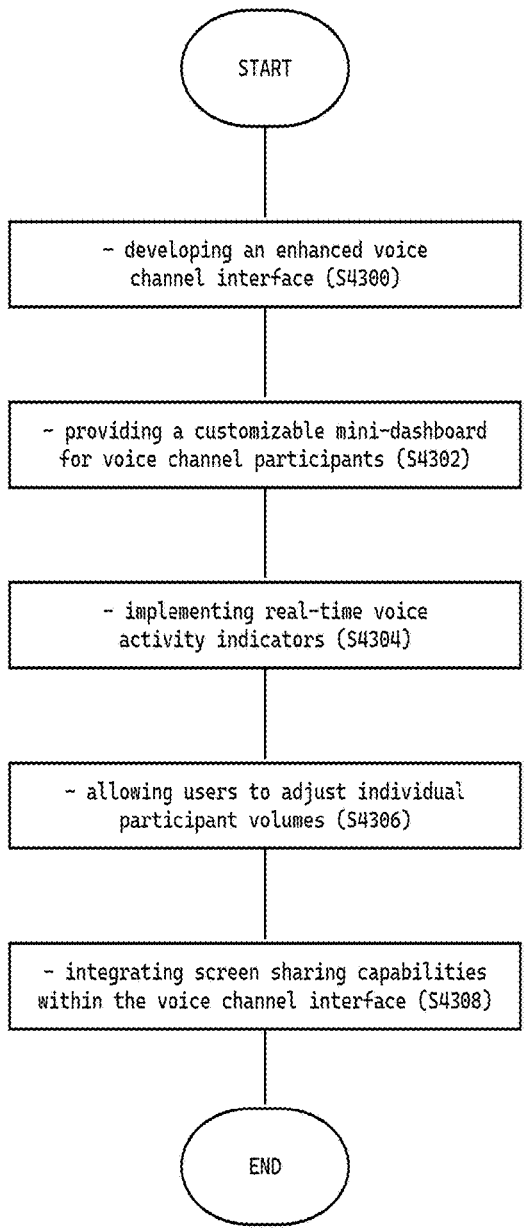
FIG. 43 shows an exemplary flowchart of steps for developing a voice channel interface with features like dashboards, voice activity indicators, volume adjustment, and screen sharing.
Figure 44:
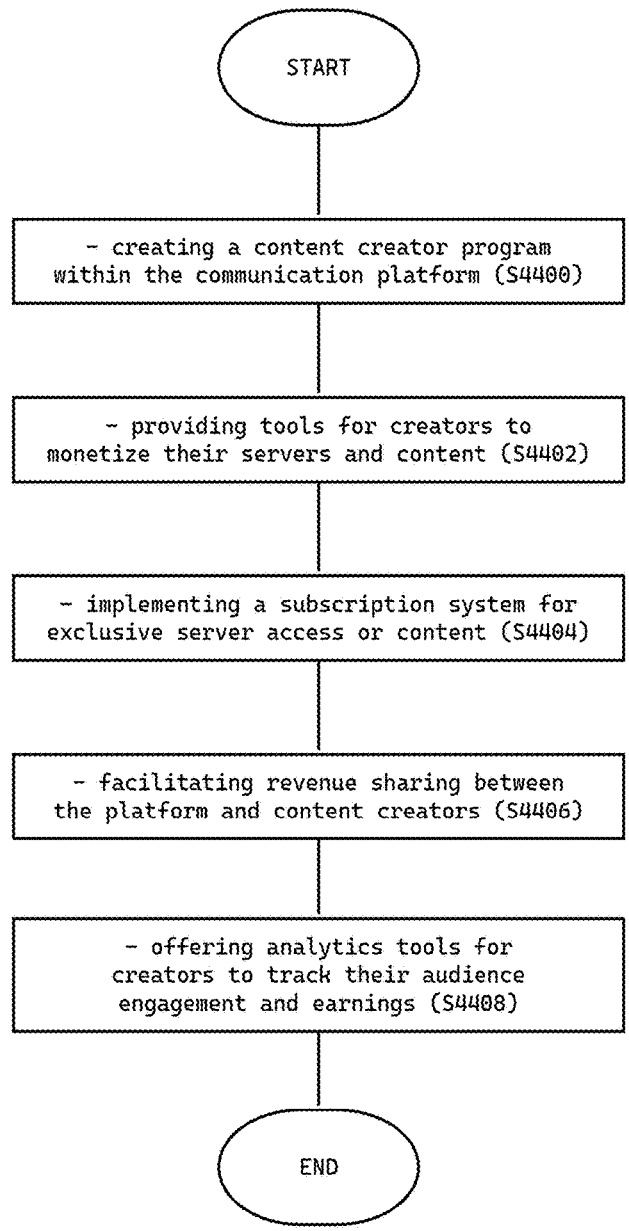
FIG. 44 shows an exemplary flowchart outlining steps for a content creator program within a communication platform.
Figure 47:
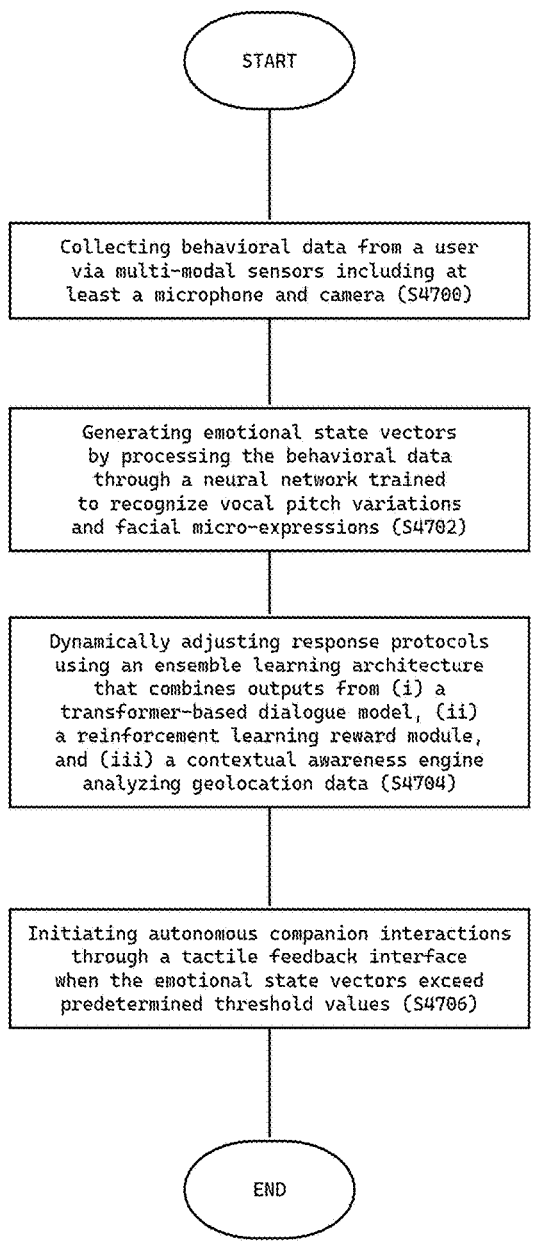
FIG. 47 shows an exemplary flowchart of an AI system processing behavioral data to initiate companion interactions based on emotional state vectors.
Figure 48:
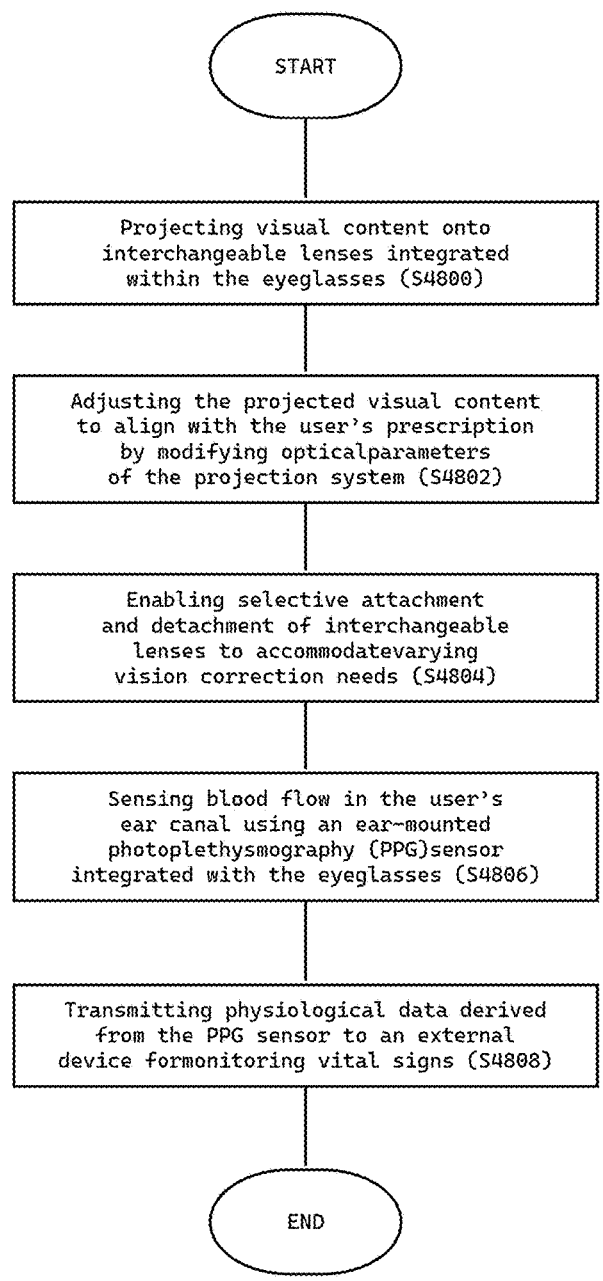
FIG. 48 shows an exemplary flowchart of a process of visual content projection.
Figure 49:
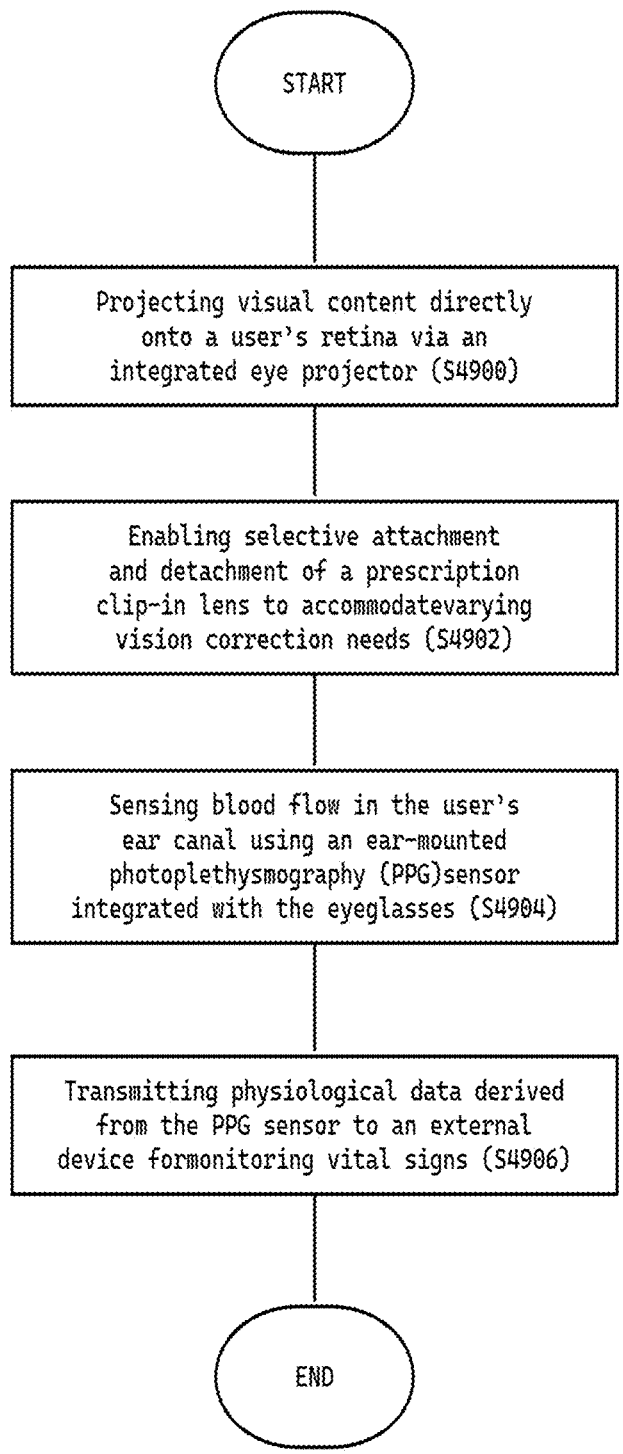
FIG. 49 shows an exemplary flowchart detailing steps for an AI-enabled immersive interaction system.

FIG. 40 shows an exemplary flowchart outlining steps for redesigning a user interface with various tasks and an endpoint. The process begins with redesigning the user interface of the communication platform S4000. This involves a comprehensive reevaluation and overhaul of the existing user interface to enhance functionality and user experience. Key features include implementing a collapsible sidebar for channel lists, creating a new header bar that displays the current page and key functions, adjusting the color scheme to a darker palette, and providing users with options to toggle between new and classic interface designs. The redesign of the user interface incorporates a collapsible sidebar dedicated to channel lists S4002. This feature allows users to easily manage and navigate these lists with greater accessibility. The collapsible functionality enriches the user experience by providing a streamlined and organized display, facilitating quick access without cluttering the interface. The disclosed one implementation involves the creation of a new header bar within a communication platform user interface S4004. This header bar is designed to display the current page along with key functions, providing users with immediate access to essential features and information on the platform. The system involves modifying the interface's color scheme to a darker palette, enhancing visual comfort and overall user experience S4006. This redesign aims to provide users with a sleek, modern aesthetic while reducing eye strain, particularly in environments with diminished brightness. By incorporating a darker palette, the interface becomes more appealing and functional, catering to a broader spectrum of user preferences and accessibility needs. The step of providing users with options to toggle between new and classic interface designs S4008 involves allowing users to dynamically switch their user interface preference within the communication platform. This feature ensures users can select the interface style best suited to their personal taste or accessibility needs, thus enhancing their overall user experience by offering flexibility in design choice. In FIG. 41, the disclosed system begins by integrating a game development platform within the communication platform S4100 which allows developers to create and launch games directly on the platform. It serves as the foundational step in enabling a seamless gaming experience for both developers and users within the communication environment. The reference label S4102 corresponds to providing tools for developers to create and launch games directly within the communication platform. This involves equipping developers with the necessary software and resources to develop, test, and deploy their games seamlessly within the existing communication infrastructure. The aim is to streamline the process of game development and integration, allowing developers to focus on creativity and user engagement while leveraging the platform's capabilities. The disclosed system includes a feature for implementing a discovery system that allows users to locate and engage with integrated games on the platform S4104. This system is designed to enhance user experience by providing easy access to a diverse array of games, encouraging exploration and interaction within the platform environment. The system enables in-app purchases to support game monetization within the communication platform S4106. This allows users to make purchases directly within integrated games, facilitating a revenue stream for both developers and the platform itself. By implementing this feature, the system provides a seamless purchasing experience, enhancing user engagement and supporting the financial sustainability of games offered through the platform. Facilitating direct user feedback to game developers through the platform S4108 involves establishing a channel within the communication system where users can directly convey their experiences and suggestions regarding the games hosted on the platform. This feature allows developers to receive valuable insights and engage with their audience, enhancing game development processes and improving user satisfaction. In FIG. 42, the method begins by establishing a shop within the communication platform that offers items for a limited duration S4200. This involves setting up a digital marketplace where users can browse a curated selection of exclusive avatar decorations and profile effects. Each item in the shop is available only for a specific period, encouraging prompt user engagement. The method involves displaying a selection of exclusive avatar decorations and profile effects S4202. This is part of a process where users can browse limited-time items available for purchase within a communication platform. These exclusive items are curated to enhance user profiles, providing unique customization options. Through this approach, the platform offers users the opportunity to personalize their profiles with distinct visual elements. The step labeled S4204 pertains to implementing a countdown timer, which tracks the remaining availability duration for each item within a limited-time item shop on a communication platform. This mechanism ensures that users are aware of the timeframe in which they can purchase exclusive avatar decorations and profile effects before the items are no longer available. The reference label S4206 refers to the process of handling digital transactions for items selected by users within the communication platform. This involves managing the financial procedures necessary to complete the purchase of exclusive avatar decorations and profile effects offered in the limited-time item shop. The step S4208 involves the immediate application of purchased items to user profiles following a successful transaction. This action occurs within the communication platform's limited-time item shop and ensures that items acquired by users are automatically integrated into their profiles without delay. FIG. 43 illustrates the steps for developing a voice channel interface with features including dashboards, voice activity indicators, volume adjustment, and screen sharing. The disclosed process involves developing an enhanced voice channel interface S4300. This involves creating a more interactive and user-friendly experience for participants within a communication platform. The interface is designed to include features such as customizable mini-dashboards, real-time voice activity indicators, and the ability to adjust individual participant volumes. Additionally, the integration of screen sharing capabilities enhances collaboration and functionality within the voice channel. The customizable mini-dashboard is designed for voice channel participants and offers enhanced functionality within the communication platform S4302. This feature allows users to personalize their dashboard view, tailoring it to display relevant controls and information based on their preferences. The integration of this mini-dashboard aims to improve user experience by providing easy access to essential tools and adjustments during voice interactions. The step of implementing real-time voice activity indicators S4304, involves incorporating features within the enhanced voice channel interface that allow participants to visually see the activity levels of each speaker. These indicators provide immediate feedback on who is speaking or has recently spoken, facilitating smoother and more organized discussions among participants in the voice channel. The described system involves a method that enables users to adjust the volume levels of individual participants within a voice channel S4306. This functionality is part of an enhanced voice interface designed to improve user interaction and control, providing personalized audio experiences for each participant. The system enables the integration of screen sharing capabilities within the voice channel interface S4308. This feature allows participants to share their screens during voice interactions, enhancing collaborative efforts and providing visual context. By implementing this functionality, users can seamlessly present information or demonstrate processes in real-time, thereby enriching the communication experience. FIG. 44 illustrates the steps involved in creating a content creator program within a communication platform S4400. The process involves creating the program, providing monetization tools, implementing a subscription system, facilitating revenue sharing, and offering analytics tools for tracking audience engagement and earnings. The system incorporates a feature to equip content creators with various tools designed to monetize their servers and content within the communication platform S4402. These tools enable creators to generate revenue from their digital assets and community engagements, optimizing their potential to earn through different monetization strategies. The described system includes implementing a subscription mechanism designed to facilitate exclusive access to servers or specific content S4404. This feature allows users to gain entry to designated areas or obtain privileged materials by subscribing, thereby enabling content creators to establish tiers of access and monetize their offerings within the platform. The system facilitates revenue sharing between the platform and content creators S4406. This involves establishing mechanisms that allow both parties to share profits generated from monetization activities. By implementing these processes, creators can receive a portion of the income derived from their content and engagement, ensuring a mutually beneficial relationship. The content creator program includes a feature that provides analytics tools, allowing creators to monitor their audience engagement and track earnings S4408. It enhances creators' ability to understand user interactions and optimize their content strategies for better monetization within the communication platform. FIG. 45 shows an exemplary flowchart illustrating the creation and implementation of an AI-powered moderation assistant S4500. The process involves training the artificial intelligence system on guidelines and content policies specific to the platform S4502. This step ensures that the AI is equipped to understand and apply the rules, enabling it to manage and moderate content in accordance with these predefined standards. The process involves automatically flagging content that potentially violates platform-specific policies for human review S4504. This step is essential to ensure content compliance and maintain community standards, enabling human moderators to assess flagged content for appropriate action. The reference label "S4506" refers to the step in one implementation where customizable moderation settings are offered to server administrators. This feature allows administrators to tailor the moderation parameters according to their specific requirements, enabling a flexible approach to managing content. It provides them with the ability to adjust settings and controls based on the unique needs of their respective server environments, enhancing the overall effectiveness of content moderation. Generating periodic reports on moderation actions and trends within servers involves the systematic collection and analysis of data related to the activities of the AI-powered moderation assistant S4508. This process includes documenting instances where content was flagged for review, detailing the outcomes of moderation decisions, and identifying patterns in user behavior and content types. The reports provide insights into the effectiveness of the moderation system, highlight areas for improvement, and assist server administrators in understanding the impact and scope of moderation activities over specific timeframes. FIG. 46 shows an exemplary flowchart describing a system that collects biometric arousal data. The disclosed one implementation involves the collection of biometric arousal data via sensors that measure heart rate variability, skin conductance, and vocal pitch modulation S4600. This process is essential for evaluating physiological responses and serves as an integral component in tailoring user interactions based on detected arousal levels. The system involves generating personalized response protocols using a neural network S4602. This network is trained on datasets that include user preferences and simulated physical intimacy patterns. This configuration enables the creation of tailored responses based on individual inputs and simulations within the system. The step involves dynamically adjusting the intensity of tactile feedback S4604. This is achieved through the application of reinforcement learning techniques, which utilize real-time biometric feedback loops. By continuously analyzing biometric data such as heart rate variability, skin conductance, and vocal pitch modulation, the system fine-tunes the tactile feedback to align with the user's physiological responses, tailoring interactions to enhance user experience. The embodiment involves initiating adaptive intimacy sequences via haptic actuators when certain conditions are met S4606. Specifically, these conditions occur when biometric arousal thresholds align with established consent verification parameters. This process utilizes real-time input to ensure that tactile feedback is modulated appropriately, facilitating an experience that both respects user consent and responds dynamically to changes in biometric data. FIG. 47 shows an exemplary flowchart of an AI system processing behavioral data to initiate companion interactions based on emotional state vectors. The system begins by collecting behavioral data from a user via multi-modal sensors, including at least a microphone and camera S4700. It then generates emotional state vectors by processing the behavioral data through a neural network trained to recognize vocal pitch variations and facial micro-expressions S4702. The system then Dynamically adjusts response protocols using an ensemble learning architecture that combines outputs from a transformer-based dialogue model, a reinforcement learning reward module, and a contextual awareness engine analyzing geolocation data S4704. It then Initiates autonomous companion interactions through a tactile feedback interface when the emotional state vectors exceed predetermined threshold values S4706. FIG. 48 shows an exemplary flowchart of a process of visual content projection. The system involves projecting visual content onto interchangeable lenses that are integrated within eyeglasses S4800. This process allows the user to experience augmented visual information directly through the lenses, enhancing the functionality of the eyewear. The projection system adapts to different scenarios by providing relevant content in a seamless manner. The step labeled S4802 involves modifying the optical parameters of the projection system to adjust the visual content projected onto interchangeable lenses. This adjustment ensures alignment with the user's prescription, allowing tailored visual experiences that accommodate individual vision correction needs. One implementation allows for the selective attachment and detachment of interchangeable lenses to cater to different vision correction requirements S4804. This functionality enables users to easily modify their eyewear to suit various optical needs, enhancing the adaptability and convenience of the device. One implementation comprises a method for sensing blood flow in the user's ear canal, employing an ear-mounted photoplethysmography (PPG) sensor integrated with eyeglasses S4806. This sensor detects variations in blood volume, which can be indicative of the user's physiological status. By integrating the PPG sensor with eyeglasses, there is an opportunity for seamless monitoring of vital signs without interfering with daily activities. This data can be transmitted to external devices for further analysis and health monitoring. FIG. 49 illustrates the process for an AI-enabled immersive interaction system from eyeglasses, detailing steps for projecting visual content onto a user's retina S4900, adjusting vision correction via a detachable clip-in lens, sensing blood flow using an ear-mounted PPG sensor, and transmitting physiological data to an external device for monitoring vital signs. The eyeglasses have detachable clip-in lenses S4902 that facilitate the selective attachment and detachment of a prescription clip-in lens. This functionality is designed to accommodate users' varying vision correction needs, allowing for easy customization and adaptability of the eyeglasses. Users can modify their eyewear configuration fluidly based on their specific visual requirements. It monitors real-time blood flow via an ear-worn PPG sensor embedded in the glasses frame S4904 and wirelessly streams collected health data (e.g., heart rate) to paired devices for analysis S4906. In one embodiment, a computer-implemented method for operating an artificial intelligence voice agent system comprises receiving voice input through communication channels including telephone networks and VoIP systems. In various embodiments, the voice input is captured at a communication endpoint configured to acquire audio signals and digitize the information for subsequent processing (e.g., S100). The system then converts the received voice input to text using an automatic speech recognition (ASR) system equipped with multi-accent processing capabilities. In some embodiments, the ASR component employs advanced acoustic analysis and language modeling techniques to accurately transcribe diverse speech inputs—even when pronounced using different accents (e.g., S102). The converted text is subsequently analyzed through natural language processing (NLP) pipelines that implement intent recognition using large language models, maintain conversation history via contextual dialog management, and detect emotional cues through sentiment analysis. In certain implementations, the NLP pipeline includes multiple layers of analysis wherein intent recognition leverages domain-trained language models to isolate user queries or commands, dialog management modules track previous interactions to ensure coherent conversation flow, and sentiment detection tools evaluate emotional content to tailor system responses (e.g., S104). The system further integrates with backend systems through API connections to customer relationship management platforms, enterprise resource planning databases, and payment processing gateways. Such integration enables the voice agent to retrieve auxiliary data, process transactions, or update records in real time, thereby expanding its capabilities beyond basic conversational interaction.

In one embodiment, the system further comprises a real-time call transcription module that functions together with dialog state tracking. In this configuration, continuous audio input received through voice channels is processed by an automatic speech recognition component to generate a near real-time transcript of the call. The transcription module is configured to output transcribed text with precise timestamp information that directly corresponds with dialog states maintained by the dialog management module. As the conversation advances, the dialog state tracker records context transitions and conversational flows while the transcription module concurrently indexes utterances to reflect these state changes. This synchronized operation allows the system not only to display real-time text corresponding to the spoken content but also to dynamically update the conversation context based on the evolving transcript. The resulting alignment between the transcription output and dialog state facilitates immediate verification of the conversation history, improves error detection, and supports rapid correction of any misinterpreted segments. Furthermore, the integrated transcription and state tracking mechanism refines the system's continuous learning algorithm by providing indexed data that associates specific phrases with corresponding dialog contexts. This enhanced capability improves future recognition accuracy and guarantees that generated responses remain contextually appropriate. The real-time transcription module further interfaces with natural language processing routines to extract intent and semantic meaning, thereby reinforcing and updating the dialog state in a manner tightly coupled with user interactions. Such synchronization supports the delivery of a more intuitive user experience and enhances the system's overall responsiveness and adaptability during live exchanges. In one embodiment, sentiment analysis is implemented using Mel-frequency cepstral coefficient (MFCC) analysis of vocal pitch variations to derive an emotional cue profile from the voice input. The system processes the audio signal of the speaker to extract MFCC features in real time. These features are then analyzed to identify variations in vocal pitch that are indicative of underlying emotional states. The extracted MFCC data is fed into a sentiment analysis module that interprets the pitch variations to quantify sentiment intensity, such as detecting cues of happiness, anger, or sadness. This analysis enhances the natural language processing pipeline by providing additional contextual information that informs the intent recognition and response generation components. In embodiments where adaptive dialogue management is employed, the emotional cue profile derived from MFCC analysis is used to dynamically adjust conversation flows and modulate the tone of the generated responses. The integration of MFCC-based sentiment analysis improves the system's ability to tailor responses based on the user's emotional state, thereby providing a more personalized and contextually relevant interactive experience. In one embodiment, the system further comprises one or more modules for multilingual processing configured to support simultaneous translation between 27 or more language variants. In this embodiment, after the voice input is converted to text by the automatic speech recognition components, the resulting textual representation is provided to the multilingual processing module. This module is designed to automatically detect the source language and then, utilizing one or more transformer-based neural network architectures, perform simultaneous translation into a plurality of target languages. The multilingual processing module leverages pre-trained language models, each optimized for specific language pairs, and integrates error correction and context preservation mechanisms to ensure high fidelity of the translated output. The module operates in real time, thereby supporting concurrent translation of speech-derived text while maintaining minimal latency suitable for interactive communication environments. The translated text is subsequently integrated into the natural language processing pipeline, where it is analyzed for intent, semantics, and sentiment, further supporting the dialogue management functions of the system. In embodiments that support multi-party communications or global enterprise applications, the multilingual processing module runs in parallel with other response generation components to provide translated outputs synchronized with conversation context. The translation module also includes quality assurance checks, such as language-specific normalization and sentiment alignment processes, to maintain consistency and clarity between the original input and the translated content. Additionally, the multilingual system is designed to interface with backend systems via secure API connections to enable downstream processing, such as automated content delivery and dynamic response customization based on the target language requirements. The inherent modular architecture of the multilingual processing component permits independent updates and scalability, thereby facilitating continual improvement in translation accuracy and the potential for expanding support beyond the initial 27 language variants. In operation, the module tokenizes the incoming text, applies joint text and language modeling to generate multiple candidate translations through beam search or other decoding strategies, and selects the final translated output based on contextual relevance and user-specific preferences. The integration of the multilingual processing module enhances the overall capability of the system to offer simultaneous, high-quality translations, thereby enabling a seamless and inclusive communication experience for users speaking diverse language variants. In one embodiment, the system integrates with customer relationship management (CRM) platforms through secure API connections, wherein the CRM integration includes the automatic creation of service tickets based on conversation outcomes. In this configuration, conversation logs and interaction data generated during dialogue processing are analyzed by the natural language processing (NLP) pipeline, including components for intent recognition and contextual dialogue management to identify instances where a user request or system-detected event necessitates the opening of a service ticket. When predetermined keywords, phrases, or sentiment thresholds detected within the conversation meet established criteria, the system triggers an event that interfaces with the CRM platform to automatically generate a service ticket. This event is captured by the integration module, which employs secure API calls to communicate relevant interaction details such as the nature of the inquiry, identified issues, or user-reported problems to the CRM system. The automatic ticket creation process can further include the assignment of priority levels based on the urgency determined by analysis of the user's dialogue sentiment and context, thus ensuring timely and appropriate follow-up actions by service personnel. Additionally, the generated ticket is updated in real time in response to subsequent conversational data through continuous monitoring and learning mechanisms (S112), thereby refining ticket accuracy and relevance. Automatic service ticket creation as part of the CRM integration module enhances operational efficiency by reducing manual intervention, allowing for immediate escalation of customer support cases, and ensuring comprehensive documentation of the conversation outcomes for future reference and analysis. The present embodiment further comprises dynamic latency compensation to maintain response times under 300 ms during voice interactions. In one embodiment, a latency compensation module continually monitors delays across various processing stages, including voice input capture, audio-to-text conversion, natural language analysis, dialogue management, response generation, and text-to-speech conversion. When latency measurements exceed predetermined thresholds, the module adjusts resource allocation by dynamically redistributing computational workloads among available processing units and engaging hardware acceleration capabilities. The module employs adaptive buffering techniques and real-time load balancing to mitigate delays introduced by network variability or processing congestion. Additionally, the latency compensation system continuously analyzes performance metrics and feedback signals from the processing pipeline, including sub-2 ms latency performance indicators from phonetic lattice pruning and other rapid-response algorithms integrated within the system. This continuous feedback enables automatic adjustment of scheduling priorities and improves real-time error handling, thereby ensuring that overall system response remains within a sub-300 ms window. Dynamic latency compensation is implemented across both software and hardware layers, utilizing parallel processing architectures and machine-level instructions to optimize execution paths, ensuring that voice interactions retain exceptional quality and minimal latency across communication channels such as telephone networks, VoIP systems, and web-based interfaces while preserving the integrity and clarity of the synthesized speech output. In one embodiment, continuous learning mechanisms update language understanding models by employing federated learning across distributed edge nodes. In this configuration, raw conversation data remains on local devices, where initial processing and parameter updates occur. Each edge node uses locally stored interaction data— such as conversation logs, voice recognition parameters, and response generation patterns—to compute gradient updates for the learning model. These locally computed parameters are periodically transmitted in encrypted form to a central aggregation server without revealing any raw user data, thereby preserving privacy and reducing the risk of data breaches. The central server then aggregates the updates from all participating edge nodes using techniques like weighted averaging or adaptive fusion algorithms. The aggregated update reflects a comprehensive optimization derived from a wide array of deployment environments and usage patterns. Once aggregated, an updated model is redistributed back to the distributed edge nodes, ensuring that all nodes operate with a uniformly enhanced model that benefits from collective experience. This federated learning approach minimizes communication overhead by limiting the exchange to model parameters rather than raw data and reduces latency by allowing local edge nodes to compute updates independently. Furthermore, the mechanism incorporates selective sample weighting and error pattern detection algorithms to prioritize updates that significantly enhance intent recognition and contextual dialogue management. By integrating federated learning with reinforcement learning schemes and continuous feedback loops, the system dynamically adapts to evolving linguistic patterns and user preferences, thereby ensuring optimal real-time response generation and overall system performance. The system further comprises an adaptive noise cancellation module employing dual-microphone beamforming techniques to enhance the quality of captured voice input. In one embodiment, two spatially separated microphones are utilized to obtain audio signals, which are then processed through beamforming filters that dynamically adjust to the acoustic environment to effectively attenuate ambient noise and interference. The adaptive noise cancellation module continuously monitors the dual-microphone inputs and applies algorithms to optimize the signal-to-noise ratio by selectively enhancing the desired voice component while suppressing competing noise. This process can include the integration of voice activity detection to distinguish between periods of speech and background noise, thereby refining the beamforming filters in real time. The beamformed audio output is then supplied to subsequent automatic speech recognition components for conversion to text. Optionally, machine learning techniques are employed to continuously retrain and update the noise cancellation parameters based on varying acoustic conditions and user behavior, ensuring consistently optimal voice input for further natural language processing and dialogue management functions. The system incorporates regulatory compliance measures that further include automated HIPAA-compliant data redaction pipelines. In this embodiment, sensitive information subject to the Health Insurance Portability and Accountability Act (HIPAA) is automatically identified through pattern recognition algorithms and context-sensitive data tagging routines integrated within the processing module. Once detected, the system employs automated redaction pipelines that selectively obscure or remove protected health information (PHI) from data streams prior to storage or further processing, thereby ensuring that any transmission, analysis, or archival of voice and text data complies with HIPAA requirements. The automated pipelines are designed to operate in real time and are seamlessly integrated with the overall system architecture, interfacing with other modules responsible for natural language processing and machine learning driven dialogue management. These pipelines leverage both heuristic rules and statistical models to achieve reliable and consistent redaction outcomes, minimizing the risk of unintended disclosures while preserving the integrity of non-sensitive contextual information. By incorporating these automated HIPAA-compliant data redaction pipelines, the system enhances its ability to meet stringent regulatory standards and provides increased assurance of privacy protection, even as it performs advanced data analysis and integration with external systems. The system comprises an emotion-aware response generation module that adjusts vocal prosody parameters in real time. In one embodiment, the system analyzes the generated response content in conjunction with detected emotional cues from the user input, with the emotional state determined using a combination of sentiment analysis of the textual content and relevant biometric or paralinguistic parameters. Based on the inferred emotional state, the system modulates synthetic speech output by dynamically adjusting prosodic features such as intonation, pitch, speech rate, and amplitude. This adjustment is achieved by integrating dedicated prosody modification algorithms into the text-to-speech (TTS) engine. The algorithms incorporate real-time pitch variance analysis, spectral flux measurements, and compensatory filter banks to fine-tune the vocal characteristics so as to convey the intended affective nuances. In various embodiments, the prosody modification algorithms receive inputs from emotion detection components that analyze conversation history, current dialog context, and any available biometric data, then compute appropriate adjustments to the synthetic speech parameters. The modified prosodic parameters are applied in real time without compromising overall system response latency. In addition, the emotion-aware response generation module utilizes adaptive learning techniques, including reinforcement learning, to continuously refine the mapping between detected emotional cues and corresponding prosodic adjustments based on iterative user feedback. Hardware-accelerated processing components further ensure that dynamic adjustments to vocal prosody adhere to stringent timing requirements. Ultimately, the incorporation of emotion-aware response generation enables the system to produce synthetic speech that naturally mirrors the emotional tone of the conversation, thereby enhancing user engagement and improving the overall interactive experience. Systems and methods according to embodiments described herein are configured to further comprise conversational context preservation across multiple interaction channels. In certain embodiments, the system maintains detailed logs and state information from interactions occurring via both synchronous and asynchronous channels, including but not limited to telephone networks, VoIP systems, and web-based interfaces. The preserved conversational context facilitates seamless transitions between varied communication modalities by storing user inputs, historical dialogue data, and session-specific variables in secure, non-volatile storage. In some embodiments, a dialogue management module is operatively linked to context synchronization modules that aggregate and normalize data across different protocols, such that multi-channel conversations remain coherent and contextually relevant. The system is configured to extract and integrate context from prior interactions, allowing subsequent responses generated by natural language processing pipelines to reflect accumulated dialogue history regardless of the channel used for current communication. For example, if a user initiates a query via a telephone network and later continues the interaction via a web-based interface, the preserved conversation history is accessible by the dialogue management component, thereby ensuring consistency and personalization in the response generation process. In embodiments incorporating automatic speech recognition components with multi-accent processing capabilities and text-to-speech modules, the synchronization of contextual data aids in real-time voice channel processing and multi-modal user interface interactions. Furthermore, the preserved context is utilized by machine learning models for continuous learning, where updated interaction data contribute to dynamic adjustments in intent recognition and conversation flow optimization. API integrations with external systems, such as customer relationship management platforms or enterprise resource planning databases, further leverage the stored conversational context to enhance data accuracy and overall system performance. The integrated conversational context preservation mechanism operates securely alongside encryption protocols and biometric authentication methods, ensuring that all context-related information is transmitted and stored in compliance with regulatory requirements and industry best practices. The text-to-speech engine is configured to provide synthetic speech output in parallel as multiple audio streams, each encoded in a different codec format. In some embodiments, the engine converts response text into synthetic speech while simultaneously encoding the output into various audio codec formats suited for different applications. For example, one embodiment uses parallel audio data pipelines that generate an audio stream with premium fidelity for archival and quality-sensitive applications while concurrently providing one or more compressed streams for efficient delivery over networks with limited bandwidth. The system achieves the simultaneous generation of multiple audio codec formats by executing parallel transcoding operations via dedicated processing units or multi-core digital signal processors. Each audio codec format is independently processed with distinct encoding parameters such as bitrate, dynamic range, and error resilience characteristics. In addition, adaptive bitrate-shaping algorithms and psychoacoustic masking thresholds are applied to each encoding pipeline, ensuring that the quality and intelligibility of the synthetic speech remain intact regardless of the selected codec format. In some embodiments, the resulting synthetic speech output comprises audio streams encoded in formats chosen from a group that includes codecs optimized for telephone networks, VoIP systems, and web-based interfaces. The system also monitors operating conditions such as network performance and device capabilities in real time, which enables adjustments to codec-specific parameters and guarantees that the simultaneous output streams remain synchronized.

By performing these parallel encoding operations, the system not only offers broader compatibility with a wide range of devices and network environments but also improves responsiveness and user experience in interactive communication settings. This approach supports the efficient delivery of premium quality audio in multiple formats without requiring separate processing steps for each format, integrating seamlessly with the broader system architecture that includes natural language processing, dialogue management, and backend integration modules. In one embodiment, the system further comprises an automated call summarization module that processes the conversation log once a communication session concludes. The module, integrated with the dialogue management components, analyzes the recorded conversation data, including timestamps associated with each segment of exchanged voice inputs and generated outputs, to identify key moments during the call. This identification is achieved by employing machine learning classifiers that detect significant changes in conversation dynamics, semantic content shifts, or expressions of strong user command and intent. The module utilizes natural language processing techniques to extract relevant phrases, topics, or action items that represent these key moments. Subsequently, each identified key moment is correlated with its corresponding timestamp derived from the precise timing data captured during the call, thereby enabling a detailed temporal mapping of the conversation highlights. The call summarization results are presented as a concise summary that includes text-based descriptions of the call and a series of key moment annotations with associated timestamps. In certain embodiments, the automated summarization further involves optional user feedback mechanisms, wherein users can review, validate, or adjust the identified key moments. This feedback can be used to refine the machine learning models employed in the summarization process. The automated call summarization feature is integrated with the overall response generation and conversational context management system, ensuring that the summarized output is stored in the conversation history and can be subsequently utilized for analytics, reporting, or further processing via API integrations with enterprise workflow automation platforms. The summarization module operates concurrently with components responsible for continuous learning, thereby contributing to the iterative improvement of language understanding models and dialog management strategies based on cumulative interaction data, including the extracted key moment timestamps. In one embodiment, voice authentication is performed using spectrogram pattern matching. When a user provides a voice input, the system processes the audio signal to generate a time-frequency spectrogram representation. This spectrogram is then analyzed using algorithms that extract detailed spectral features. These features include amplitude patterns, frequency distributions, and time-domain variances that uniquely characterize a user's voice signature. The extracted spectrogram is compared against a set of stored template spectrograms associated with an enrolled user. The matching process employs adaptive thresholding techniques and dual verification steps such that both the overall spectral shape and fine-grained frequency domain details must align between the input and the stored template. By optimizing feature extraction parameters and employing parallel processing across multiple frequency bands, the spectrogram pattern matching algorithm is configured to achieve a false acceptance rate of less than 1%. The system further enhances the reliability of voice authentication by dynamically adjusting its matching criteria based on ambient noise conditions and real-time feedback from preceding authentication attempts, ensuring consistency under variable acoustic environments. The spectrogram pattern matching module is integrated into a comprehensive biometric authentication protocol that also includes additional layers of security, such as end-to-end encryption and regulatory compliance monitoring. Moreover, the voice authentication process is executed alongside other system processing steps, including automatic speech recognition and dialogue management, wherein the authenticated voice serves as both a trigger for personalized responses and as a secure token in API integrations with external systems. In some embodiments, the system continuously updates stored spectrogram templates via reinforcement learning methods that account for gradual changes in the user's vocal profile and environmental variations, thereby sustaining a near minimal false acceptance rate across multiple sessions. This approach provides a robust mechanism for mitigating spoofing risks and ensuring enhanced user verification without compromising system performance. In one embodiment, the system further comprises hardware-accelerated automatic speech recognition processing using tensor processing units (TPUs) to expedite the conversion of voice signals into text. The TPUs execute neural network inference operations in parallel with other processing tasks, offloading computationally intensive tensor operations such as matrix multiplications from the central processing unit. This acceleration mechanism reduces processing latency and increases throughput within the ASR component. The incoming voice input, received via the communication channels, is routed through the ASR subsystem where hardware-accelerated processing via TPUs carries out rapid feature extraction and acoustic modeling. The TPU-enabled ASR processing module optionally integrates with existing automatic speech recognition components (e.g., those employing multi-accent processing as disclosed in earlier embodiments) to yield enhanced real-time performance and augmented accuracy. The output text from the TPU-accelerated ASR module is subsequently forwarded to the natural language processing pipeline for semantic analysis and intent extraction. This integration of hardware acceleration using TPUs not only boosts performance by reducing the computational burden on general-purpose processors but also provides scalability in processing large volumes of voice data during peak operational periods. In one embodiment, dialog management is implemented through a probabilistic finite state machine (PFSM) architecture enhanced with multi-thread processing capabilities. The PFSM comprises a set of states representing distinct phases or contexts of a conversation, with transitions between these states governed by probability distributions derived from natural language understanding components. These probabilities indicate confidence in the interpretation of user inputs and anticipated conversational outcomes, allowing the system to manage inherent uncertainties and variations in user behavior. Each state transition is evaluated by considering contextual information, recent dialog history, and externally supplied parameters, ensuring that the conversation progresses in a flexible and responsive manner as inputs change. Multi-thread processing is employed to enable the concurrent evaluation and management of multiple potential dialog paths. Separate threads run in parallel to independently assess various state transitions and dialog continuations, empowering the system to handle simultaneous conversational threads or parallel branches within a single interaction. This approach alleviates processing bottlenecks, minimizes response latency, and enhances the system's capacity to adapt in real time to user inputs and shifts in context. In one embodiment, the system further comprises real-time agent performance monitoring with integrated anomaly detection thresholds within the overall architecture. The performance monitoring module continuously collects and analyzes metrics associated with one or more automated agents operating within the platform, including parameters such as response latency, speech recognition accuracy, natural language understanding precision, and overall dialogue management effectiveness. This module compares real-time performance data against predefined anomaly detection thresholds established based on historical operational data and adjustable criteria. When the performance of an agent deviates beyond these thresholds, the system automatically flags the anomaly and triggers alerts that result in corrective actions or escalations to human supervisors. The threshold values are dynamically adjusted through feedback from continuous learning processes that analyze conversation logs, error patterns, and system load variations. In certain embodiments, the performance monitoring module interfaces with ancillary system components via secure API connections, thereby enabling centralized data logging, real-time alerting, and the provisioning of performance dashboards that display agent metrics. Moreover, the integration of this module with continuous learning mechanisms allows for the adaptive recalibration of anomaly thresholds, ensuring that the system remains robust under varying operating conditions while maintaining the quality and consistency of agent responses. This real-time monitoring capability supports proactive maintenance of the communication platform by detecting issues before they significantly impact user experience and by enabling the system to respond dynamically to emerging performance trends through automated adjustments or human intervention as necessary. In one embodiment, the LLM processing further comprises dynamic temperature adjustment based on conversation complexity. In this embodiment, the LLM is configured to analyze ongoing conversation data to determine a complexity metric that reflects factors such as topic variance, syntactic diversity, sentiment fluctuations, and contextual density. The determined complexity metric is then used to adjust a temperature parameter, which in turn modulates the randomness and creativity of the response generation process. Specifically, when the complexity metric indicates that the conversation exhibits elevated complexity—characterized by multifaceted topics, intricate sentence structures, or rapidly shifting contextual elements—the system decreases the temperature setting to promote more deterministic and contextually coherent responses that adhere closely to the input parameters. Conversely, when the complexity metric indicates diminished complexity, the temperature setting is increased to allow for more creative and varied responses. The dynamic adjustment is implemented via a control module that continuously monitors conversation input and recalibrates the temperature in real time or on a per-turn basis prior to each generation cycle. The control module calculates the complexity index by processing conversation logs and assessing predefined complexity criteria. Once the complexity index is established, it compares the value against established thresholds to determine whether an adjustment of the temperature parameter is warranted. In certain embodiments, additional inputs such as historical interaction data and real-time user feedback are incorporated into the complexity analysis to further refine the temperature adjustment process. The system further comprises automated escalation protocols that transfer processing to human agents when confidence scores generated by the AI models fall below an 85% threshold. In one embodiment, after processing voice input and converting it to text using automatic speech recognition components, the system analyzes the text through natural language processing pipelines. These pipelines, which include components for intent recognition, contextual dialogue management, and sentiment analysis, also generate confidence scores indicative of the accuracy and reliability of the extracted information. When the confidence score associated with any processed interaction is determined to be less than 85%, the escalation protocol is automatically triggered. In response, the system seamlessly routes the conversation to a human agent through established communication channels while ensuring that the interaction history, including the conversation context and any relevant metadata, is transferred to the agent interface. This automatic escalation is executed by an escalation module that monitors the confidence scores in real time and initiates the handoff when necessary. The escalation module interfaces with the dialogue management system, wherein the dialogue management system continuously evaluates interaction quality and invokes the escalation protocol upon detecting sub-threshold confidence levels. The human agent is provided with all pertinent session data, including the voice input, intermediate text, analysis results, and any additional context generated by the natural language processing pipelines to facilitate an informed and efficient resolution. Integration with backend systems through secured API connections ensures that the transfer adheres to established data security and privacy protocols, including end-to-end encryption and biometric authentication measures. This further comprises an automated escalation structure that enhances overall system robustness by ensuring that interactions falling below a predefined confidence metric are reviewed and managed by human personnel, thereby improving the user experience and maintaining service quality. Upon completion of input processing, the method generates response content through at least one artificial intelligence model. This generation process utilizes large language models (LLMs) that have been trained on domain-specific corpora to yield contextually appropriate responses. Alternatively, or in conjunction, machine learning classifiers are employed for intent detection, thereby assisting in formulating responses that directly correspond to the detected user intentions. In more dynamic embodiments, reinforcement learning systems are applied to optimize conversation flows based on feedback and evolving dialogue conditions, ensuring continuous improvement of the interaction quality. After generating the response content, the text is transformed into synthetic speech using text-to-speech (TTS) engines. These engines produce natural-sounding audio from the text, thereby providing an audible reply to the user. Simultaneously, the method incorporates executing API integrations with external systems. These integrations are conducted through secure authentication protocols that ensure the protected exchange of data, real-time synchronization with customer relationship management (CRM) platforms to maintain current information, and transaction processing interfaces designed for handling commercial operations, such as payment processing and order management. Furthermore, the method incorporates continuous learning mechanisms, which are essential to the operational enhancement of the voice agent system. These mechanisms comprise conversation outcome analysis modules that evaluate the success of interactions, error pattern detection algorithms that identify recurring issues or misinterpretations, and model retraining pipelines that use updated interaction data to fine-tune the underlying artificial intelligence models. This approach ensures that the system adapts over time to changes in user behavior and maintains an exemplary level of performance. Finally, the processed results, including the audio output and any supportive textual information, are delivered through multiple channels. These output channels might include voice response systems that broadcast the synthetic speech, text-based interfaces that display the response content for review, and enterprise workflow automation platforms that integrate the voice agent's output into broader operational processes. By seamlessly integrating these steps—from voice input reception through neural network-based processing and model-driven response generation to secure external integrations and multi-channel output—the method provides a robust and adaptive framework for operating an artificial intelligence voice agent system. In one embodiment, the dialog management module is configured to implement a plurality of techniques to effectively manage multiple concurrent conversation threads. In such embodiments, the module incorporates a temporal analysis component that utilizes sliding windows with durations ranging from 500 to 1500 milliseconds. This temporal processing allows the system to capture and match the natural turn-taking cadence observed in human conversations, thereby improving the timing and relevance of responses. In addition, the dialog management module employs multi-head attention mechanisms that enable it to simultaneously process and track several dialog threads. This capability ensures that overlapping conversation contexts are efficiently analyzed and managed in parallel, resulting in a more robust understanding of concurrent inputs. Furthermore, the module integrates hardware-accelerated transition matrices that leverage parallel processing units. This hardware acceleration facilitates rapid computation of state transitions within the dialog management engine, enhancing the overall responsiveness and scalability of the system. The combination of these three techniques—temporal analysis with specified window durations, multi-head attention for concurrent dialog processing, and hardware-accelerated transition matrices—provides a sophisticated framework that supports dynamic, real-time conversational interactions. Together, the pitch variance analysis, spectral flux measurements, and neural style transfer layers provide an integrated approach to real-time acoustic evaluation and synthesis. The combination of these functions enhances the system's capability to accurately assess and respond to voice input by dynamically adjusting synthesis parameters based on both acoustic and emotional input data. In one embodiment, accented speech processing is optimized by integrating several specialized components that work in concert to boost recognition accuracy for accented or dialectal speech. The accent processing module incorporates a first component featuring phonetic lattice pruning algorithms with sub-2 ms latency. These algorithms rapidly evaluate and eliminate unlikely phonetic candidates generated during the speech recognition process by examining multi-dimensional phonetic lattices in real time. By applying dynamic thresholds based on both acoustic and probabilistic language model criteria, the algorithm efficiently reduces the search space, thereby minimizing computational overhead while preserving sensitivity to subtle phonetic distinctions encountered in accented speech. In addition to the adapter modules, the system further includes a dynamic weight freezing mechanism implemented during backpropagation cycles. This mechanism selectively disables updates to certain network weights during gradient descent, thereby preserving learned features that are essential for maintaining performance on previously encountered tasks while allowing other portions of the network to adapt to new data. The decision to freeze weights is based on convergence criteria and performance metrics, ensuring that only parameters that have reached satisfactory stability remain unmodified while others continue to update dynamically. Complementing these features, the neural network employs quantized gradient accumulators designed to reduce the memory bandwidth consumption during the training process. By quantizing the gradient values, the accumulators store and process gradient information using reduced precision arithmetic, which in turn minimizes memory transfer requirements and computational overhead. The integration of quantized gradient accumulators not only streamlines the backpropagation process but also enables the network to manage larger volumes of data or increased model complexity without excessive memory consumption. Together, these components—the adapter modules with controlled parameter expansion, the dynamic weight freezing mechanism during backpropagation, and the quantized gradient accumulators—work in concert to optimize model performance and efficiency, resulting in a neural network architecture that effectively balances adaptability with computational resource management. In one embodiment, the system further comprises a module configured to perform vocal biomarker extraction from audio samples. In this configuration, the audio input is analyzed to extract unique vocal characteristics, including spectral, temporal, and harmonic features, which serve as biometric identifiers to enhance speaker verification and personalization functions. In addition to this, the system incorporates a generative adversarial network-based spectrogram inpainting engine that reconstructs missing or degraded frequency components based on learned contextual patterns from training data, thereby improving the quality and fidelity of the spectral representation used in downstream processing. Further, to safeguard against fraudulent authentication attempts and ensure data integrity, the system implements anti-spoofing hashes using elliptic curve cryptography. This cryptographic mechanism generates secure hashes associated with each processed audio sample, enabling robust verification of voice data authenticity and protecting against replay or tampering attacks (S804). Collectively, these enhancements bolster the overall performance and security of the interactive communication system by ensuring exceptional audio processing, reliable speaker verification, and resilient protection against spoofing. In one embodiment, interruption handling is integrated into the interactive communication system to effectively identify and process unintended or disruptive audio signals during active voice interactions. The system employs dual-threshold voice activity detectors that operate with a dynamic range of 125 dB. In this arrangement, the dual-threshold mechanism comprises a primary threshold that detects the initial onset of voice activity and a secondary threshold that verifies sustained signal presence, thereby differentiating between intended speech and transient noise or brief interruptions. This dual-threshold approach improves the accuracy of interruption detection by accommodating a wide range of signal levels while maintaining sensitivity to both soft and loud voice signals. Concurrently, the system incorporates an echo cancellation module configured to provide at least 30 dB suppression of echo components that could interfere with the clarity of the conversation. The echo cancellation is calibrated to detect, isolate, and suppress reverberant sounds caused by acoustic feedback or multi-path propagation, ensuring that the output remains intelligible even in challenging acoustic environments. Additionally, the interruption handling mechanism uses circular buffers configured to store 800 ms audio data windows. These buffers continuously record incoming audio signals in a temporary storage scheme that provides immediate access to recent data. In the event of an interruption, the stored audio data is used to supply contextual information, enabling the system to analyze and seamlessly bridge segments of conversation without loss of pertinent details. The integration of these components allows the communication platform to maintain uninterrupted interactions by dynamically managing and mitigating the effects of audio interruptions in real time. In one embodiment, the system further comprises a playback rate adjustment module operable to adjust the playback rate of an audio stream within a range of ±12% relative to a reference rate while preserving the original pitch of the audio signal. The playback rate adjustment module incorporates algorithms that decouple the time scale from the spectral components of the audio, thereby ensuring that scaling the playback speed does not introduce pitch distortion. This is achieved by applying discrete Fourier transform techniques in tandem with time-domain signal interpolation, allowing for dynamic rate adjustments even in the presence of transient audio features. Additionally, the system includes jitter buffers configured with adaptive Kalman filtering to address network-induced variability in packet arrival times. The jitter buffers dynamically estimate delays and packet jitter by analyzing successive packet arrival times and updating filtering parameters in real time. The adaptive Kalman filtering algorithm continuously refines the prediction of packet latency based on recent observations, thereby smoothing playback and mitigating the adverse effects of delay fluctuations. This implementation minimizes audio artifacts and ensures a more robust and continuous audio stream, even under variable network conditions.

In certain embodiments, the system further comprises visual programming nodes that generate intermediate code representations. These nodes allow developers to construct and debug conversation flows through a graphical interface that automatically translates configured workflow elements into machine-executable code. The visual programming nodes also provide real-time feedback on dialog structure and logic, facilitating a modular and intuitive design process that bolsters system customization and maintainability. Additionally, the system includes modules for automatic data type conversion between communication protocols, ensuring that data transmitted across heterogeneous interfaces—including those used for voice and text interactions—is correctly formatted and seamlessly integrated. This automatic conversion minimizes errors and reduces the need for manual configuration, streamlining interoperability among diverse networked components. Further, the system incorporates hardware profilers for estimating computational resource utilization. These hardware profilers monitor key performance metrics and provide real-time analysis of processing loads, allowing for dynamic allocation and optimization of computational resources. This enhancement ensures that the interactive communication platform maintains optimal performance and responsiveness even under varying operational demands. Collectively, these additional components—a visual programming interface for intermediate code generation, automatic data type conversion to bridge communication protocols, and hardware profilers for resource optimization—further augment the system's capabilities, supporting efficient system integration, robust error handling, and scalable performance management in complex, real-time interactive environments.

The system further comprises bitrate-shaping algorithms configured to provide adaptive output ranging from 8 kbps to 320 kbps. In certain embodiments, these algorithms monitor system bandwidth and network conditions to dynamically adjust the output bitrate in real time, ensuring optimal audio quality and efficient transmission. This adaptive control allows the encoding process to tailor the bitrate output based on current channel capacity, thereby reducing buffering and latency while maintaining integrity of the audio signal.

Furthermore, the system incorporates multi-channel encoding pipelines that are engineered to support commercial standards. These pipelines simultaneously encode multiple audio channels—including, for example, stereo or surround sound configurations—while adhering to industry-standard protocols for commercial audio transmission. Configured to operate in parallel, the encoding pipelines synchronize the individual encoded streams to maintain temporal coherence and enhance inter-channel interactions. As a result, the system is capable of delivering premium audio output that is compatible with a wide range of commercial and consumer communication platforms, thereby facilitating seamless integration with existing digital, cellular, and VoIP networks. In one embodiment, the system further comprises versioned API interfaces that are configured to ensure component compatibility across a range of system modules and to enable seamless integration and future enhancements without disruption to existing functionalities. The versioned API interfaces provide a structured framework for interfacing between components, thereby facilitating backward compatibility and supporting iterative improvements. Additionally, the system incorporates FPGA-accelerated tensor operations to expedite the processing of complex neural network models. In such embodiments, field programmable gate arrays (FPGAs) are deployed to perform tensor computations, including matrix multiplications and convolution operations, with enhanced efficiency compared to conventional processing units. This hardware acceleration is integrated within the overall processing pipeline, enabling reduced latency and increased throughput in tasks such as intent recognition, dialogue management, and response generation. Moreover, the system implements fallback modes with reduced precision calculations to maintain operational robustness in environments with limited computational resources. In these fallback modes, computational precision is selectively scaled down, thereby reducing processing demands while still delivering acceptable levels of output accuracy. The dynamic adjustment from full-precision to reduced precision ensures that the system can continue to function effectively under varying load conditions, with resource consumption optimized based on the current system capabilities. The system further comprises a caching mechanism that employs a least-recently-used (LRU) algorithm to manage dialog entities. In embodiments, dialog entities representing conversation annotations, user intents, or intermediary processing states are dynamically cached in memory. The LRU scheme ensures that those entities which have not been accessed for an extended period are replaced by more frequently used entries, thereby optimizing the use of available memory resources and reducing retrieval delays in subsequent interactions. In addition, the system incorporates cross-session reference maintenance through unique identifiers. Unique identifiers are assigned to dialog entities during initial processing, enabling persistent association of conversation attributes across separate user sessions. This approach facilitates the maintenance of conversation continuity by linking historical interaction data with current sessions, thereby augmenting personalized user experiences and enabling seamless resumption of previous dialog contexts. Moreover, the system includes non-volatile magnetic RAM (MRAM) storage for recording conversation history. The MRAM is utilized to store dialog logs and associated metadata in a non-volatile format that retains data integrity in the event of power interruptions or system resets. By employing MRAM, the system is capable of providing reliable access to historical conversation data, which is essential for continuous learning models, conversation outcome analysis, and context-aware retrieval mechanisms. Collectively, these features enhance the dynamic management of dialog entities, support persistent cross-session data integrity through unique identifier mapping, and ensure durable storage of conversation history, thereby contributing to the overall robustness and efficiency of the communication platform. In another embodiment, the method further comprises the use of bulk API data transfer protocols. In this arrangement, the communication platform is configured to aggregate large volumes of transactional or user-related data and transfer the data in batches via bulk API calls. This approach minimizes the overhead associated with individual transactions while ensuring that data integrity is maintained during the transfer process, even under conditions of substantial data throughput or network variability. Additionally, the method further comprises enforcing OAuth scope limitations on a field-level basis. In this variation, after the initial OAuth authentication process has granted access to a general set of resources, a scope enforcement mechanism is implemented at the granularity of individual data fields. This mechanism restricts access so that only users or systems whose OAuth token contains the relevant permissions can access or modify specific fields, thereby enhancing the security of the data exchange. The field-level OAuth scope enforcement is integrated into the API management infrastructure, ensuring that each API request is evaluated against the established scopes before any data is retrieved from or written to the system. Collectively, these features enable the communication platform to operate in a secure, efficient, and synchronized manner with external enterprise systems, thereby enhancing overall system robustness and regulatory compliance. Additionally, the system includes a controlled line noise injection component that introduces artificial noise into the audio signal at predetermined levels, maintaining a signal-to-noise ratio between 15 dB and 35 dB. This noise injection technique is particularly useful for simulating realistic transmission environments and validating the robustness of the automatic speech recognition and voice processing modules under varied acoustic conditions. The noise injection module dynamically adjusts the noise level based on factors such as current channel conditions and testing requirements, effectively mimicking conditions encountered in typical communication channels. By integrating these additional components, the system is enhanced to more accurately mimic natural accents, simulate a range of communication environments through controlled noise injection, and ensure a substantial degree of call completion performance across various languages.

In one embodiment, the system further includes operations for enhanced voice authentication and liveness detection. The method begins by receiving a voice input. The system processes this input to extract a set of multi-dimensional voice embeddings using a dedicated voice processing module. This module employs advanced neural network architectures, including convolutional neural networks or transformer-based models, to derive a detailed representation of the input voice signal. The resulting voice embeddings are then used to perform a cosine similarity comparison against a plurality of enrolled voice templates stored within a secure memory. This cosine similarity computation quantifies the degree of match between the live voice input and each enrolled template, producing a numerical metric that is compared to a predetermined threshold to determine whether the input corresponds adequately with the enrolled user profile. Through the use of voice embedding extraction, cosine similarity analysis, and challenge-phrase-based liveness detection, the system enhances the overall security and integrity of the voice authentication process by mitigating risks associated with voice spoofing and ensuring interaction with a live subject. In one embodiment, the system is further augmented by implementing additional processing steps that extend its natural language understanding capabilities. The system comprises byte-pair encoding with an expanded token vocabulary, which permits more precise and efficient conversion of text into tokenized input for downstream processing. This advanced encoding strategy reduces ambiguity and bolsters the system's ability to capture variations in linguistic expressions. Additionally, the system employs universal semantic space mapping through a joint training process that integrates data from multiple sources and modalities. This mapping creates a unified representation of semantic content that supports robust intent recognition and facilitates deeper contextual understanding across different domains. Furthermore, the system is configured to detect multi-language code-switching within user input. By identifying and effectively managing transitions between languages, the system ensures seamless conversational flow and accurate interpretation of mixed-language interactions, thereby augmenting communication efficacy in diverse linguistic environments. In one embodiment, the system is further configured to secure voice data processing by employing homomorphic encryption techniques that enable encrypted voice data to be processed without decrypting the underlying information. This implementation allows computational operations on voice data while maintaining its encryption throughout processing cycles, thereby enhancing data privacy and security. In addition, the system integrates post-quantum TLS transmission protocols to safeguard voice data communications against potential threats posed by quantum computing. This protocol ensures that data transmitted over communication channels remains secure and resistant to attacks that exploit quantum computational capabilities. Moreover, the system utilizes FIPS-validated hardware security modules to provide a robust and compliant hardware-based security foundation. These modules are employed to manage and store cryptographic keys, as well as to execute sensitive cryptographic operations, ensuring that voice data and associated information are processed in a secure environment. Together, these security measures work in concert with the overall system architecture to provide a comprehensive security framework for voice data processing and transmission, addressing both current and emerging cryptographic challenges. In one embodiment, the system further comprises additional modules integrated into the overall processing workflow to enhance contextual awareness and user responsiveness. In this embodiment, geospatial data fusion is implemented wherein data obtained from location-based sensors or services is combined with information stored in point-of-interest databases, resulting in location-enhanced responses that provide users with relevant suggestions or notifications based on their current or frequently visited geographic areas. Additionally, the system incorporates a calendar availability cross-referencing module that accesses and analyzes calendar data from one or more integrated scheduling systems to determine a user's availability; this module allows the system to adjust the timing, content, or delivery mode of responses or notifications in a manner that minimizes disruption and optimizes user engagement. Further, the system includes an ambient noise-adaptive response verbosity mechanism which evaluates the prevailing background acoustic conditions—using measurements acquired from ambient microphones or dedicated sensors—and dynamically adjusts the verbosity and phrasing of its responses to ensure clarity and effective communication under varying noise conditions. These additional functionalities are fully integrated with the core voice processing and response generation modules, allowing the system to provide contextually rich and user-tailored results based on real-time geospatial positioning, calendar constraints, and environmental acoustic conditions. In certain embodiments, the system further comprises Kubernetes-based horizontal auto-scaling, wherein the system dynamically adjusts compute resource allocation across a distributed cluster in response to workload variations, allowing containerized modules responsible for voice input processing, natural language understanding, and response generation to scale out or scale in automatically based on real-time demand. Additionally, the system is configured to utilize edge caching techniques to achieve sub-50 ms inter-node latency, whereby frequently accessed data and transient processing results are cached at strategic network edge nodes, thus reducing transmission delays between distributed computation units and improving overall system responsiveness and user experience. Moreover, the system includes circuit breaker fault tolerance mechanisms that continuously monitor the operational health of interdependent microservices; upon detection of service degradation or failures, these mechanisms rapidly isolate the affected modules, prevent cascading failures, and maintain continued operation of unaffected components, thereby ensuring robust and reliable performance even in the event of transient errors or network disruptions.

In addition, the system includes a regulatory timeline cross-checking component that is configured to continuously monitor and validate compliance with applicable regulatory schedules. This component retrieves regulatory timeline data and cross-references it with the scheduled transaction or processing events stored in the system. Any deviations between the expected regulatory timeline and the actual timeline associated with a transaction, update, or processing event are flagged for prompt analysis. The regulatory timeline cross-checking component is further structured to update its database with changes in regulatory requirements, thereby ensuring that the validation process remains current with any new regulatory mandates.

These additional features—automated APR calculation verification, regulatory timeline cross-checking, and PDF/A-3 compliant document auditing—are seamlessly integrated into the overall system architecture. This integration enhances the system's ability to enforce financial accuracy, regulatory compliance, and robust document preservation protocols, all of which play a pivotal role in ensuring the integrity and reliability of operations across various communication and processing modules.

In one embodiment, the communication platform further includes a shop interface operable to present limited-time items for purchase. The shop interface is configured to display a selection of these items so that a user is provided with options for enhancing their account experience. The limited-time items include profile decorations, dynamic effects, or other digital enhancements that are available for a predetermined period. Upon selection of an item by the user, the system initiates the processing of a microtransaction associated with that item. In processing the microtransaction, the system validates payment details and confirms sufficient funds or credit availability through integration with payment processing gateways. Once the microtransaction is successfully processed, the purchased item is applied to the user's account by updating the account profile and the associated digital assets. This update involves immediate visual or functional changes to the user's profile as rendered in the communication platform. This embodiment enables the communication platform to integrate commercial operations seamlessly within the interactive environment, thereby enhancing user engagement and enabling monetization through time-limited offers.

In one embodiment, the communication platform is further configured to manage user interactions by enabling a mechanism for selectively ignoring communications from specific users. In this embodiment, the system includes one or more modules that detect a user command indicating that the user wishes to ignore another user's input or messages. The detection mechanism is operable to receive a command—such as a textual input, a button selection, or a gesture—from the user's device, wherein the command explicitly instructs the system to ignore subsequent communications from a specified user. Upon detection of this command, the system automatically adds an identifier associated with the selected user to an ignore list that is maintained in association with the user account issuing the command. The ignore list is stored in a secure user profile database and is periodically synchronized with active session data to ensure that communications from the ignored user are not displayed.

In one embodiment, the system is configured to monitor for the addition of a new member to a server within the communication platform. Upon detecting a new member joining the server, the system automatically retrieves account information associated with the new member, including the account age. The retrieved account age is compared to a predetermined minimum age requirement that is established within the system's configuration. If the account age meets or exceeds this minimum threshold, the system grants access to the server, thereby allowing the new member to participate in server activities. Conversely, if the account age is determined to be below the minimum requirement, the system denies access to the server. This method ensures adherence to established user eligibility criteria and maintains the integrity of the server environment by preventing access from accounts that do not satisfy the age requirement.

In one embodiment, the communication system includes integration with a project management tool. In this embodiment, an interface module establishes a secure connection with the project management tool, enabling data exchange and functional synchronization between the tool and the communication platform. The system monitors the project management tool for updates or changes by employing a monitoring component configured to detect modifications in project status, task assignments, or deadline updates; such monitoring involves periodic polling or utilization of webhook notifications to promptly capture any changes. Upon detection of an update or change, a notification generation module creates project-related notifications based on the received update data. These notifications include details pertinent to the change detected in the project management tool and are formatted according to preset criteria that ensure clarity and relevance for the user. The generated project-related notifications are then displayed in a designated channel within the communication platform, whereby users are immediately informed of changes in project status and any significant updates, thus facilitating better project oversight and enhanced collaborative efforts.

In one embodiment, the method further comprises detecting a user command to activate a message effect, wherein the system monitors user inputs for specific commands that indicate the desire to apply a dynamic visual or auditory effect to a message. Upon detection of such a command, the communication platform applies the selected message effect to the user's message by modifying its presentation parameters, such as color schemes, animations, or other dynamic visual attributes, before the message is rendered in the chat interface. The processed message, now containing the applied effect, is then displayed in real time within the chat interface so that all recipients observe the enhanced presentation. Additionally, the system incorporates an option within the user settings that enables users who prefer a simpler interface to disable message effects, ensuring that messages are rendered in a standard, non-enhanced format when desired. The configuration for enabling or disabling message effects is seamlessly integrated with the overall message processing and dialogue management components of the system, thereby allowing users to personalize their interaction experience without compromising system performance or introducing significant processing overhead.

In one embodiment, the communication platform is further configured to integrate a game development platform that operates within the overall system. The integrated game development platform provides a comprehensive framework that includes development tools, application programming interfaces, and runtime environments that allow game developers to create, test, and deploy games without leaving the communication platform. The system provisions a software development kit that includes libraries, drag-and-drop components, and prebuilt assets to facilitate rapid game prototyping and development. The platform also supports integration of external development tools, enabling seamless import and export of game assets and code modules.

In a further embodiment, the communication platform is configured to enable in-app purchases for game monetization. The system integrates secure payment processing gateways along with digital wallet functionalities that facilitate transactions directly within the user interface. Developers can set pricing models that include one-time purchase options, subscription-based access, or microtransactions for in-game items and upgrades. The platform ensures all transactions occur within a secure environment by employing industry-standard encryption protocols and real-time fraud detection systems, thereby safeguarding user data and financial information.

Moreover, the platform is arranged to facilitate direct user feedback to game developers. An integrated feedback module allows users to rate games, submit bug reports, suggest feature enhancements, and communicate general impressions directly to the developers. The feedback system includes structured forms, interactive discussion threads, and the ability to attach screenshots or video captures to better illustrate user concerns. Collected feedback is aggregated and made accessible to developers through a dedicated dashboard that prioritizes items based on frequency, impact, and strategic importance, enabling rapid response and ongoing improvement of the game offerings within the communication platform.

In one embodiment, the system further comprises an enhanced voice channel interface that facilitates effective multimedia communication among users within a real-time interactive environment. The enhanced interface includes a customizable mini-dashboard for voice channel participants that displays pertinent information regarding the ongoing session and provides user-controlled settings, such as individual volume adjustments. Real-time voice activity indicators are implemented to monitor active speakers, thereby enabling participants to visually identify which users are currently transmitting audio. In conjunction with these indicators, the system allows users to adjust the volumes of individual participants to tailor the audio output to their personal preferences, thus optimizing the overall listening experience during group interactions. Additionally, the interface integrates screen sharing capabilities directly within the voice channel, permitting users to share visual content seamlessly while maintaining simultaneous voice communication. The combination of these features enhances collaborative interactions by unifying audio, visual, and control elements into a single, cohesive user interface that supports dynamic adjustments and real-time content sharing during live communication sessions.

In one embodiment, one implementation further comprises a content creator program incorporated within the communication platform, wherein the program is configured to provide a suite of tools that enable content creators to monetize their servers and content. In certain embodiments, the content creator program includes functionality for implementing a subscription system that allows for exclusive server access or content delivery based on a subscription fee. In one non-limiting embodiment, the subscription system permits the establishment of multiple tiers, wherein each tier offers differentiated levels of access to premium content and exclusive features, thereby enabling content creators to generate recurring revenue. One implementation also facilitates revenue sharing between the platform and content creators by employing secured financial processing modules that automatically calculate and distribute revenue shares based on predetermined criteria such as subscription rates, engagement metrics, and overall earnings. Additionally, the platform provides analytics tools designed to track audience engagement and earnings, wherein these tools collect, analyze, and report data on user interactions, viewership metrics, and spending patterns. In one embodiment, the analytics functionality includes mechanisms for real-time monitoring, historical data analysis, and trend prediction, which assist content creators in evaluating the effectiveness of their monetization strategies and optimizing future content offerings. The integration of the content creator program, subscription system for exclusive access, revenue sharing mechanisms, and comprehensive analytics tools creates an ecosystem that not only enhances the monetization capabilities of content creators but also strengthens the overall value proposition of the communication platform.

In one embodiment, the system further synchronizes multi-user experiences by employing distributed ledger technology that enforces participant consent boundaries. In this embodiment, a distributed ledger component is integrated into the processing architecture to maintain an immutable record of user consents associated with multi-user interactions and synchronized activities. The distributed ledger component records, updates, and verifies consent transactions using cryptographic hash functions and digital signatures to ensure that all consent data is tamper-proof, thereby ensuring that each participant's privacy settings, operational preferences, and agreed-upon interaction boundaries are consistently maintained across all system interfaces and communications. The component uses a consensus mechanism—implemented via a decentralized network of ledger nodes—to validate user consents in real time while providing an auditable trail of all consent-related transactions. This mechanism is configured to operate concurrently with voice recognition, natural language processing, and dialogue management modules, so that as users engage in collaborative sessions, their actions and preferences, including any modifications to consent, are promptly synchronized across the network. Moreover, integration of this distributed ledger technology with the system's API connection modules permits secure data exchange with external systems such as customer relationship management platforms and enterprise resource planning databases, ensuring that consent boundaries are enforced not only within the internal system but also during interactions with third-party services. The distributed ledger component further facilitates automated dispute resolution and auditing by providing verifiable records of consent changes and user approvals, thereby reinforcing regulatory and operational compliance in multi-user environments.

In one embodiment, infrared facial tracking is employed to capture real-time images of a user's facial expressions. The system includes a sensor configured to detect infrared signals to obtain detailed micro expression data. This data is provided to a neural network architecture composed of convolutional and temporal processing layers that analyze fine-scale facial expressiveness over time. The neural network is trained using annotated datasets correlating specific micro expressions with variations in emotional state. Upon receiving the infrared image data, the neural network processes the micro expressions to generate an emotional state vector reflecting subtle changes in arousal and affective cues. The generated vector is then input to an erotic response protocol module, which adjusts the parameters of response generation based on the interpreted facial cues. This module modifies parameters such as tactile feedback intensity, audio modulation, visual stimulus characteristics, or any combination thereof. In operation, the neural network compares the emotional state vector against predefined thresholds to determine whether the intensity or form of the erotic response should be increased, reduced, or maintained. In some embodiments, the system incorporates a dynamic feedback loop in which the neural network updates its parameters based on continuous monitoring of micro expression data, thereby refining its sensitivity and responsiveness over time. This continuous learning approach facilitates adaptive modification of the erotic response protocols, ensuring that the system's output remains synchronized with the user's immediate emotional and expressive state. Additional embodiments integrate complementary biometric inputs to corroborate the micro expression analysis and further enhance the reliability of the response adjustments.

In one embodiment the system further comprises generating synthetic intimate content using diffusion models conditioned on user—specific anatomical parameters. In this embodiment, biometric and anatomical data collected from the user—either through direct user input or via sensor data integrated with the communication platform—is processed to derive user-specific anatomical parameters. These parameters are then supplied to a diffusion model configured to generate synthetic intimate content that is personalized to the user. The diffusion model, utilizing a latent diffusion architecture with convolutional and transformer-based layers, iteratively refines an initial noise distribution to generate content that aligns with the conditioned anatomical parameters. The generated content includes visual representations, auditory cues, or a combination thereof, and is designed to simulate an intimate interaction in a manner that reflects the unique physiological and biometric characteristics of the user. In some embodiments, the system performs a pre-processing stage where anatomical data is extracted and normalized from user inputs or stored profiles, ensuring that the conditioning of the diffusion model is both accurate and secure. The output from the diffusion model is optionally passed through additional processing modules such as neural style transfer layers and quantized gradient accumulators to further customize the content according to predefined aesthetic or contextual guidelines. The generated synthetic intimate content is then integrated with the overall response generation workflow of the system, which also includes converting related text-based or multimedia content into synthetic speech via text-to-speech engines or other output modalities. The entire process is executed in conjunction with secure data handling, including biometric voice authentication and end-to-end encryption, to ensure that user-specific data is protected at all stages of content generation and delivery. In this manner, the system combines advanced diffusion-based synthesis techniques with personalized data conditioning, thereby offering a unique and interactive user experience that is tailored to individual anatomical profiles.

In one embodiment, the system incorporates reinforcement learning wherein the reinforcement learning model applies orgasm prediction algorithms to optimize haptic actuator timing sequences. The reinforcement learning component is configured to receive input from various biometric sensors and other user interaction data, including but not limited to heart rate variability, skin conductance, and vocal pitch modulation, to generate a real-time estimation of a user's arousal state. The generated arousal state estimation is then processed by an orgasm prediction algorithm that outputs a probability score indicating the imminence of a user reaching an orgasm. This probability score is used to dynamically adjust the timing and intensity of signals sent to the haptic actuators.

The reinforcement learning model is initially trained on a comprehensive dataset including simulated physical intimacy patterns and user-provided preference datasets. The training process utilizes reward functions that factor in the synchronization between haptic feedback delivery and physiologically measured arousal peaks. During operation, the model continuously updates its prediction parameters by comparing predicted outcomes to actual biometric responses collected during haptic activation sequences. In this way, the model learns to improve the accuracy of its orgasm prediction over time.

In one embodiment, the system further comprises components configured to prevent unauthorized content generation through the use of blockchain-verified digital rights management tokens. In this embodiment, prior to content generation, a digital rights management (DRM) module verifies that a valid blockchain token is associated with the request for content generation. The DRM module interfaces with a distributed ledger that stores immutable records of issued tokens and their associated permissions. Upon receiving a request to generate content, the system retrieves and validates the corresponding DRM token by checking its digital signature, integrity, and authorization status against the blockchain ledger. Only when the token is confirmed as valid and current does the system permit the subsequent content generation steps to proceed. In this manner, the inclusion of blockchain-verified tokens ensures that only authorized entities or users, whose permissions are recorded in a tamper-evident blockchain, are allowed to initiate content generation processes, thereby preventing unauthorized or potentially malicious content generation. The verification process utilizes cryptographic methods to validate token integrity and includes consensus-based methods inherent to the blockchain to ensure reliability and security. Integration of such a blockchain-based DRM module with the content generation engine enhances the overall security of the system and provides an auditable trail of content creation permissions that meets digital rights management and regulatory compliance requirements.

In one embodiment, haptic actuators incorporate an array of shape-memory alloy elements configured to generate variable pressure gradients that closely mimic the nuances of human touch dynamics. The shape-memory alloy arrays are electrically activated to undergo controlled phase transitions, producing mechanical deformation that results in tactile feedback with varying intensity and distribution. In this embodiment, the actuator array is arranged in a matrix configuration wherein each individual element is independently addressable, allowing precise modulation of pressure and force distribution across the contact surface. The control circuitry applies variable electrical currents to selected elements, inducing shape changes that translate into a continuum of pressure outputs. This dynamic modulation is accomplished via real-time feedback loops that monitor actuator performance and adjust activation signals to maintain the desired force profile, adapting to different user interactions or environmental conditions. By selecting shape-memory alloy materials with suitable transformation temperatures and mechanical properties, the system ensures that the generated tactile sensations accurately emulate those experienced by human skin under various forms of touch, including gentle caresses or firmer pressures. As a result, the haptic feedback provided by the system delivers a heightened level of realism and responsiveness, facilitating immersive user experiences in interactive environments.

The system further comprises filtering non-consensual scenarios using constitutional AI layers trained on international sexual consent laws. In one embodiment, the constitutional AI layers integrate into the processing pipeline so that after converting voice input to text and before generating or transmitting any response content, the textual data is concurrently analyzed by these layers to detect and assess indicators of non-consensual content. The constitutional AI layers are trained with annotated datasets derived from diverse international sexual consent laws and regulations, enabling them to recognize linguistic patterns, context, sentiment, and other semantic cues that indicate a non-consensual scenario. When the analysis identifies a potential non-consensual interaction, the system invokes predetermined filtering actions, including halting further processing of the content, flagging the incident for review, or altering the response output to prevent the transmission of non-compliant information. The filtering mechanism operates in real time, ensuring that any detected non-consensual communication is immediately mitigated in accordance with platform policies and applicable international legal standards. Furthermore, the constitutional AI layers continuously update through iterative training processes that incorporate recent amendments to international sexual consent laws and emerging legal interpretations, thereby maintaining an adaptive and legally compliant filtering process. This integration of constitutional AI-based filtering enhances the overall safety and regulatory compliance of the interactive communication platform by dynamically preventing the distribution of content that violates established sexual consent requirements.

In one embodiment, the biometric feedback loops incorporate neurotransmitter level estimates derived from pupillary response measurements. The system includes an eye region sensor configured to capture detailed real-time images of a user's eyes, thereby monitoring dynamic changes in pupil diameter under varying lighting conditions. The captured images are processed using advanced image processing algorithms combined with machine learning techniques to extract parameters associated with pupillary responses, such as constriction ratios, dilation speeds, and latency periods. These parameters are then correlated with pre-established neurotransmitter concentration profiles derived from empirical studies and calibrated experimental data. A conversion module maps the extracted pupillary metrics to corresponding neurotransmitter level estimates, accounting for individual variability by using a personalized calibration dataset. The resulting estimates serve as an input to the biometric feedback loops, enabling the system to adjust operational parameters in response to the user's inferred physiological and affective state. For instance, the system can dynamically modulate the intensity of tactile feedback signals, alter dialog pacing in text-to-speech outputs, or change other multimedia elements to enhance the interactive experience based on the estimated levels of neurotransmitters such as dopamine and serotonin. The mapping and estimation process is further enhanced by employing neural network layers trained on synchronized pupillary response data and biochemical measurements, which continuously update model accuracy through feedback collected during user interactions. The integration of neurotransmitter level estimates into the biometric feedback loops thereby allows adaptive tailoring of system responses, ensuring both real-time responsiveness and personalized interactive communications.

In certain embodiments, the system further comprises adapting intimacy sequences through quantum annealing optimization of pleasure response curves. The disclosed system measures a plurality of biometric arousal signals and receives user feedback indicative of subjective arousal levels. These inputs are used to generate a dynamic pleasure response curve that reflects the current state of arousal as well as historical interaction data. A quantum annealing module is employed to optimize this pleasure response curve by formulating an objective function that quantifies the deviation between the desired pleasure profile and the current biometric and behavioral measurements. The module initializes with a set of candidate solution parameters, each representing potential configurations for intimacy sequences, and assigns an energy state to each based on the calculated discrepancy. Through iterative probabilistic perturbations following a quantum annealing algorithm, the system explores the multidimensional parameter space to minimize the objective function. The quantum annealing process alters the tactile feedback intensity, duration, and timing parameters that govern the intimacy sequence. As the optimization converges, the resultant pleasure response curve is used to adjust the intimacy sequences in real time, thereby delivering a more personalized and effective physical interaction protocol. The adaptation mechanism continuously monitors biometric feedback such as heart rate variability, skin conductance, and vocal modulation, in addition to simulated physical intimacy patterns, to dynamically recalibrate the intimacy sequencing parameters. In some embodiments, the system permits user-initiated overrides that modify the desired pleasure thresholds, with the quantum annealing module re-running the optimization process to incorporate the updated inputs. The integrated control unit ensures that optimized outputs are seamlessly synchronized with the ongoing intimacy sequence, thereby maintaining a balance between system-driven adjustments and user preferences while achieving rapid convergence to an optimal tactile stimulation configuration.

In one embodiment, the consent verification parameters include both real-time voice pattern analysis and blockchain-timestamped approval records. The real-time voice pattern analysis is performed by continuously capturing and processing the user's voice input to extract unique biometric features, such as pitch, cadence, and spectral characteristics, using sophisticated digital signal processing techniques and neural network classifiers trained on a diverse dataset of voice samples. These techniques enable the system to generate a dynamic voice signature on the fly, which is then compared with previously stored biometric data associated with the user's identity. Concurrently, the system creates a blockchain-timestamped approval record whenever an instance of user consent is detected. This process involves encapsulating the approval event, along with the relevant timestamp and contextual metadata, into an immutable data structure securely recorded on a distributed ledger. The blockchain mechanism employs consensus protocols to ensure that the recorded timestamp is tamper-evident and verifiable by any authorized entity. By integrating these mechanisms, the system first establishes a verified biometric match through real-time voice pattern analysis and then confirms the consent event by referencing the corresponding blockchain record, thereby ensuring that the consent verification process is both robust and secure. In scenarios where the voice pattern analysis yields a match demonstrating reliable confidence and the blockchain record confirms the occurrence of a valid approval event within a predetermined time window, the system validates the user's consent to proceed with subsequent operations. This arrangement provides a dual layer of security by combining biometric authentication with an immutable, timestamped audit trail, thus enhancing the integrity and non-repudiation of the consent-giving process.

In one embodiment, the system further comprises generating synthetic erotic audio through vocal tract models personalized to user-selected voice characteristics. In this embodiment, after generating the response content as described herein, the system receives user inputs that specify certain voice attributes, such as desired pitch, timbre, resonance, and other vocal parameters. A vocal tract modeling module then processes these parameters to adjust the synthesis engine in order to produce synthetic audio output with erotic content. The vocal tract models are designed to simulate the dynamic properties of human vocal production by incorporating both physiological factors and acoustical features corresponding to the chosen voice characteristics. Consequently, the system utilizes the adjusted vocal tract model to generate audio that not only reflects the semantic and contextual components of the erotic content but also conveys a personalized vocal identity tailored to the user selection. This synthetic audio generation occurs concurrently with other processing steps as the vocal tract modeling module operates within a broader response generation framework that includes natural language processing, intent detection, and dialogue management. The output generated by the vocal tract model is then transformed into synthetic speech through text-to-speech engines optimized by the personalized parameters, ensuring that the final auditory output maintains fidelity to both the erotic content and the customized voice profile. This embodiment further incorporates real-time feedback mechanisms, in which biometric and user interaction data are used to continuously refine the vocal tract model parameters during operation, ensuring that the personalized synthetic erotic audio remains aligned with user preferences over time.

In one embodiment, adaptive intimacy sequences are implemented to control temperature-regulated fluidic actuators that are integrally formed within companion devices constructed to duplicate human anatomical features. In this embodiment, sensor modules collect biometric data indicative of user arousal, including but not limited to heart rate variability, skin conductance, and variations in vocal pitch. The acquired biometric data is processed by a control unit executing a specialized algorithm that continuously compares real-time sensor input against pre-established arousal thresholds. When the biometric data indicates that the thresholds have been met or exceeded, the control unit initiates adaptive intimacy sequences that generate control signals specifically adapted to modulate both the actuation intensity and temperature profile of the fluidic actuators.

The fluidic actuators are configured with integrated temperature regulation systems that include fluid channels, miniature heat exchangers, and temperature sensors. The control signals drive pumps or valves which adjust the flow rate of a thermally conditioned fluid within the actuators. In response, the actuators vary the pressure and temperature of the fluid to produce precise mechanical movements and controlled thermal stimulation that mimic the natural tactile response of human tissue. This temperature regulation is achieved by dynamically mixing heating and cooling fluids or by adjusting the set point of an active thermal management circuit, thereby allowing the device to deliver a range of thermal sensations in synchronization with mechanical actuation.

The companion device features anatomically accurate contours that allow the fluidic actuators to be precisely positioned in areas corresponding to human erogenous zones. The distribution of these actuators is optimized so that stimulation is both localized and realistic, thereby enhancing the overall user experience. Additionally, adaptive intimacy sequences incorporate feedback loops that monitor the immediate effects of the actuation process using integrated sensors, which measure factors such as actuator displacement, fluid temperature, and local pressure. The control unit then utilizes these feedback signals to continuously fine-tune the actuator responses, ensuring that both the intensity and temperature remain within acceptable and effective operating ranges.

In one embodiment, the system further comprises a mechanism for implementing differential privacy using homomorphic encryption applied to user orgasmic response patterns. In this context, the apparatus captures physiological signals associated with user orgasmic responses and transforms these signals into a digital data stream representing parameters such as temporal dynamics, amplitude variations, frequency components, and additional biometric indices indicative of an orgasmic state. The digital data stream is initially processed by a differential privacy unit that introduces randomized noise elements into the collected data to disrupt individual correlations while preserving aggregate statistical properties. After introducing noise, the data is encrypted using a homomorphic encryption protocol that permits arithmetic operations to be performed directly on the encrypted values. This encryption scheme supports both additive and multiplicative homomorphism, thereby enabling further processing of the encrypted data without the need for decryption, which maintains the confidentiality of the original user responses. The system also includes a key management module that dynamically generates and rotates cryptographic keys to further mitigate the risk of decryption or data linkage over time. The homomorphically encrypted, noise-enhanced data is then transmitted to downstream processing modules responsible for aggregating data across multiple users or performing secure computations necessary for adaptive feedback mechanisms, while ensuring that each computation conforms to rigorous standards of differential privacy. This approach not only secures sensitive user biometric data but also enables meaningful analytics on aggregated data without compromising individual privacy, thereby addressing both security and regulatory requirements in systems handling sensitive user response patterns.

In one embodiment, the neural network incorporates a counterfactual regret minimization algorithm that is employed to achieve an optimal balance between user preferences and predetermined ethical constraints. The counterfactual regret minimization algorithm operates by evaluating alternative actions that were not executed in a given interaction, calculating the regret associated with those unchosen actions, and then utilizing this regret information to iteratively refine the decision-making process. By quantifying and comparing the regret of various potential paths, the neural network is able to determine a policy that minimizes cumulative regret over time, thereby converging on choices that honor both the individual user input and the requisite ethical guidelines. The algorithm is integrated within the reinforcement learning module, where it takes into account a plurality of potential outcomes for each decision, including those outcomes that would have resulted had different actions been applied. This approach ensures that the adjustment of neural network parameters, including weight updates during backpropagation, not only improves prediction accuracy based on historical user interaction data but also reinforces ethical constraints by penalizing choices that deviate from established ethical standards. The dynamic interplay between evaluating user-preferred outputs and enforcing ethical boundaries is continuously monitored, with real-time feedback loops allowing the network to adjust its decision-making framework during ongoing interactions. As a result, the system is capable of modulating the relative importance of personalization and ethical compliance, ensuring that over repeated interactions the neural network refines its operational parameters to consistently produce responses that are both responsive to user needs and compliant with ethical requirements. In alternative embodiments, the counterfactual regret minimization process is further coupled with natural language processing and dialog management components, enabling the system to adapt conversational strategies dynamically. By assessing the potential regret associated with divergent conversational paths, the neural network can selectively override user preferences in scenarios where ethical concerns predominate, thereby ensuring overall compliance while still accommodating personalized content where appropriate.

The system further comprises detecting physiological compatibility through machine learning analysis of user-reported satisfaction metrics. In this embodiment, after generating the response content and prior to converting the response to synthetic speech, the system collects user-reported satisfaction metrics, which are received through direct feedback mechanisms or indirectly inferred via user interactions with the communication platform. These metrics are processed by a machine learning module configured to analyze the collected satisfaction data, with the module employing statistical models and neural network architectures to determine a compatibility score that reflects the degree of agreement between user expectations and system performance. The compatibility score is then used to adapt subsequent response generation processes. For example, the dialogue management components adjust conversation state parameters or response generation patterns based on the detected physiological compatibility, thereby enhancing the personalization of responses. Moreover, the system uses the compatibility score as an additional input to continuous learning mechanisms, updating language understanding models and reinforcement learning reward functions to better align future responses with user-reported qualitative feedback. The machine learning analysis also integrates data from other signal processing components, such as sentiment analysis or biometric indicators, to refine the compatibility assessment. In this manner, the system dynamically modifies its behavior in real time, ensuring that the generated output is not only contextually appropriate but also aligned with the user's satisfaction profile as determined through physiological and experiential feedback. Consequently, this approach provides a robust framework for enhancing interactive communication by continuously tuning system responses based on direct analysis of user-reported satisfaction metrics.

In one embodiment, the reinforcement learning reward function is adapted to incorporate pharmacokinetic models of arousal hormone release cycles. The reinforcement learning system evaluates conversational outputs and user interactions by considering not only traditional signal fidelity and contextual appropriateness but also physiological parameters associated with arousal. In this embodiment, dynamic models that characterize the release and decay of arousal hormones, such as adrenalin and cortisol, are integrated into the algorithm to provide a more nuanced reward signal for the reinforcement learning engine. These pharmacokinetic models describe the temporal profile of hormone concentration changes following stimulus events, allowing the system to obtain a quantitative measure of user arousal based on time-dependent physiological responses.

A computer-implemented method for operating an artificial intelligence companion system is described herein. In one embodiment, behavioral data is collected from a user via multi-modal sensors including at least a microphone and camera, wherein the sensory array captures both audio signals indicative of the user's speech and visual signals representative of facial expressions. The collected behavioral data is processed by a neural network that has been trained to recognize vocal pitch variations and detect subtle facial micro-expressions, thereby generating emotional state vectors that quantitatively characterize the user's current emotional condition. In one embodiment, the emotional state vectors serve as inputs to an ensemble learning architecture that dynamically adjusts response protocols. The ensemble learning architecture combines outputs from multiple components, including a transformer-based dialogue model designed to generate contextually relevant conversational responses, a reinforcement learning reward module that optimizes the responses based on previous interaction outcomes, and a contextual awareness engine that analyzes geolocation data to determine environmental or situational context. When the emotional state vectors exceed predetermined threshold values, the system automatically initiates autonomous companion interactions through a tactile feedback interface. In one embodiment, the tactile feedback interface comprises haptic actuators configured to provide physical sensations that correspond to the system's response, thereby enhancing the interactive experience and enabling a more intuitive communication with the artificial intelligence companion.

In certain embodiments, the system further comprises encrypting the behavioral data using homomorphic encryption prior to processing by the neural network. The behavioral data, collected via multi-modal sensors such as microphones and cameras, is first subjected to homomorphic encryption techniques that enable arithmetic operations to be performed directly on the encrypted data. This processing step allows the neural network, which is configured to generate emotional state vectors from the behavioral data, to operate on the encrypted inputs without the requirement for decryption, thereby maintaining the confidentiality and integrity of the sensitive data throughout all stages of processing. The homomorphic encryption scheme, which employs a public-private key cryptosystem, is selected to support the requisite arithmetic operations—such as additions and multiplications—so that the output, once decrypted, corresponds accurately to the result of the neural network's computations as if the data were processed unencrypted. This encryption approach is integrated with the system's overall security protocols, which include biometric voice authentication, end-to-end data encryption, and compliance monitoring, to ensure that privacy is preserved even during intensive computational procedures. The secure handling of behavioral data via homomorphic encryption prior to neural network processing thus provides a robust mechanism for preserving privacy while enabling the advanced analytics required in the system's interactive communication and response generation functions.

In one embodiment, the contextual awareness engine further incorporates a temporal pattern recognition module operable to analyze daily routines stored in a user profile database. The module is configured to receive timestamped interaction records from the user profile database and process the temporal data to identify recurring patterns corresponding to user daily routines. The module employs time-series analysis techniques, including but not limited to moving average filters, Fourier transforms, and autoregressive integrated moving average models, to extract features indicative of routine patterns and user activity cycles. The identified patterns are then cross-referenced with system events and dialog management triggers, thereby enabling the engine to adjust its behavior in accordance with the anticipated time-dependent preferences and probable engagement windows of the user.

In one embodiment the system includes one or more infrared cameras configured to capture real-time imaging data of a user's eyes during interaction with the communication platform. The captured infrared camera data is processed to extract pupil dilation measurements that are indicative of changes in the user's physiological state. The neural network is operatively coupled to receive these pupil dilation measurements as part of a multi-modal input set. The neural network employs image processing techniques such as noise reduction, contrast enhancement, and segmentation to accurately isolate and quantify pupil dilation from the infrared imagery. The resulting quantitative data is then normalized and fused with additional biometric and contextual data streams to generate detailed emotional state vectors. These emotional state vectors are used to infer user affect by correlating pupil dilation metrics with other indicators of emotional state, such as heart rate variability, facial micro-expressions, and vocal pitch modulation. In this manner the incorporation of pupil dilation measurements provides a robust additional parameter that enhances the precision of the neural network in determining the user's emotional state. The neural network is trained on datasets that combine pupil dilation data with other biometric inputs, enabling it to recognize patterns that correspond to specific emotional states. This multi-modal approach allows the system to dynamically adjust its responses and overall interaction strategy based on the inferred emotional state. Specifically the emotional state vectors generated from the fusion of these data sources are used to tailor dialogue management decisions, adjust synthetic speech output, and modify tactile or visual feedback mechanisms in real time. The neural network is implemented with a multi-layer architecture that processes the heterogeneous data, ensuring that variable input types such as pupil dilation are effectively integrated into a cohesive output. Advanced signal preprocessing algorithms are applied to the infrared data to mitigate variations due to ambient illumination or sensor noise, thereby ensuring the reliability of the extracted pupil dilation measurements. The processed measurements are then incorporated into the broader framework of the system's emotional analysis module, where they contribute to the dynamic adjustment of conversation flows and other context-sensitive features. As a result the system is capable of accurately detecting subtle changes in a user's emotional state, thereby facilitating a more personalized and adaptive user experience.

The system further comprises generating explainability outputs through attention heatmaps that visualize decision weights in a transformer-based dialogue model. In one embodiment, the transformer-based dialogue model is configured to generate attention distributions for input tokens during the response generation process, and these distributions are transformed into heatmaps that offer a visual representation of each token's relative contribution to the generated output. The heatmaps are produced by extracting the attention weights from one or more heads within the transformer architecture and mapping these weights to a graphical format where varying intensities correspond to the strength of the model's focus on specific tokens or phrase segments. This process enables both developers and end users to gain insights into the internal decision-making process of the dialogue system.

The generated visual outputs are designed for integration into a user interface, allowing real-time or post-conversation review of the attention patterns that influenced the response selection. The attention heatmaps serve as a tool for model interpretability by highlighting which parts of the input text had a significant impact on the final decision and by providing an intuitive means for diagnosing model behavior and identifying potential biases or misinterpretations. Furthermore, these outputs facilitate continuous model refinement by informing adjustments to the transformer parameters based on observed decision weight distributions.

The system is configured to produce these explainability outputs concurrently with the generation of the synthetic speech response, ensuring that the additional processing does not detrimentally affect the overall performance of the communication platform. Dedicated processing resources are allocated to handle the computational overhead associated with extracting and rendering the attention heatmaps, thus maintaining efficient operation of the core dialogue management functions while providing enhanced transparency into the dialogue model's inner workings.

In one embodiment, an ensemble learning architecture is configured for processing conversation data and user profiles wherein multiple user profiles are simultaneously active and potentially in conflict with one another. The architecture aggregates outputs from a plurality of machine learning modules, each specialized for distinct tasks such as intent recognition, sentiment analysis, and contextual dialog management, and further processes these outputs using Nash equilibrium calculations to resolve conflicts between the user profiles. In this approach, each user profile is modeled as a participant in a non-cooperative game wherein the strategy of each participant corresponds to a specific response or set of parameters derived from user data. Each profile is assigned a payoff function, which is defined based on factors including, but not limited to, user engagement metrics, historical interaction outcomes, and the quality of previous responses. The ensemble learning architecture evaluates a set of candidate response patterns and uses game-theoretical analysis to identify a Nash equilibrium, a state in which no single profile can achieve a higher pay-off by unilaterally altering its strategy. This computation is performed iteratively, employing methods such as best-response dynamics or fixed-point iterations to converge on an equilibrium, with the result representing an optimal compromise that takes into account the strategic interdependencies among the competing user profiles. The resulting equilibrium solution is then integrated into the central response generation system, ensuring that the final output is balanced and reflective of a resolution that maximizes overall conversational effectiveness. In addition, parameters within the Nash equilibrium framework are dynamically adjusted based on real-time interaction feedback, allowing the system to account for fluctuations in user sentiment and context. This use of game-theoretical principles not only resolves conflicts between multiple user profiles within the ensemble learning architecture but also enhances the overall stability and performance of the interactive communication platform by adaptively optimizing responses in scenarios involving concurrent, and potentially divergent, user objectives.

The system further comprises a training module configured to mitigate catastrophic forgetting in the neural network through the use of elastic weight consolidation during training updates. In one embodiment, the training module integrates a regularization term into the loss function that penalizes substantial deviations of weights identified as essential for previously acquired tasks. The significance of these weights is determined based on metrics such as Fisher information, thereby quantifying the sensitivity of the network output to changes in each weight. During model retraining pipelines—including those used in reinforcement learning for response generation, natural language understanding updates, and voice recognition improvements—this regularization term is applied, ensuring that the differential updates emphasize adaptations to new data while preserving parameters associated with earlier learned representations. The selective modification of weights maintains system performance on historical tasks even as new patterns and language nuances are incorporated. By dynamically assessing and adjusting the impact of training updates through this consolidation mechanism, the system is enabled to continuously learn and adapt in real time without suffering from degradation of prior knowledge. This approach not only supports the stability of the neural network over extended periods of operation but also ensures accuracy and responsiveness in converting voice input to text, analyzing context, and generating appropriate responses.

In one embodiment, the tactile feedback interface includes an array of vibration actuators configured to deliver haptic signals based on the magnitude of stress determined from emotional state vectors. These emotional state vectors are derived from processing multi-modal sensor data, which includes biometric inputs such as heart rate variability, skin conductance, vocal tone variations, and facial micro-expressions. A signal processing module extracts features indicative of stress and normalizes the resultant metrics to generate a stress level index. This index is then mapped to a predetermined range of vibration intensities and patterns. In operation, when the stress level index exceeds a baseline threshold, the control unit modulates the output of the vibration actuators, activating vibration patterns that are proportional in intensity to the measured stress. For example, a reduced stress level results in gentle, intermittent vibrations, whereas increased stress triggers stronger, more persistent vibration patterns. The system employs real-time modulation techniques, where continuous sampling of biometric and behavioral data allows for dynamic adjustment of the vibration parameters, including amplitude, frequency, and pulse duration. The control algorithm utilizes a pre-trained machine learning model that correlates specific stress indicators with optimal vibration feedback, thereby ensuring that the tactile stimulus is both perceptible and directly representative of the user's current emotional state. Calibration routines account for user-specific adjustments so that the intensity of the vibration is appropriate for individual sensitivity levels. The resulting feedback not only provides a physical representation of the detected stress but also has potential applications in guiding the user toward behavioral modulation by offering an immediate and intuitive indication of stress fluctuations during interactions.

The system further includes filtering harmful requests through a parallel decision tree containing hard-coded ethical constraints. In one embodiment, after the voice input is converted to text and before further natural language processing or response generation occurs, the converted text is concurrently routed to a decision tree implemented alongside the primary processing pipeline. This decision tree is configured with a series of hard-coded conditional nodes, each corresponding to an ethical constraint that defines acceptable input parameters. The decision tree evaluates user input for the presence of harmful, offensive, or otherwise unacceptable content based on predetermined rules. When the decision tree detects that a portion of the input violates one or more of the ethical constraints, the system either sanitizes or discards the offending content, thereby preventing it from influencing subsequent processing stages. Alternatively, the system produces a neutral response, ensuring that the communication platform does not propagate harmful requests. In embodiments incorporating this filtering mechanism, the decision tree operates simultaneously with intent recognition, dialogue management, and response generation, furnishing an additional layer of protection and compliance with ethical guidelines. By integrating this parallel decision tree early in the processing workflow, one implementation ensures that all responses remain within ethical boundaries and adhere to regulatory and platform-specific standards while preserving the overall interactive experience.

In further embodiments, the described system is optimized for execution on power-efficient edge devices by incorporating quantization-aware training into neural network computations. In these embodiments, during the training phase, quantization-aware training is implemented to simulate reduced precision arithmetic via the insertion of fake quantization operations into the forward and backward propagation flows. This simulation enables the model to learn robust parameter distributions that are resilient to the eventual quantization applied for deployment, thereby maintaining optimal accuracy in natural language understanding, intent recognition, and dialogue management tasks. The training process adapts standard backpropagation algorithms by integrating quantization steps that mimic the fixed-point arithmetic typically employed on power-efficient devices, ensuring that performance degradation is kept to a minimum when transitioning from a full-precision model to its quantized counterpart. Furthermore, the quantization-aware training module dynamically adjusts quantization parameters based on measured hardware performance metrics, such as memory bandwidth and available computational resources, to optimize the model for its target deployment environment. As a result, the quantized neural network model exhibits reduced computational complexity, diminished energy consumption, and decreased latency during real-time voice input processing and response generation. This optimization is seamlessly integrated with other system components, including automatic speech recognition, natural language processing pipelines, dialogue management modules, and text-to-speech engines, while still maintaining the robust security standards provided by end-to-end encryption, biometric authentication, and continuous learning mechanisms. By adopting quantization-aware training, the system is capable of delivering efficient, accurate, and secure performance even when deployed on resource-constrained, power-efficient edge devices.

In one embodiment, the transformer-based dialogue model incorporates cross-cultural adaptation rules that modify response protocols based on detected language idioms. The model is designed to analyze incoming text using advanced natural language processing techniques that identify culturally specific expressions and idiomatic language associated with a particular linguistic or cultural context. When such idioms are detected, a dedicated module within the transformer architecture retrieves a corresponding set of cross-cultural adaptation rules from an embedded rules repository. These rules are applied during the response generation process, adjusting lexical choices, sentence structures, and tone to align more closely with culturally accepted norms and expectations.

The system employs a dynamic feedback loop whereby the detection of a language idiom initiates an evaluation process using a confidence scoring algorithm to assess the reliability of the idiomatic detection and to determine the degree of adaptation required. In instances where the confidence score exceeds a predetermined threshold, the model selectively modifies segments of the generated response to incorporate culturally enriched content, thereby increasing the naturalness and appropriateness of the interaction. This modification process operates concurrently with standard intent recognition and dialogue management functions, ensuring that the overall dialogue flow remains seamless while accommodating cultural nuances.

In one embodiment, the method further comprises generating synthetic vocal responses using a generative adversarial network trained on personalized voice samples. The network includes a generator configured to convert the generated response content into a synthetic vocal waveform that reflects personalized vocal characteristics derived from user-specific voice samples. The discriminator within the network evaluates the authenticity of the synthetic vocal output by comparing it with stored biometric voice samples, thereby facilitating an iterative training process to refine the generator's output. The system receives personalized voice samples, which are acquired during a registration process or continuously updated via user interactions, and uses these samples to train the generative adversarial network to capture distinctive speech patterns, tonal inflections, and cadence corresponding to the user's vocal attributes. Once trained, the generator module is capable of producing synthetic vocal responses that closely mimic the user's natural voice, providing a highly personalized interactive experience. The output of the generator is then integrated within the overall voice response pipeline, effectively complementing the text-to-speech conversion process. This integration enables the communication system to offer responses that are not only contextually appropriate, as determined by the natural language processing and dialogue management components, but also delivered in a voice tailored to the individual user. Furthermore, the system dynamically updates the personalized voice sample dataset based on continuous user feedback and new voice input, permitting the generative adversarial network to fine-tune its synthesis process over time. The incorporation of this generative adversarial network thus enhances the user experience by providing unique and personalized synthetic vocal responses in real time, further complementing the secure and integrated processing features of the overall system architecture.

In certain embodiments, the autonomous companion interactions extend to include controlling smart home devices through IoT protocol bridges. For example, the system analyzes user behavior, biometric feedback, and contextual environmental data to determine when it is appropriate to initiate interaction sequences that not only provide dialog responses but also actively manage the surrounding smart home environment. The companion framework, configured to detect predetermined threshold values and contextual cues, generates control commands that are subsequently transmitted via one or more IoT protocol bridges. These bridges serve as communication gateways that translate the system's control signals into protocols compatible with various smart home devices such as lighting systems, HVAC units, security cameras, and door locks. In this manner, the autonomous companion interactions automatically adjust lighting levels, modify climate control settings, or activate security features based on either user preferences or dynamically evolving environmental conditions. The IoT protocol bridges support a range of communication protocols, including but not limited to Zigbee, Z-Wave, Wi-Fi, and Bluetooth, ensuring interoperability with a wide array of smart devices. Moreover, the companion system incorporates secure communication measures to prevent unauthorized access and maintain privacy during the transmission of control signals. In some implementations, the system allows the user to define specific routines or triggers that correlate with particular smart device operations, thereby enhancing both the automation and personalization of the user's environment. Overall, the integration of IoT protocol bridges within the autonomous companion interactions results in a versatile platform that combines responsive dialogue, adaptive tactile feedback, and comprehensive control over smart home devices to deliver a cohesive, user-centric experience.

In one embodiment, the system further comprises implementing differential privacy by injecting random noise into training datasets prior to federated learning updates. The method involves applying a predetermined level of random noise to each local dataset before these datasets are used for model training in a federated environment, thereby obfuscating sensitive user-specific information and ensuring that individual data contributions cannot be reverse engineered. In this embodiment, the random noise is drawn from a statistically independent distribution tailored to achieve a desired privacy budget, which provides an effective trade-off between preserving model utility and protecting data privacy. The noise injection process is performed at each client node prior to the aggregation of model updates, so that the global model benefits from enhanced privacy guarantees while still maintaining overall performance in tasks such as intent recognition, dialogue management, and response generation. Additionally, the system includes modules for monitoring both the accuracy of the aggregated model and the level of privacy protection, allowing for dynamic adjustment of noise parameters based on real-time metrics. These privacy-preserving mechanisms are integrated with other components of the system, such as the automatic speech recognition and natural language processing pipelines, to ensure that sensitive data is protected during all stages of processing and learning.

In one embodiment, behavioral data from multi-modal sensors is processed through a neural network trained to recognize vocal pitch variations and facial micro-expressions, thereby generating emotional state vectors. These emotional state vectors are weighted using adaptive momentum coefficients during backpropagation training cycles, which improves the neural network's convergence by dynamically adjusting the influence of error signals associated with emotional features. The adaptive momentum coefficients enable the system to modulate the learning rate for the emotional state vectors based on the magnitude and variance of the gradients, thereby enhancing the robustness of the model. This weighting mechanism, when applied during training, helps to stabilize the representation of emotional cues and reduces the impact of abrupt fluctuations in the input data. As the weighted emotional state vectors are integrated with other processed linguistic and contextual features, the system is capable of providing real-time dialogue management that adapts to subtle changes in user emotion. This integration not only refines the overall accuracy of intent recognition and semantic understanding but also supports the dynamic generation of contextually appropriate responses in interactive communications. Consequently, the use of adaptive momentum coefficients in weighting emotional state vectors forms an integral part of the system's optimization process, improving both the responsiveness and the naturalness of the generated interactions.

In one embodiment of one implementation, the method further includes detecting abnormal vital signs through the use of wearable biometric sensors in eyeglasses that measure galvanic skin response. In operation, data from the wearable biometric sensor is transmitted wirelessly and securely to the communication platform, where the sensor's output—representing the user's skin conductance levels—is processed by an analytics module. The analytics module compares real-time galvanic skin response measurements against predetermined thresholds derived from either standard physiological baseline values or individual user-specific calibration. When the sensor data indicates that the user's skin conductance exceeds these thresholds, a determination is made that abnormal vital signs are present. The detection triggers one or more system responses, such as modifying dialog management parameters or alerting a system operator, thereby enabling the platform to adjust its behavior in response to the user's physiological condition. The system integrates this biometric analysis with other modalities, including voice input processing and context-based inferencing, to enhance overall interaction and improve the accuracy of user state determination. In some embodiments, the process further involves continuous monitoring and adaptive recalibration of thresholds based on historical biometric trends and real-time feedback, ensuring that the system remains responsive to variations in individual user physiology. These features work in conjunction with secured API integration, where the galvanic skin response data is encrypted and managed according to robust security protocols consistent with the security measures outlined in other embodiments.

In one embodiment, an ensemble learning architecture is implemented within the eyeglasses to enhance overall system performance and power efficiency. This architecture prioritizes neural network branches based on real-time battery level measurements acquired from the user devices via integrated sensor circuits. The system uses the battery level information to assign dynamic processing weights to several neural network branches, thereby selecting those that are the most power efficient while still achieving the required computational performance.

By continuously monitoring the battery levels, the ensemble learning system adjusts its branch prioritization in real time. When the battery levels are reduced, the system emphasizes neural network branches that require less power, and when battery levels are robust, it engages branches that offer higher accuracy or more computationally demanding processing. This dynamic prioritization ensures the uninterrupted and optimized operation of the AR/VR eyeglasses, thereby extending battery endurance while reliably projecting visual content and monitoring physiological parameters.

In certain embodiments, the eyeglasses further comprise a wireless communication module configured to transmit physiological data derived from the photoplethysmography (PPG) sensor to a paired mobile device using ultra-wideband (UWB) communication technology. The wireless communication module is operatively connected to the PPG sensor and is designed to process and encode the measured physiological data prior to transmission. In one embodiment, the UWB module transmits the encoded physiological data over a wide frequency range, thereby enhancing data throughput and reliability while mitigating the effects of interference in complex electromagnetic environments. The wireless transmission occurs either continuously or intermittently based on pre-determined time intervals in order to optimize battery power consumption and data transfer efficiency. The paired mobile device, which includes a specialized application for monitoring vital signs, receives the transmitted data and decodes the information for further analysis, display, and storage. In certain configurations, secure pairing between the eyeglasses and the mobile device is established through encryption protocols that ensure data integrity and confidentiality during the transmission process. The integration of the UWB communication module within the eyeglasses eliminates the need for additional external communication hardware, thereby streamlining the design and reducing the overall footprint of the wearable device.

In one embodiment, the eyeglasses further include a notification system configured to alert the user when the PPG sensor detects abnormal vital signs. In this embodiment, when the PPG sensor senses blood flow anomalies or deviations from predetermined vital sign thresholds, a control unit processes the sensor data and determines that an alert condition exists. Once the control unit identifies such an abnormality, it generates a notification signal that is delivered in the form of a visual alert or an auditory alert. The visual alert appears on one or more display elements associated with the eyeglasses, such as on the interchangeable lenses onto which visual content is projected or directly onto the retina, thereby providing an immediate visual cue to the user. Alternatively or additionally, an auditory alert is generated by one or more speakers integrated into the eyeglasses, providing an audible indication of the abnormal condition. This notification system operates in parallel with the transmission of physiological data to an external monitoring device ensuring the user is promptly and continuously informed of any potential health issues, thereby enhancing both user safety and device functionality.

The eyeglasses include an ear plug extension that is inserted into the user's ear canal. The ear plug extension is designed to secure the eyeglasses to the user's head during movement, providing a stable platform for both the glasses and the integrated ear-mounted photoplethysmography (PPG) sensor. The ear plug extension is formed from silicone material designed to engage the user's ear canal in a comfortable and secure manner. The ear plug extension incorporates one or more vibration-damping materials that serve to reduce motion-induced noise in the photoplethysmography (PPG) signal acquisition process.

In certain embodiments, the eyeglass assembly further comprises an onboard camera configured to capture environmental data representative of ambient conditions, illumination conditions, and proximate objects. The processor of the assembly is designed to concurrently receive physiological data from the photoplethysmography sensor and environmental data from the onboard camera. In these embodiments, the processor combines the physiological data with the captured environmental data to form a composite dataset that is analyzed in real time. The analysis is directed toward determining context-aware health insights by correlating changes in the user's physiological state with variations in the surrounding environment.

The eyeglass assembly includes remote configuration and calibration capabilities for both the projection system and the PPG sensor via a dedicated mobile application interface. In one embodiment, the projection system receives wireless commands from the mobile application, allowing remote adjustment of optical parameters to finely tune visual content projection and improve image alignment with the user's prescription. The eyeglass assembly incorporates onboard memory configured to store individualized settings for interchangeable lenses and physiological monitoring profiles. Accordingly, multiple users can share one pair of eyeglasses, with the onboard memory retaining each user's specific configuration.

In certain embodiments, the eyeglasses further include sensors integrated into the frame that continuously monitor ambient illumination levels. The sensors, including devices such as photodiodes or other illumination-detection units, generate signals corresponding to the intensity of the environmental brightness. A dedicated control module processes these signals in real time and dynamically adjusts the brightness of the projected visual content accordingly. The visual content projected onto the interchangeable lenses is enhanced using adaptive contrast algorithms configured to boost visibility under dim conditions. In one embodiment, ambient illumination sensors integrated with the eyeglasses provide real-time measurements of the surrounding brightness, and the adaptive contrast algorithms process these measurements to dynamically adjust the brightness and contrast parameters of the projected images. The algorithms analyze the visual content and intensify key image features by selectively increasing the contrast of specific display regions, thereby mitigating the effects of insufficient ambient brightness.

In one embodiment, the eyeglasses further comprise a charging interface integrated within one temple arm to facilitate recharging of internal batteries. In this embodiment, the charging interface is configured to accommodate either a USB-C cable connection or a wireless charging pad. The charging interface includes a built-in port associated with the temple arm, enabling direct electrical communication with a battery charging circuit housed within the eyeglass frame.

In one embodiment, the eye projector is configured to employ laser-based retinal projection to overlay augmented reality images directly onto the user's retina. The laser source is calibrated to emit beams that are modulated in intensity, wavelength, and focus in order to generate clear augmented reality imagery that seamlessly integrates with, and does not obstruct, the user's natural field of view. In this embodiment the laser-based system projects digital images, graphics, and text so that the augmented reality content is superimposed onto the user's natural vision without occluding environmental details.

In one exemplary embodiment, the prescription clip-in lens is secured to the eyeglass assembly via a detachable nose piece that incorporates an integral locking mechanism. The locking mechanism is configured to allow easy and tool-free attachment and detachment of the prescription clip-in lens, thereby enabling a user without specialized skills to replace the lens as needed. The nose piece attaches to the eyeglasses in a manner that aligns the clip-in lens precisely with the user's optical axis, ensuring optimal visual performance.

In one configuration, the integrated auditory interface delivers audio feedback corresponding to the outcomes of physiological monitoring and AR/VR events. For example, upon detection of abnormal physiological parameters, such as fluctuations in blood flow, the control module instructs the integrated speakers to issue an alert or notification to the user. Similarly, during interactive AR/VR experiences, the speakers emit complementary audio cues that enrich the immersive experience by conveying spatial or contextual information aligned with the visual projections. The audio feedback is generated in real time based on either continuous monitoring of the user's vital signs or specific triggers associated with the displayed content.

The integration of the auditory interface with both the visual projection systems and the physiological sensors enables the eyeglass assembly to offer a multimodal user experience. This configuration ensures that essential notifications or feedback are promptly communicated even if the user's visual attention is directed elsewhere. Moreover, it further enhances usability in settings where visual cues alone prove inadequate for conveying critical information, thereby adding an extra layer of interaction between the device and the user.

The eyeglasses incorporate a battery-molded frame structure that powers all integrated components, including the projector and the photoplethysmography (PPG) sensor. The battery-molded frame structure is integrated into the housing of the eyeglasses and is operatively connected to the projection system—which projects visual content onto interchangeable lenses or directly onto a user's retina and to the PPG sensor that detects blood flow in the user's ear canal.

The eyeglasses integrate H7G6 hinges into the frame assembly to enable smooth adjustment and enhance stability during dynamic motion. The H7G6 hinges are engineered to allow seamless angular movement between frame components, providing a pivot with reduced friction that improves user comfort and minimizes mechanical wear over time.

FIGS. 50A-50E shows exemplary pseudocode on using multimodal LLM for voice processing of intent and emotion. Details on the multimodal LLM architecture are disclosed in co-pending publication Ser. Nos. 17/582,852, 18/115,365, and 18/220,790, the contents of which are incorporated by reference. This pseudocode integrates key components from recent research including: Multimodal input processing (audio and optional video); Emotion-specific encoders for audio features like MFCC and pitch variations; Fusion of different modalities in a shared embedding space; Instruction-tuned LLM processing for intent and emotion recognition; Emotion-aware response generation with appropriate prosody; Confidence scoring and potential escalation to humans and Optional continuous learning mechanism, among others.

As can be recognized, certain embodiments described herein can be embodied within a form that does not provide all of the features and benefits set forth herein, as some features can be used or practiced separately from others, or combinations can be made of the different aspects indicated in the summary. The scope of certain embodiments disclosed herein is indicated by the appended claims or requested exclusivity rather than by the foregoing description. All changes that come within the meaning and range of equivalency of the requested exclusivity are to be embraced within their scope.

The invention claimed is:

1. A computer-implemented method for operating an artificial intelligence voice agent system, comprising:
receiving voice input through communication channels;
analyzing converted text through natural language processing (NLP) pipelines implementing intent recognition and sentiment analysis detecting emotional cues using a multimodal large language model (LLM);
generating response content using machine learning models trained on domain-specific corpora;
converting generated responses to synthetic speech through text-to-speech (TTS) engines;
integrating a customer relationship management (CRM) platform with an enterprise resource planning (ERP) database;
dynamic latency compensation maintaining sub-300 ms response times during voice interactions;
and implementing continuous learning by updating language understanding models using conversation logs, voice recognition parameters based on user feedback, and response generation patterns.

2. The method of claim 1, further comprising real-time call transcription synchronized with dialog state tracking.

3. The method of claim 1, performing call regulatory compliance monitoring and checking a database for caller consent prior to calling a person or automated HIPAA-compliant data redaction pipelines.

4. The method of claim 1, further comprising multilingual processing supporting simultaneous translation and generating speech from one of a plurality of languages.

5. The method of claim 1, wherein CRM integration includes automatic creation of service tickets based on conversation outcomes.

6. The method of claim 1, further comprising emotion-aware response generation adjusting vocal prosody parameters in real-time.

7. The method of claim 1, further comprising conversational context preservation across multiple interaction channels.

8. The method of claim 1, further comprising automated call summarization with key moment timestamping and wherein the key moment is provided to the LLM for responding.

9. A computer-implemented method for operating an artificial intelligence voice agent system, comprising:
receiving voice input through communication channels;

analyzing converted text through natural language processing (NLP) pipelines implementing intent recognition and sentiment analysis detecting emotional cues using a multimodal large language model (LLM);
generating response content using machine learning models trained on domain-specific corpora;
converting generated responses to synthetic speech through text-to-speech (TTS) engines;
integrating a customer relationship management (CRM) platform with an enterprise resource planning (ERP) database; and
implementing continuous learning by updating language understanding models using conversation logs, voice recognition parameters based on user feedback, and response generation patterns;
processing said voice input through a neural network architecture comprising automatic speech recognition (ASR) components converting audio to text, natural language understanding (NLU) components extracting semantic meaning, and maintaining conversation context;
generating response content using at least one AI model selected from: LLMs trained on domain-specific corpora, machine learning classifiers for intent detection, reinforcement learning systems optimizing conversation flows;
editing real-time conversation flow through a graphical interface integrating drag-and-drop workflow components, visual state machine editors displaying conversation branching probabilities, and preview modes simulating multiple dialog paths simultaneously.

10. The method of claim 1, comprising dialog management with temporal analysis windows of 500-1500 ms matching human turn-taking cadence, and multi-head attention mechanisms processing concurrent dialog threads.

11. A computer-implemented method for operating an artificial intelligence voice agent system, comprising:
receiving voice input through communication channels;
analyzing converted text through natural language processing (NLP) pipelines implementing intent recognition and sentiment analysis detecting emotional cues using a multimodal large language model (LLM);
generating response content using machine learning models trained on domain-specific corpora;
converting generated responses to synthetic speech through text-to-speech (TTS) engines;
integrating a customer relationship management (CRM) platform with an enterprise resource planning (ERP) database; and
implementing continuous learning by updating language understanding models using conversation logs, voice recognition parameters based on user feedback, and response generation patterns;
real-time pitch variance analysis using Mel-frequency cepstral coefficients;
spectral flux measurements quantifying vocal intensity changes;
and neural style transfer layers applying emotional archetype profiles to one or more neural network layers.

12. The method of claim 11, comprising enhancing user interaction in a communication platform, by receiving a user input to activate a profile effect for a user account; applying the selected profile effect to the user's profile, wherein the profile effect comprises a dynamic visual element; displaying the profile with the applied effect to other users of the communication platform; providing an option to disable or customize the profile effect based on user preferences; updating the display of the profile in real-time as the dynamic visual element changes.

13. The method of claim 11, comprising providing an artificial intimacy companion system by collecting biometric arousal data via sensors measuring at least heart rate variability, skin conductance, and vocal pitch modulation; generating erotic response protocols through a neural network trained on (i) user-provided preference datasets and (ii) simulated physical intimacy patterns; dynamically adjusting tactile feedback intensity using reinforcement learning tied to real-time biometric feedback loops; initiating adaptive intimacy sequences through haptic actuators when arousal thresholds intersect with consent verification parameters.

14. The method of claim 13, wherein the simulated physical intimacy patterns incorporate biomechanical models of human anatomy refined through generative adversarial networks and wherein the neural network processes micro-expression data from infrared facial tracking to modify erotic response protocols.

15. A computer-implemented method for operating an artificial intelligence voice agent system, comprising:
receiving voice input through communication channels;
analyzing converted text through natural language processing (NLP) pipelines implementing intent recognition and sentiment analysis detecting emotional cues using a multimodal large language model (LLM);
generating response content using machine learning models trained on domain-specific corpora;
converting generated responses to synthetic speech through text-to-speech (TTS) engines;
implementing continuous learning by updating language understanding models using conversation logs, voice recognition parameters based on user feedback, and response generation patterns; and
operating an artificial intelligence companion system by:
collecting behavioral data from a user via multi-modal sensors including at least a microphone and camera;
generating emotional state vectors by processing the behavioral data through a neural network trained to recognize vocal pitch variations and facial micro-expressions;
dynamically adjusting response protocols using an ensemble learning architecture that combines outputs from (i) a transformer-based dialogue model, (ii) a reinforcement learning reward module, and (iii) a contextual awareness engine analyzing geolocation data; and
initiating autonomous companion interactions through a tactile feedback interface when the emotional state vectors exceed predetermined threshold values.

16. A computer-implemented method for operating an artificial intelligence voice agent system, comprising:
receiving voice input through communication channels;
analyzing converted text through natural language processing (NLP) pipelines implementing intent recognition and sentiment analysis detecting emotional cues using a multimodal large language model (LLM);
generating response content using machine learning models trained on domain-specific corpora;
converting generated responses to synthetic speech through text-to-speech (TTS) engines;
implementing continuous learning by updating language understanding models using conversation logs, voice recognition parameters based on user feedback, and response generation patterns; and
operating an augmented reality (AR) or virtual reality (VR) eyeglass by:

projecting visual content onto interchangeable lenses integrated within the eyeglass;

adjusting the projected visual content to align with the user's prescription by modifying optical parameters of the projection system;

enabling selective attachment and detachment of interchangeable lenses to accommodate varying vision correction needs;

sensing blood flow in the user's ear canal using an ear-mounted photoplethysmography (PPG) sensor integrated with the eyeglasses;

transmitting physiological data derived from the PPG sensor to an external device for monitoring vital signs.

17. The method of claim 16, wherein the interchangeable lenses are secured to a frame or to a detachable nose pad.

18. The method of claim 16, wherein the PPG sensor detects variations in blood volume in vessels within the ear canal to calculate heart rate, oxygen saturation, and blood pressure.

19. The method of claim 16, wherein the eyeglass includes a battery-molded frame structure to power components.

20. A computer-implemented method for operating an artificial intelligence voice agent system, comprising:

receiving voice input through communication channels;

analyzing converted text through natural language processing (NLP) pipelines implementing intent recognition and sentiment analysis detecting emotional cues using a multimodal large language model (LLM);

generating response content using machine learning models trained on domain-specific corpora;

converting generated responses to synthetic speech through text-to-speech (TTS) engines;

implementing continuous learning by updating language understanding models using conversation logs, voice recognition parameters based on user feedback, and response generation patterns; and operating an augmented reality (AR) or virtual reality (VR) eyeglass, the method comprising:

projecting visual content via an integrated eyeglass projector;

enabling selective attachment and detachment of a prescription clip-in lens to accommodate varying vision correction needs;

sensing blood flow in the user's ear canal using an ear-mounted photoplethysmography (PPG) sensor integrated with the eyeglasses; and transmitting physiological data derived from the PPG sensor to an external device for monitoring vital signs.

21. The method of claim 20, comprising communicating with a machine or people network.

* * * * *